United States Patent
Bobak et al.

(10) Patent No.: US 8,447,859 B2
(45) Date of Patent: May 21, 2013

(54) ADAPTIVE BUSINESS RESILIENCY COMPUTER SYSTEM FOR INFORMATION TECHNOLOGY ENVIRONMENTS

(75) Inventors: Mythili K. Bobak, Lagrangeville, NY (US); Chun-Shi Chang, Poughkeepsie, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 11/966,495

(22) Filed: Dec. 28, 2007

(65) Prior Publication Data

US 2009/0172689 A1 Jul. 2, 2009

(51) Int. Cl.
*G06F 15/173* (2006.01)

(52) U.S. Cl.
USPC ........... 709/226; 709/223; 709/224; 709/225; 705/7.12; 705/7.41

(58) Field of Classification Search
USPC ........................... 709/223–226; 705/7–9, 400
See application file for complete search history.

(56) References Cited

U.S. PATENT DOCUMENTS

| | | | |
|---|---|---|---|
| 5,023,873 A | 6/1991 | Stevenson et al. | 371/8.2 |
| 5,386,561 A | 1/1995 | Huynh et al. | |
| 5,452,452 A | 9/1995 | Gaetner et al. | |
| 5,481,694 A | 1/1996 | Chao et al. | 395/439 |
| 5,537,542 A | 7/1996 | Eilert et al. | |
| 5,604,863 A | 2/1997 | Allen et al. | |
| 5,631,831 A | 5/1997 | Bird et al. | |
| 5,652,908 A | 7/1997 | Douglas et al. | |
| 5,734,837 A | 3/1998 | Flores et al. | |
| 5,790,780 A | 8/1998 | Brichta et al. | |
| 5,797,005 A | 8/1998 | Bahls et al. | |
| 5,797,129 A | 8/1998 | Rohan | |
| 5,826,080 A | 10/1998 | Dworzecki | |
| 5,887,168 A | 3/1999 | Bahls et al. | |
| 6,012,044 A | 1/2000 | Maggioncalda et al. | |
| 6,012,152 A | 1/2000 | Douik et al. | |
| 6,041,306 A | 3/2000 | Du et al. | |
| 6,336,138 B1 | 1/2002 | Caswell et al. | |
| 6,385,613 B1 | 5/2002 | Grewell et al. | 707/8 |
| 6,393,386 B1 | 5/2002 | Zager et al. | |

(Continued)

FOREIGN PATENT DOCUMENTS

WO WO 99/10814 3/1999

OTHER PUBLICATIONS

Bolie et al., "BPEL Cookbook: Best Practices for SOA-based Integration and Composite Applications Development", 2006, Packt Publishing, ISBN 1904811337; Chapter 1; 12 pages.

(Continued)

*Primary Examiner* — Duyen Doan
(74) *Attorney, Agent, or Firm* — Dennis Jung, Esq.; Blanche E. Schiller, Esq.; Heslin Rothenberg Farley & Mesiti P.C.

(57) ABSTRACT

Programmatically adapting an Information Technology (IT) environment to changes associated with business applications of the IT environment. The programmatically adapting is performed in the context of the business application. The changes can reflect changes in the IT environment, changes to the business application, changes to the business environment and/or failures within the environment, as examples.

17 Claims, 22 Drawing Sheets

U.S. PATENT DOCUMENTS

| | | |
|---|---|---|
| 6,393,485 B1 | 5/2002 | Chao et al. ............ 709/231 |
| 6,408,277 B1 | 6/2002 | Nelken |
| 6,449,688 B1 | 9/2002 | Peters et al. ............ 711/112 |
| 6,480,944 B2 | 11/2002 | Bradshaw et al. |
| 6,785,768 B2 | 8/2004 | Peters et al. ............ 711/112 |
| 6,862,696 B1 | 3/2005 | Voas et al. |
| 6,874,010 B1 | 3/2005 | Sargent |
| 6,934,247 B2 | 8/2005 | Bhattal et al. ............ 370/216 |
| 6,954,786 B1 | 10/2005 | Vered et al. |
| 6,983,321 B2 | 1/2006 | Trinon et al. |
| 6,983,362 B1 | 1/2006 | Kidder et al. |
| 7,032,186 B1 | 4/2006 | Gasser et al. |
| 7,047,337 B2 | 5/2006 | Armstrong et al. |
| 7,058,947 B1 | 6/2006 | Raja et al. |
| 7,111,297 B1 | 9/2006 | Sankaranarayan et al. |
| 7,197,749 B2 | 3/2007 | Thornton et al. |
| 7,243,267 B2 | 7/2007 | Klemm et al. |
| 7,313,573 B2 | 12/2007 | Leung et al. |
| 7,325,161 B1 | 1/2008 | Rakic et al. |
| 7,395,537 B1 | 7/2008 | Brown et al. |
| 7,409,356 B1 | 8/2008 | Geddes et al. |
| 7,437,611 B2 | 10/2008 | Agarwal et al. |
| 7,490,265 B2 | 2/2009 | Baskey et al. |
| 7,509,529 B2 | 3/2009 | Colucci et al. |
| 7,529,981 B2 | 5/2009 | Childress et al. |
| 7,536,585 B1 | 5/2009 | Keeton et al. |
| 7,568,019 B1 | 7/2009 | Bhargava et al. |
| 7,587,483 B1 | 9/2009 | Florissi et al. |
| 7,610,512 B2 | 10/2009 | Gerber |
| 7,620,953 B1 | 11/2009 | Tene et al. |
| 7,650,341 B1 | 1/2010 | Oratovsky et al. |
| 7,707,173 B2 | 4/2010 | Nanavati et al. |
| 7,730,363 B2 | 6/2010 | Takezawa et al. |
| 7,743,001 B1 | 6/2010 | Vermeulen et al. |
| 7,747,730 B1 | 6/2010 | Harlow |
| 7,752,310 B2* | 7/2010 | Kageyama ............ 709/226 |
| 7,774,457 B1 | 8/2010 | Talwar et al. |
| 7,774,458 B2* | 8/2010 | Trinon et al. ............ 709/224 |
| 7,818,421 B2 | 10/2010 | Machida |
| 7,865,582 B2* | 1/2011 | Santos et al. ............ 709/223 |
| 7,933,872 B2 | 4/2011 | Kulkarni et al. |
| 7,934,119 B2 | 4/2011 | Takamoto et al. |
| 7,937,706 B2 | 5/2011 | Casotto |
| 7,958,393 B2 | 6/2011 | Bobak et al. |
| 7,962,590 B1 | 6/2011 | Or et al. |
| 8,051,106 B2 | 11/2011 | Bird |
| 8,260,893 B1 | 9/2012 | Bandhole et al. |
| 2001/0056398 A1 | 12/2001 | Scheirer |
| 2001/0056554 A1 | 12/2001 | Chrabaszcz |
| 2002/0022952 A1 | 2/2002 | Zager et al. |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078130 A1 | 6/2002 | Thornton et al. |
| 2002/0078381 A1 | 6/2002 | Farley et al. |
| 2002/0091991 A1 | 7/2002 | Castro |
| 2002/0194045 A1* | 12/2002 | Shay et al. ............ 705/8 |
| 2002/0198727 A1 | 12/2002 | Ann et al. |
| 2003/0051186 A1 | 3/2003 | Boudnik et al. |
| 2003/0056013 A1 | 3/2003 | Laschkewitsch et al. |
| 2003/0078823 A1* | 4/2003 | Yoshioka et al. ............ 705/8 |
| 2003/0084100 A1 | 5/2003 | Gahan et al. |
| 2003/0093672 A1 | 5/2003 | Cichowlas |
| 2003/0135384 A1* | 7/2003 | Nguyen ............ 705/1 |
| 2003/0139956 A1 | 7/2003 | Guenther et al. |
| 2003/0200482 A1 | 10/2003 | Sullivan |
| 2003/0212580 A1 | 11/2003 | Shen |
| 2003/0212685 A1 | 11/2003 | Rakotoarivelo et al. |
| 2003/0225602 A1 | 12/2003 | Hagmann et al. |
| 2003/0236677 A1* | 12/2003 | Casati et al. ............ 705/1 |
| 2004/0034553 A1 | 2/2004 | Cole et al. |
| 2004/0054690 A1 | 3/2004 | Hillerbrand et al. |
| 2004/0078373 A1 | 4/2004 | Ghoneimy et al. |
| 2004/0119752 A1 | 6/2004 | Beringer et al. |
| 2004/0143470 A1 | 7/2004 | Myrick et al. |
| 2004/0158777 A1 | 8/2004 | Bae et al. ............ 714/47 |
| 2004/0162741 A1 | 8/2004 | Flaxer et al. |
| 2004/0181476 A1 | 9/2004 | Smith et al. |
| 2004/0186905 A1* | 9/2004 | Young et al. ............ 709/225 |
| 2004/0193476 A1 | 9/2004 | Aerdts |
| 2004/0199768 A1 | 10/2004 | Nail |
| 2004/0210452 A1 | 10/2004 | Aboujaoude et al. |
| 2004/0243699 A1 | 12/2004 | Koclanes et al. |
| 2005/0015641 A1 | 1/2005 | Alur et al. |
| 2005/0033600 A1 | 2/2005 | Geddes et al. |
| 2005/0043977 A1 | 2/2005 | Ahern et al. |
| 2005/0049906 A1 | 3/2005 | Leymann et al. |
| 2005/0060662 A1* | 3/2005 | Soares et al. ............ 715/810 |
| 2005/0071470 A1 | 3/2005 | O'Brien et al. |
| 2005/0086091 A1 | 4/2005 | Trumbly et al. |
| 2005/0091351 A1 | 4/2005 | Badovinatz et al. |
| 2005/0096949 A1 | 5/2005 | Aiber et al. |
| 2005/0119905 A1 | 6/2005 | Wong et al. |
| 2005/0125768 A1* | 6/2005 | Wong et al. ............ 717/100 |
| 2005/0172306 A1 | 8/2005 | Agarwal et al. |
| 2005/0177406 A1 | 8/2005 | Facciorusso et al. |
| 2005/0198244 A1 | 9/2005 | Eilam et al. |
| 2005/0228852 A1 | 10/2005 | Santos et al. |
| 2005/0235248 A1 | 10/2005 | Victoria et al. |
| 2005/0262242 A1 | 11/2005 | Byers et al. |
| 2006/0004265 A1 | 1/2006 | Pulkkinen et al. |
| 2006/0010234 A1 | 1/2006 | Reedy et al. |
| 2006/0020866 A1 | 1/2006 | Lo et al. |
| 2006/0037022 A1* | 2/2006 | Byrd et al. ............ 718/104 |
| 2006/0041505 A1 | 2/2006 | Enyart |
| 2006/0064335 A1 | 3/2006 | Goldszmidt et al. |
| 2006/0074731 A1 | 4/2006 | Green et al. |
| 2006/0074736 A1 | 4/2006 | Shukla et al. |
| 2006/0074993 A1 | 4/2006 | Pulamarasetti et al. |
| 2006/0106626 A1 | 5/2006 | Jeng et al. |
| 2006/0111921 A1* | 5/2006 | Chang et al. ............ 705/1 |
| 2006/0112383 A1 | 5/2006 | Chang et al. |
| 2006/0117221 A1 | 6/2006 | Fisher et al. |
| 2006/0123022 A1* | 6/2006 | Bird ............ 707/100 |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1* | 7/2006 | Trinon et al. ............ 705/7 |
| 2006/0179136 A1 | 8/2006 | Loboz et al. |
| 2006/0190368 A1 | 8/2006 | Kesterman |
| 2006/0190583 A1 | 8/2006 | Whalen |
| 2006/0190775 A1 | 8/2006 | Aggarwal et al. |
| 2006/0218558 A1 | 9/2006 | Torii et al. |
| 2006/0224702 A1* | 10/2006 | Schmidt et al. ............ 709/219 |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0259526 A1 | 11/2006 | Booz et al. |
| 2006/0287875 A1 | 12/2006 | Reddy et al. |
| 2006/0293942 A1 | 12/2006 | Chaddha et al. |
| 2007/0011331 A1 | 1/2007 | Morimoto et al. |
| 2007/0027734 A1 | 2/2007 | Hughes |
| 2007/0038490 A1 | 2/2007 | Joodi |
| 2007/0038492 A1 | 2/2007 | Ryan et al. |
| 2007/0067296 A1 | 3/2007 | Malloy et al. |
| 2007/0079097 A1 | 4/2007 | Karnowski et al. |
| 2007/0100712 A1 | 5/2007 | Kilpatrick et al. |
| 2007/0112847 A1* | 5/2007 | Dublish et al. ............ 707/103 R |
| 2007/0143166 A1 | 6/2007 | Leymann et al. |
| 2007/0150571 A1* | 6/2007 | Haga et al. ............ 709/223 |
| 2007/0165525 A1* | 7/2007 | Kageyama ............ 370/230 |
| 2007/0179826 A1 | 8/2007 | Cutlip et al. |
| 2007/0198678 A1 | 8/2007 | Dieberger et al. |
| 2007/0234408 A1 | 10/2007 | Burch et al. |
| 2007/0266029 A1 | 11/2007 | Baskey et al. |
| 2007/0271219 A1 | 11/2007 | Agarwal et al. |
| 2007/0276885 A1 | 11/2007 | Valiyaparambil et al. |
| 2007/0286219 A1 | 12/2007 | Knop et al. |
| 2007/0294406 A1 | 12/2007 | Suer et al. |
| 2007/0300204 A1 | 12/2007 | Andreev et al. |
| 2008/0005739 A1 | 1/2008 | Sadiq et al. |
| 2008/0016335 A1 | 1/2008 | Takahashi et al. |
| 2008/0052719 A1 | 2/2008 | Briscoe et al. |
| 2008/0063423 A1 | 3/2008 | Matoba |
| 2008/0140495 A1 | 6/2008 | Bhamidipaty et al. |
| 2008/0215909 A1 | 9/2008 | Bretschneider et al. |
| 2008/0294777 A1 | 11/2008 | Karve et al. |

| | | | |
|---|---|---|---|
| 2008/0295100 A1* | 11/2008 | Ainsworth | 718/102 |
| 2008/0317217 A1* | 12/2008 | Bernardini et al. | 379/32.03 |
| 2009/0037363 A1 | 2/2009 | Kozlov et al. | |
| 2009/0077210 A1 | 3/2009 | Musman et al. | |
| 2009/0125751 A1 | 5/2009 | Dawson et al. | |
| 2009/0150456 A1 | 6/2009 | Balasubramanian et al. | |
| 2009/0150887 A1 | 6/2009 | Sanghvi et al. | |
| 2009/0171703 A1 | 7/2009 | Bobak et al. | |
| 2009/0171704 A1 | 7/2009 | Bobak et al. | |
| 2009/0171705 A1 | 7/2009 | Bobak et al. | |
| 2009/0171706 A1 | 7/2009 | Bobak et al. | |
| 2009/0171707 A1 | 7/2009 | Bobak et al. | |
| 2009/0171708 A1 | 7/2009 | Bobak et al. | |
| 2009/0171730 A1 | 7/2009 | Bobak et al. | |
| 2009/0171731 A1 | 7/2009 | Bobak et al. | |
| 2009/0171732 A1 | 7/2009 | Bobak et al. | |
| 2009/0171733 A1 | 7/2009 | Bobak et al. | |
| 2009/0172149 A1 | 7/2009 | Bobak et al. | |
| 2009/0172460 A1 | 7/2009 | Bobak et al. | |
| 2009/0172461 A1 | 7/2009 | Bobak et al. | |
| 2009/0172470 A1 | 7/2009 | Bobak et al. | |
| 2009/0172668 A1 | 7/2009 | Bobak et al. | |
| 2009/0172669 A1 | 7/2009 | Bobak et al. | |
| 2009/0172670 A1 | 7/2009 | Bobak et al. | |
| 2009/0172671 A1 | 7/2009 | Bobak et al. | |
| 2009/0172674 A1 | 7/2009 | Bobak et al. | |
| 2009/0172682 A1 | 7/2009 | Bobak et al. | |
| 2009/0172687 A1 | 7/2009 | Bobak et al. | |
| 2009/0172688 A1 | 7/2009 | Bobak et al. | |
| 2009/0172740 A1 | 7/2009 | Corl | |
| 2009/0172769 A1 | 7/2009 | Bobak et al. | |
| 2009/0249337 A1 | 10/2009 | Vasilevsky et al. | |
| 2010/0280863 A1 | 11/2010 | Wilcock et al. | |
| 2011/0004564 A1* | 1/2011 | Rolia et al. | 705/348 |

OTHER PUBLICATIONS

Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
"Parasoft BPEL Maestro," http://www.parasoft.com/jsp/products/home.jsp?product=BPEL.
Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Office Action for U.S. Appl. No. 11/965,855 dated Apr. 30, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13.
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339.
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Final Office Action for U.S. Appl. No. 11/965,897 dated Sep. 17, 2010.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Office Action for U.S. Appl. No. 11/965,894 dated Jul. 18, 2011.
Final Office Action for U.S. Appl. No. 11/965,926 dated Jul. 19, 2011.
Office Action for U.S. Appl. No. 11/965,862 dated Jun. 23, 2010.
Final Office Action for U.S. Appl. No. 11/966,495 dated Jun. 14, 2010.
Final Office Action for U.S. Appl. No. 11/965,832 dated Jan. 9, 2012.
Final Office Action for U.S. Appl. No. 11/965,889 dated Jan. 11, 2012.
Final Office Action for U.S. Appl. No. 11/965,862 dated Feb. 14, 2012.
Office Action for U.S. Appl. No. 11/965,872 dated Feb. 16, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford, C.H., et al., "Toward an on Demand Service-Oriented Architecture," IBM Systems Journal, vol. 44, No. 1, 2005.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
"BPEL Project", http://www.eclipse.org/bpel/, Jul. 2008, pp. 1-2.
"Factor Analysis Using SAS Proc Factor", http://www.utexas.edu/cc/docs/stat53.html, Jul. 2008, pp. 1-11.
"Principal Components and Factor Analysis", http://statsoft.com/textbook/stfacan.html, Jul. 2008, pp. 1-9.
"WebSphere Intergration Developer", http://www-306.ibm.com/software/integration/wid/about/?S_CMP=rnav, Jul. 2008, pp. 1-5.
"Parasoft BPEL Maestro," http://www.parasoft.com/jsp/produts/home.jsp?product-BPEL, Mar. 2009, pp. 1.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.
Office Action for U.S. Appl. No. 11/965,902 dated Nov. 16, 2012.

Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
Final Office Action for U.S. Appl. No. 11/965,889 dated Jan. 11, 2013.
Final Office Action for U.S. Appl. No. 11/965,922 dated Jul. 29, 2011.
Final Office Action for U.S. Appl. No. 11/965,845 dated Jul. 29, 2011.
Final Office Action for U.S. Appl. No. 11/965,913 dated Aug. 17, 2011.
Final Office Action for U.S. Appl. No. 11/965,838 dated Aug. 19, 2011.
Office Action for U.S. Appl. No. 11/965,832 dated Aug. 23, 2011.
Office Action for U.S. Appl. No. 11/965,902 dated Aug. 23, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.

* cited by examiner

FIG. 6A

EVENT LOG

| | MESSAGE | RESOURCE | DATE |
|---|---|---|---|
| ! | CONTAINMENT REGION HAS RECOVERED | CONTAINMENT1 | APR 18, 2006 10:50:52.193 |
| X | CONTAINMENT REGION CREATED FOR RESOURCE FAILURE | CONTAINMENT1 | APR 18, 2006 10:50:52.103 |
| ! | CONTAINMENT REGION HAS RECOVERED | CONTAINMENT3 | APR 18, 2006 10:50:51.982 |
| X | DETECTED DYNAMIC MEMBERSHIP CHANGE: ACTIVE POLICY RECD... | RECOVERYSEGMENT2 | APR 18, 2006 10:12:25.696 |
| X | THIS RESOURCE HAS ENTERED AN UNRECOVERABLE STATE AND RED... | RECOVERY MANAGER2 | APR 18, 2006 10:12:25.696 |
| X | THIS RESOURCE HAS ENTERED AN UNRECOVERABLE STATE AND RED... | RECOVERY MANAGER1 | APR 18, 2006 10:12:14.770 |
| X | ACTIVATION OF POLICY XYZ HAS FAILED | RECOVERY SEGMENT1 | APR 18, 2006 10:12:14.760 |
| ! | DETECTED DYNAMIC MEMBERSHIP CHANGE: ACTIVE POLICY RECD... | RECOVERY SEGMENT2 | APR 18, 2006 10:10:25.696 |

? THE RESOURCE "COBER I RECOVERY" HAS ENTERED AN UNRECOVERABLE STATE THAT REQUIRES YOUR INPUT. DO YOU WANT TO OPEN THE RESOURCE NOW?

[YES]  [NO]

650

ADAPTIVE BUSINESS RESILIENCY COMPUTER SYSTEM FOR INFORMATION TECHNOLOGY ENVIRONMENTS

TECHNICAL FIELD

This invention relates, in general, to managing customer environments to provide support for business resiliency, and in particular, to providing a management capability that programmatically adapts an environment in response to changes.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability to facilitate management of an IT environment. In particular, a need exists for a management capability that is able to adapt the environment, in response to changes associated with one or more business applications of the environment.

The shortcomings of the prior art are overcome and additional advantages are provided through the provision of a computer-implemented method to facilitate management of an IT environment. The method includes, for instance, determining that a change associated with a business application of an IT environment has occurred; and programmatically adapting the IT environment, in response to the change, wherein the programmatically adapting is performed in the context of the business application.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
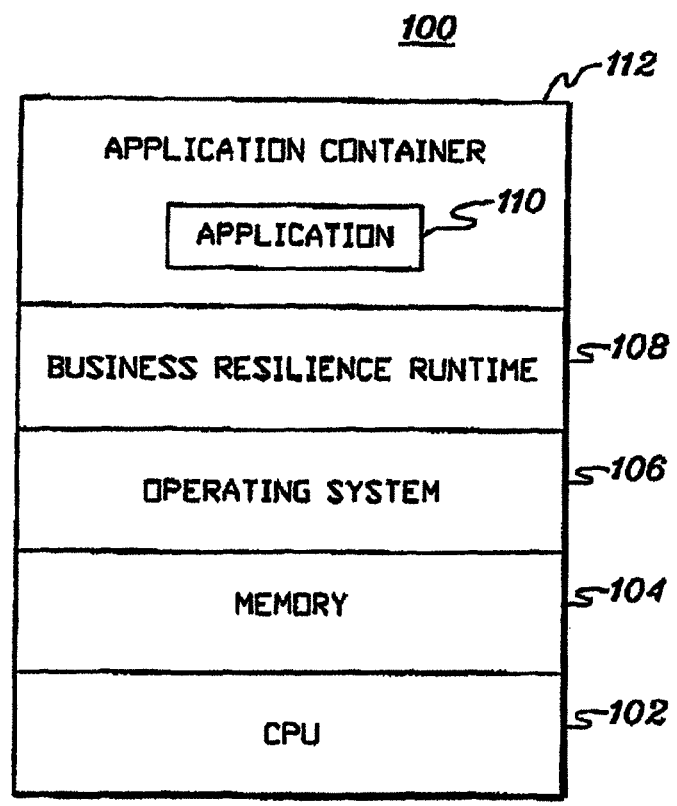
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?

What is the longest component of that recovery time?

Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?

18. Ability to incorporate operations from any vendors' resources for pre-conditioning or recovery workflows, including specification of which pre-conditioning operations have effect on recoveries, which operations have dependencies on others, either within vendor resources or across resources from multiple vendors.

19. Customer ability to modify pre-conditioning workflows, consistent with supported operations on resources.

20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.

21. Ability to divide pre-conditioning work between long running and immediate, nondisruptive short term actions.

22. Impact only the smallest set of resources required during recovery, to avoid negative residual or side effects for attempting to recover a broader set of resources than what is actually impacted by the failure.

23. Choosing recovery operations based on determination of which recovery actions address the minimal impact, to meet goal, and then prepare for subsequent escalation in event of failure of initial recovery actions.

24. Choosing a target for applications and operating systems (OS), based on customer co-location specifications, redundancy groups, and realtime system state.

25. Ability for customer to indicate specific effect that recovery of a given business process can have on another business process—to avoid situations where lower priority workloads are recovered causing disruption to higher priority workloads; handling situations where resources are shared.

26. Ability to prioritize ongoing recovery processing over configuration changes to an availability system, and over any other administration functions required for the availability system.

27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).

28. Allow for possible non-responsive resources or underlying infrastructure that does not have known maximum delays in response time in determining recovery actions, while not going beyond the allotted recovery time.

29. Allow customer to change quantified business recovery goals/targets without disruption to the existing recovery capability, with appropriate labeling of version of the policy to facilitate interaction with change management systems.

30. Allow customers to change logical groupings of resources that have assigned recovery goals, without disruption to the existing recovery capability, with changes versioned to facilitate interaction with change management systems.

31. Ability to specify customizable human tasks, with time specifications that can be incorporated into the goal achievement validation so customers can understand the full time involved for a recovery and where focusing on IT and people time is critical to reducing RTO.

32. There is a requirement/desire to implement dynamically modified redundancy groupings for those resources which are high volume—automatic inclusion based on a specified set of characteristics and a matching criteria.

33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.

Correlation and identification of dependencies between business functions and the supporting IT resources.

Impact analysis of failures affecting business functions, across resources used within the business functions, including the applications and data.

Isolation of failure scope to smallest set of resources, to ensure that any disruptive recovery actions effect only the necessary resources.

2. Rapid granular and graceful degradation of IT service.

Discontinuation of services based on business priorities.

Selection of alternate resources at various levels may include selection of hardware, application software, data, etc.

Notifications to allow applications to tailor or reduce service consumption during times of availability constraints.

3. Integration of availability management with normal business operations and other core business processes.

Policy controls for availability and planned reconfiguration, aligned with business objectives.

Encapsulation, integration of isolated point solutions into availability IT fabric, through identification of affected resources and operations initiated by the solutions, as well as business resiliency.

Goal based policy support, associated with Recovery Segments that may be overlapped or nested in scope.

Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
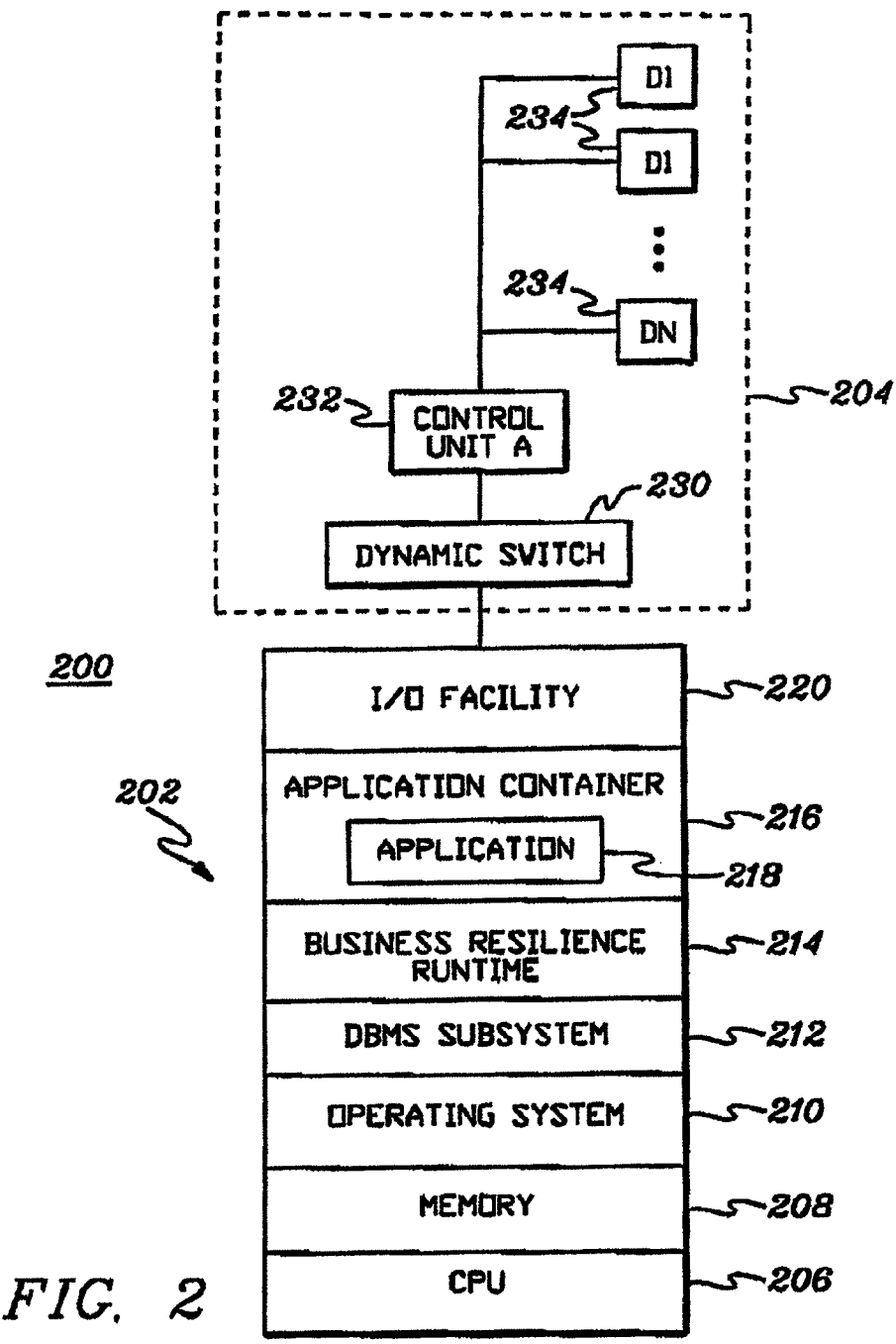
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
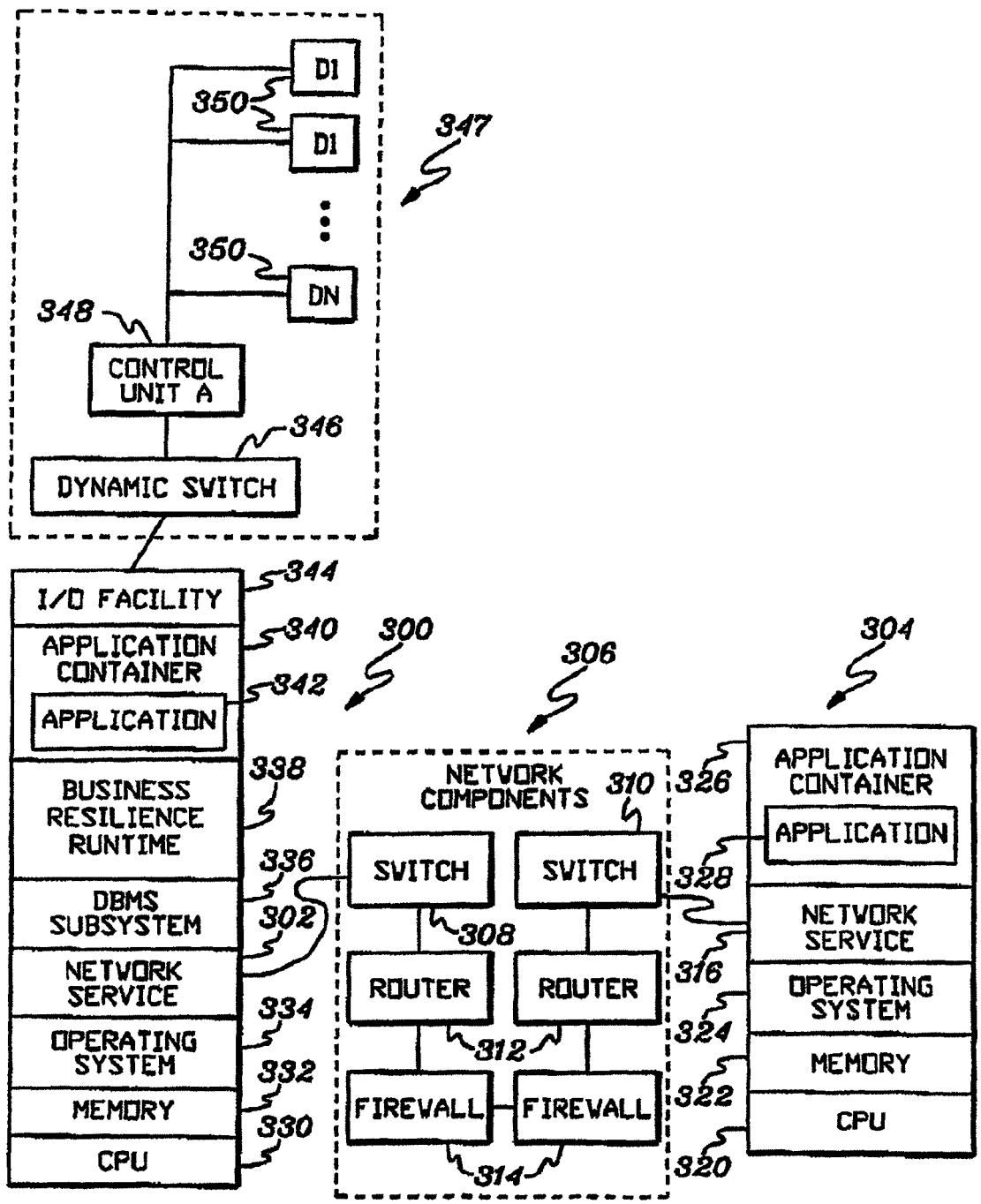
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
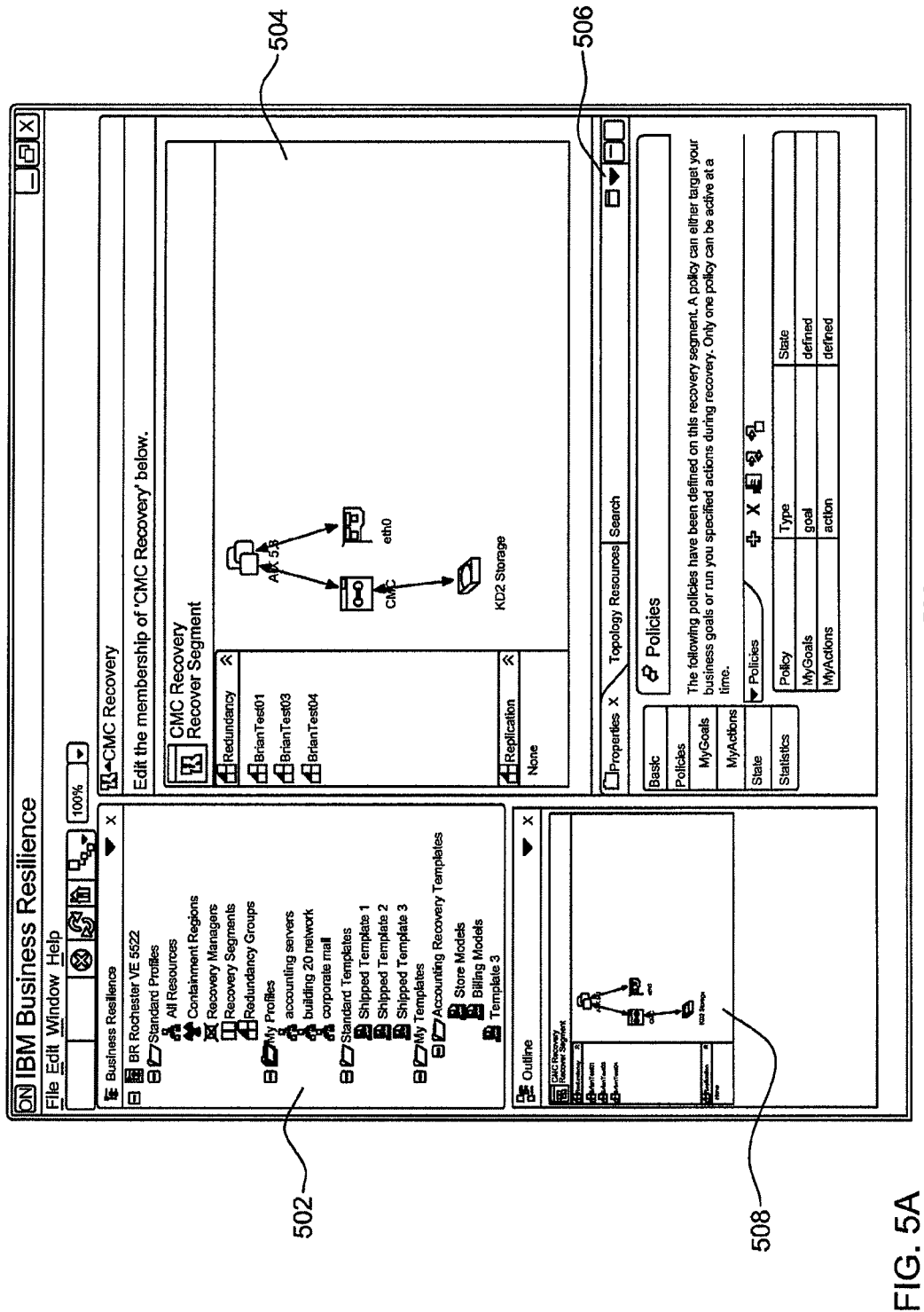
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where editors are launched from the Business Resilience View display. The user can have any number of editors open at one time.

3. Properties View/Topology Resources View/Search View

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
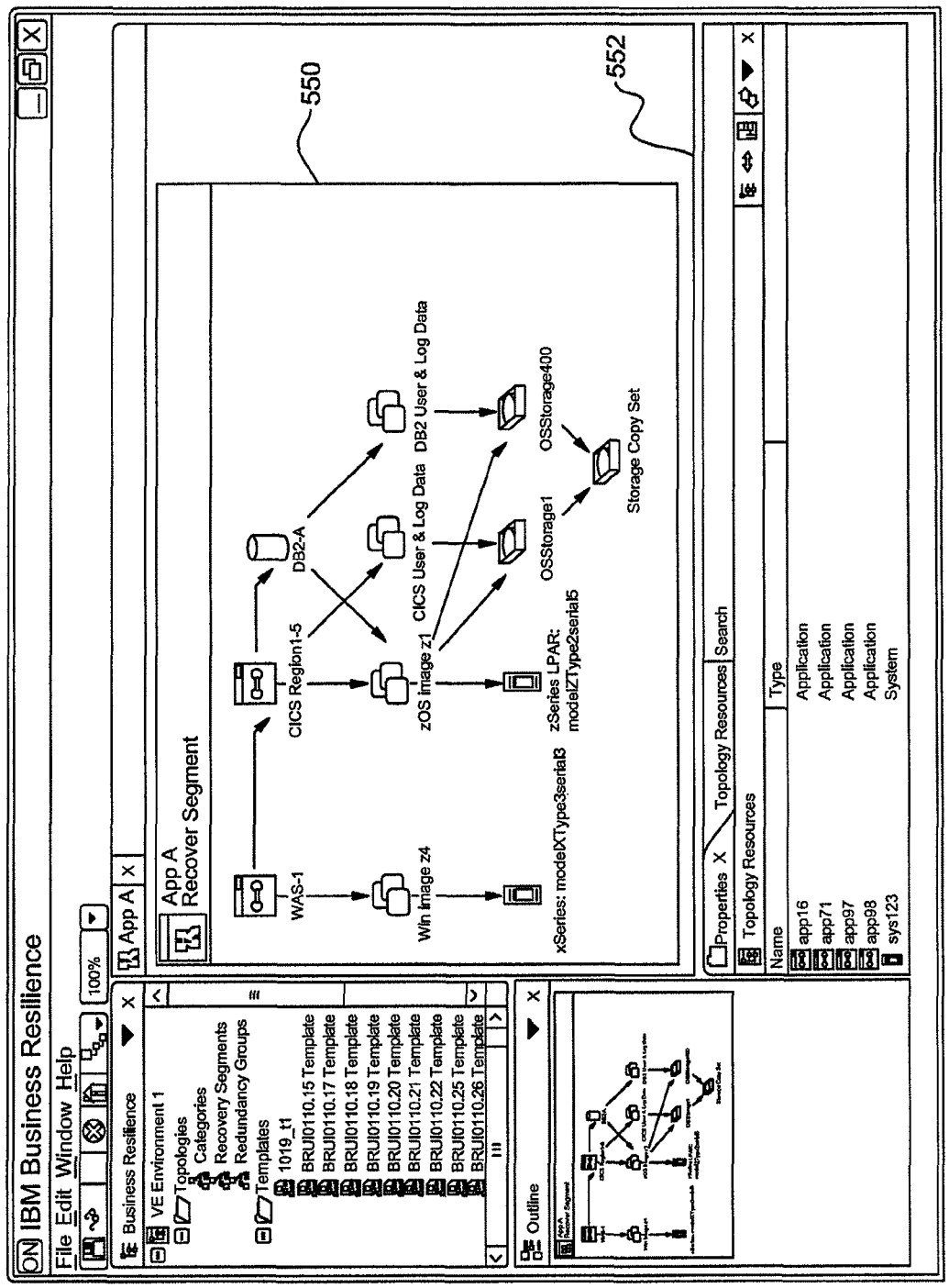
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

Figure 4:
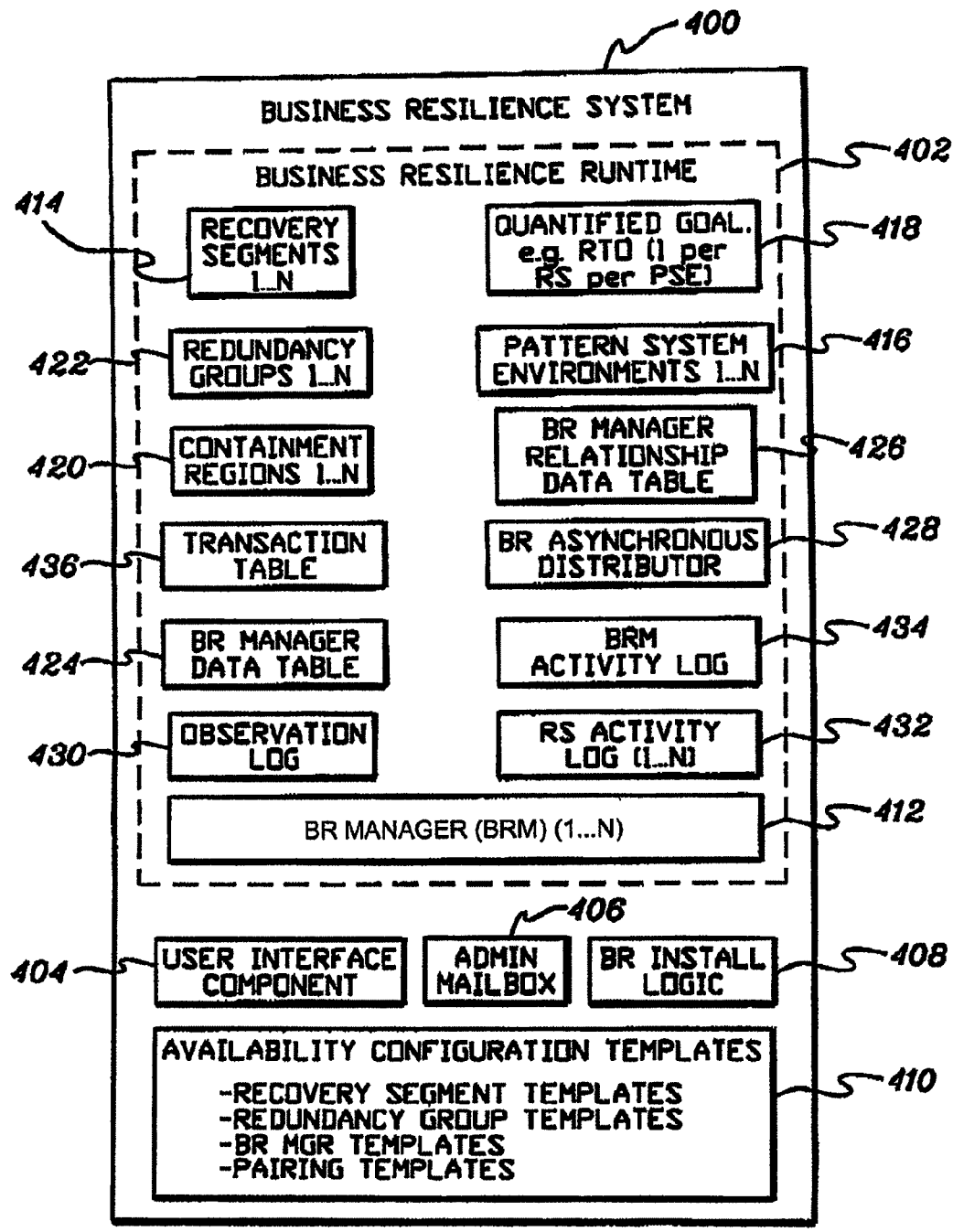
FIG. 4 depicts one embodiment of a Business Resilience System used in accordance with an aspect of the present invention.

By building upon Eclipse, BR has the option to leverage other tooling being developed for Eclipse. This is most apparent in its usage of BPEL workflow tooling, but the following packages and capabilities are also being leveraged, in one embodiment, as well:
  The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.
  The Eclipse platform allows building of advanced editors and forms, which are being leveraged for BR policy and template editing. Much of the common support needed for editors, from the common save lifecycle to undo and redo support, is provided by Eclipse.
  The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.
BR Admin Mailbox (406) (FIG. 4).
  The BR Admin (or Administrative) Mailbox is a mechanism used by various flows of the BR runtime to get requests to an administrator to take some action. The Admin mailbox periodically retrieves information from a table, where BR keeps an up-to-date state.
  As an example, the Admin Mailbox defines a mechanism where BR can notify the user of important events needing user attention or at least user awareness. The notifications are stored in the BR database so they can be recorded while the UI is not running and then shown to the user during their next session.
  The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.
  Double clicking a notification opens an editor on the corresponding resource within the BR UI, which surfaces the available properties and operations the user may need to handle the notification.
  The user is able to configure the UI to notify them whenever a notification exceeding a certain severity is encountered. The UI then alerts 650 the user of the notification and message when it comes in, as shown in FIG. 6B, in one example.
  When alerted, the user can choose to open the corresponding resource directly. If the user selects No, the user can revisit the message or resource by using the above notification log view.
BR Install Logic (408) (FIG. 4).
  The BR Install logic initializes the environment through accessing the set of preconfigured template information and vendor provided tables containing resource and relationship information, then applying any customizations initiated by the user.
Availability Configuration Templates (410):
  Recovery Segment Templates
    The BR System has a set of Recovery Segment templates which represent common patterns of resources and relationships. These are patterns matched with each individual customer environment to produce recommendations for RS definitions to the customer, and offer these visually for customization or acceptance.
  Redundancy Group Templates
    The BR System has a set of Redundancy Group templates which represent common patterns of forming groups of redundant resources. These are optionally selected and pattern matched with each individual customer environment to produce recommendations for RG definitions to a customer.
  BR Manager Deployment Templates
    The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.
  Pairing Templates
    The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
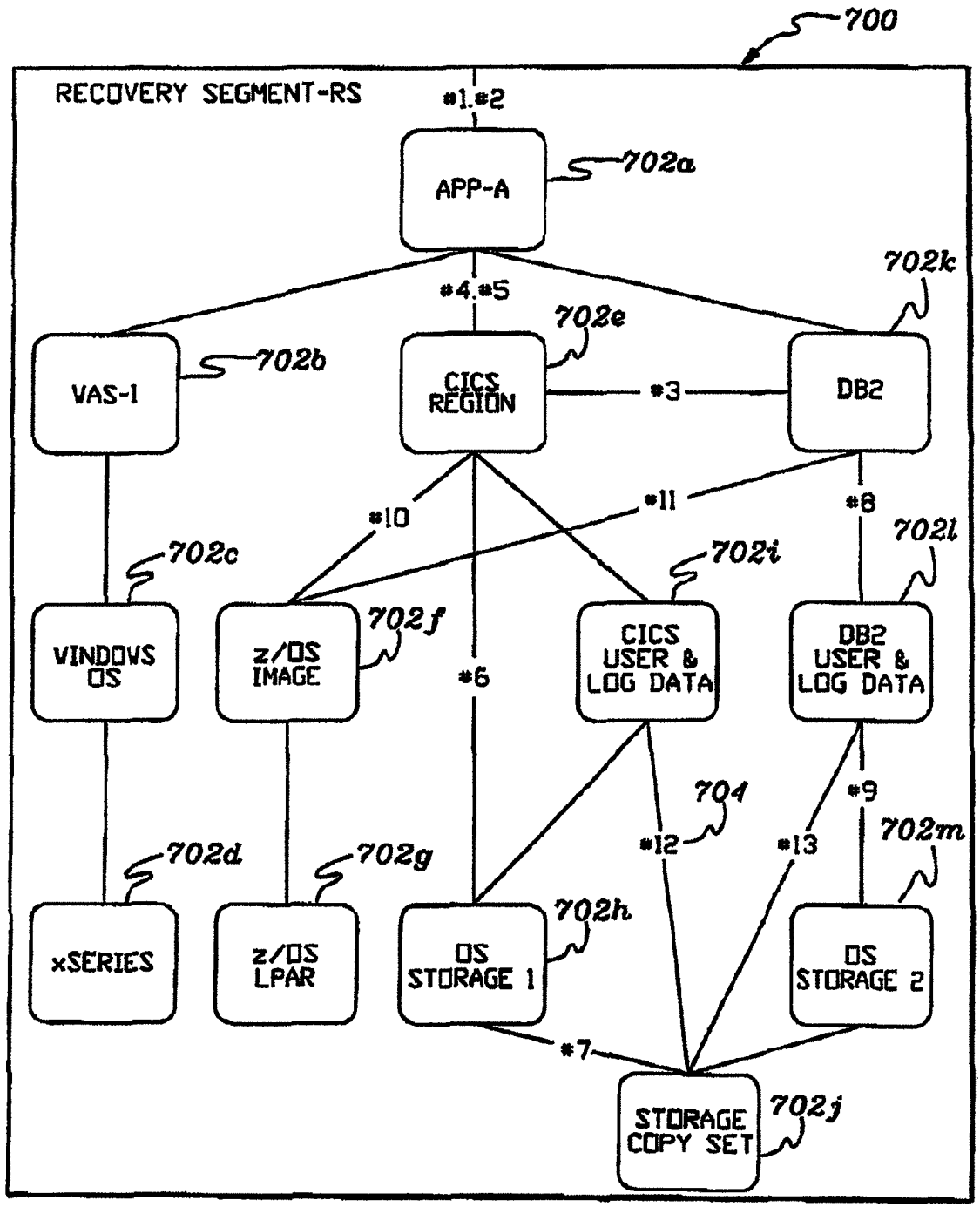
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:
  The Recovery Segment RS has been defined associated with an instantiated and deployed BR Manager for monitoring and management.
  Relationships have been established between the Recovery Segment RS and the constituent resources 702a-702m.
  A goal policy has been defined and validated for the Recovery Segment through interactions with the BR UI.
  The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, # 12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702*h* fails (goes Unavailable).

RS gets notified of state change event.

1st level state aggregation determines:
    Copy Set→Degraded
    CICS User & Log Data→Degraded
    DB2 User & Log Data→Degraded
    DB2→Degraded
    CICS→Unavailable
    App-A→Unavailable 1st level state aggregation determines:
    RS→Unavailable BRM gets notified of RS state change. Creates the following Containment Region:

| Resource | Reason |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
    RS definition from representation of IT Resources;
    Goal (RTO) and action policy specification, validation and activation; and
    Tooling by Eclipse, as an example, to integrate with IT process management.
  Rapid, flexible, administrative level:
    Alteration of operation escalation rules;
    Customization of workflows for preparatory and recovery to customer goals;
    Customization of IT resource selection from RG based on quality of service (QoS);
    Alteration of definition of IT resource and business application state (available, degraded, or unavailable);
    Customization of aggregated state;
    Modification of topology for RS and RG definition;
    Selection of BR deployment configuration;
    Alteration of IT resource recovery metrics;
    Customization of generated Pattern System Environments; and
    Specification of statistical tolerances required for system environment formation or recovery metric usage.
  Extensible framework for customer and vendor resources:
    IT resource definitions not specific to BR System; and
    Industry standard specification of workflows, using, for instance, BPEL standards.
  Adaptive to configuration changes and optimization:
    IT resource lifecycle and relationships dynamically maintained;
    System event infrastructure utilized for linkage of IT resource and BR management;
    IT resource recovery metrics identified and collected;
    IT resource recovery metrics used in forming Pattern System Environments;
    Learned recovery process effectiveness applied to successive recovery events;
    System provided measurement of eventing infrastructure timing;
    Dynamic formation of time intervals for aggregation of related availability events to a root cause; and
    Distribution of achieved recovery time over constituent resources.
  Incremental adoption and coexistence with other availability offerings:
    Potential conflict of multiple managers for a resource based on IT representation;
    Workflows for recovery and preparatory reflect operations with meta data linked to existing operations;
    Advisory mode execution for preparatory and recovery workflows; and
    Incremental inclusion of resources of multiple types.
  Support for resource sharing:
    Overlapping and contained RS;
    Merger of CR across RS and escalation of failure scope; and
    Preparatory and recovery workflows built to stringency requirements over multiple RS.
  Extensible formalization of best practices based on industry standards:
    Templates and patterns for RS and RG definition;
    Preparatory and recovery workflows (e.g., BPEL) for customization, adoption; and
    Industry standard workflow specifications enabling integration across customer and multiple vendors.
  Integration of business resilience with normal runtime operations and IT process automation:
    Option to base on IT system wide, open industry standard representation of resources;
    BR infrastructure used for localized recovery within a system, cluster and across sites; and
    Utilization of common system infrastructure for events, resource discovery, workflow processing, visualization.

Management of the IT environment is adaptively performed, as described herein, in accordance with one or more aspects of the present invention.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. patent applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), Bobak et al., which is hereby incorporated herein by reference in its entirety.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described in "Computer Pattern System Environment Supporting Business Resiliency," (POU920070107US1), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111US1), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (POU920070105US1), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of processes in Computing Environments," (POU920070123US1), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," (POU920070120US1), Bobak et al, which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121US1), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," (POU920070106US1), Bobak et al., which is hereby incorporated herein by reference in its entirety.

Use of provided templates representing best practices in defining the BR system, as described in "Defining and Using Templates in Configuring Information Technology Environments," (POU920070109US1), Bobak et al., which is hereby incorporated herein by reference in its entirety.

Use of provided templates in formulation of workflows, as described in "Using Templates in a Computing Environment," (POU920070126US1), Bobak et al., which is hereby incorporated herein by reference in its entirety.

Making changes to the availability goals while supporting ongoing BR operation, as described in "Non-Disruptively Changing a Computing Environment," (POU920070122US1), Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," (POU920070125US1), Bobak et al., which is hereby incorporated herein by reference in its entirety.

Detecting and recovery for the BR system is performed non-disruptively, as described in "Managing Processing of a Computing Environment During Failures of the Environment," (POU920070365US1), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
|---|---|---|
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connections | Units in elapsed time |
| | Maximum Network Recovery Time for any application connection in group | Units in elapsed time |
| | Maximum Number of active connections at time of network problem encountered, for any application connection in | Integer |

-continued

| Resource Type | Property | Value Range |
|---|---|---|
| | group | |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifier | Text |
| | Operational State | Operational, nonoperational, degraded (some subset of members nonoperational), lost monitoring capability |
| | Number of locks in Shared Facility | Integer value |
| | Time spent in lock cleanup for last restart | Elapsed time value |
| Database Tablespace Transaction Region | Identifier | Text |
| | Identifier | Text |
| | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |

-continued

| Resource Type | Property | Value Range |
|---|---|---|
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
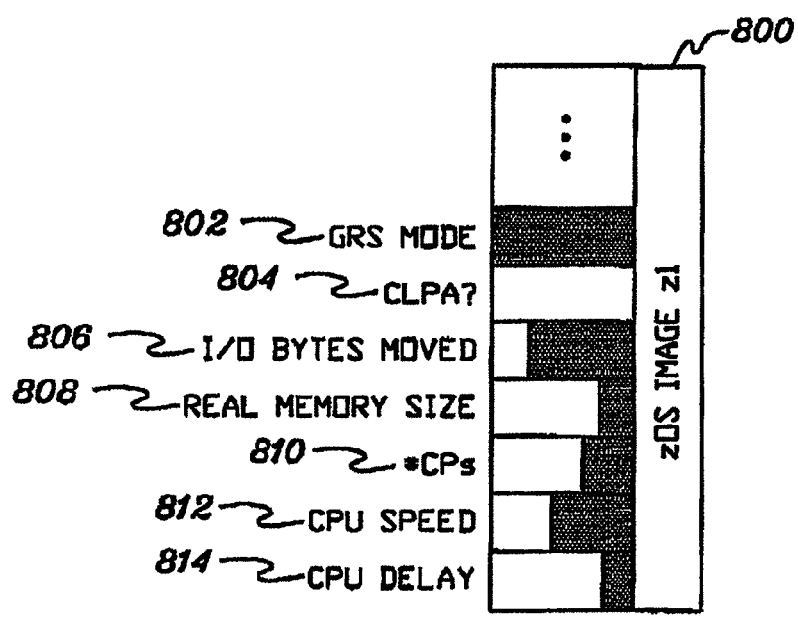
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
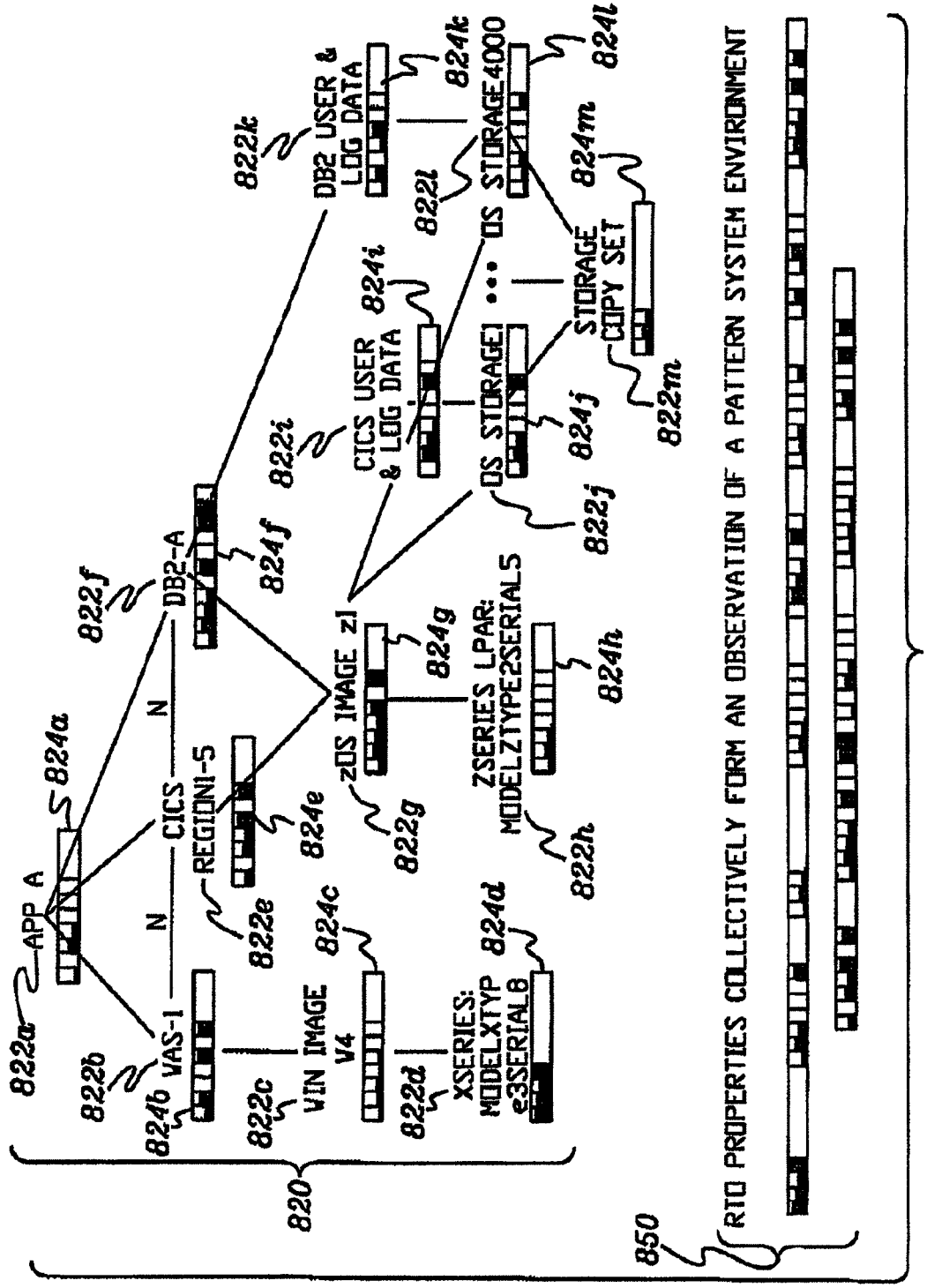
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

| Metric | Qualification |
| --- | --- |
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:
  The operational state of the resource at which the observed recovery time interval started.
  The operational state of the resource at which the observed recovery time interval ended.
  The operational states of the resource at which point it can unblock dependent resources (example: operational states at which a DB2 could unblock new work from CICS, at which it could allow processing of logs for transactions ongoing at time of failure . . . ).
  Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:
  Are present to collect observation data for PSE formation.
  Are present to understand impacts on managed resources.
  No decomposed RTO is associated with an assessed resource.
  They are resources on which resources managed by BR depend upon, but are not directly acted on for availability by BR.
  They are resources removed (or not explicitly added) from the actively monitored set of resources by the BR admin during RS definition.
  They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:
  They have an entry in the BRMD, depending on their use, and the BRMD entry has an indication of assessed vs. managed.
  The RS subscribes to state change notifications for assessed resources (and possibly other notifiable properties).
  Relationships between observed and managed resources are possible (and likely).
  BR monitors for lifecycle events on assessed resources in the same manner as for managed resources.
  a Assessed resources can be added and/or removed from Recovery Segments.
  They can be used to contribute to the aggregated state of an RS.

Finally, there are a few restrictions that BR imposes upon assessed resources, in this embodiment:
  Again, BR does not invoke any workflow operations on assessed resources.
  A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:
- To perform statistical analysis from the BR UI to form characterizations of customers' normal execution environments, represented in BR as Pattern System Environments (PSE).
- To classify operations on resources into these PSEs for purposes of determining operation execution duration.
- Help determine approximate path length of operations that are pushed down from BR to the resources, and possibly to the underlying instrumentation of each resource.
- Help determine approximate path length of activities executed within BPEL workflows.
- Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.
2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, a management capability is provided that dynamically and programmatically adapts an IT environment to changes associated with one or more business applications of the environment. The changes include, but are not limited to, changes in the IT environment itself, changes in business applications of the environment, changes in the business environment (e.g., business cycle, demand), and/or failure in components of the system.

Adaptability Objectives

Management of information technology services has grown in labor cost, complexity and impact to business success. In order to contain cost while providing the flexibility to meet changing business needs, processes which manage IT services are to become readily adaptable in multiple dimensions. Currently unmet needs are addressed by the techniques employed in the BR system. Meeting the following objectives will be demonstrated through an example based on the BR system.

Following an overview of objectives, the manner in which those objectives are met by the BR system is provided in the following format: A review of techniques to be employed is given—Techniques for Adaptability. The subcomponents of the BR system have been grouped in order to provide a framework for detailing the adaptability demonstrated by the BR system—Adaptability Structure for BR System. There are many possible groupings or subcomponents and all combinations of which may be realized through application of the adaptability principles described herein. Specific actions taken by BR for adaptability using the techniques reviewed is provided in summary form for each BR subcomponent—Taxonomy of BR Processes. For each grouping of subcomponents of the BR system, a description of adaptability capabilities is then detailed.

Programmatic IT management services may advantageously deliver on the following objectives:
- Adaptable to configurations: Customer environments in which IT resources are utilized vary widely. Management services are to determine what resources exist, how those resources relate to each other and what those resources are intended to accomplish. The means by which the management service becomes informed of each customer configuration must minimize labor cost and required labor skills.

Flexible to change: Changes occur at multiple levels, all of which are to be incorporated into the management services with minimum human intervention. Changes occur in the number and type of IT hardware and software resources. Individual instances of IT resources change in their ability to operate correctly over time and change in the level of demand for their service.

Rapid real time adjustment: IT management services are to perform functions which enable the IT configuration to meet the customer's objectives. Changes which alter the IT environment, the business environment or conditions external to the business environment will occur. Those changes are to be detected and acted on with sufficient timeliness to insure the customer's objectives continue to be met with minimum cost and minimum disruption.

Programmatic rather than manual: While it may be possible to make adjustments to the IT environment through human intervention, the cost, skill level and time required to respond through manual tasks makes programmatic alternations preferable. Programmatic monitoring and change of the IT environment to meet customer objectives are to be achieved where large numbers of user requests for IT services are to be processed in small time increments—e.g., thousands of requests per second each with the potential for response to human interactions below a second and response to machine initiated interactions measured in microseconds.

Service level objectives rather than explicit actions: IT management services is to accept specification of goals in terms of the customer's business priorities rather than in the form of specific directives to manipulate the IT configuration. For example, a quantifiable goal of achieving 30 second recovery of an application service should a failure occur, instead of a directive composed of start commands for the processor, operating system, database and application service.

Techniques for Adaptability

Many techniques exist from research endeavors and in individual products to provide for adaptability. Some of the recognized techniques used in other environments and in BR include:

Self monitoring: A function which provides a service may also provide a monitor for that service to measure some facet of service delivery. For example, a processor may provide for a performance monitor indicating busy time of the processor and idle time for the processor. A storage device may provide a monitor for determining the duration of time to retrieve a data block or file.

Heuristic modification: A monitor may provide data on the relative ability of a service to deliver a defined function. Heuristic modification may manipulate that data to determine what alteration within the service may be made to better deliver a function.

Learning: If a service monitors itself, makes heuristic modification and evaluates the consequences of making modifications to determine which modifications produce desired results and which produce undesired results, there may be learning being performed by the service.

React to change: A service may monitor the environment for changes associated therewith. Change may be associated with the number, type and capabilities of IT service provided. Reacting to change may be within the scope of a function provided by a particular product resulting in modification to the service provided by that product.

Responding to external conditions: In most IT environments, multiple individual products operate to deliver an overall customer business application. Each product may provide for monitoring, heuristic modification, learning and reacting to change. Coordination among the multiple products still needs to be accomplished. In accordance with an aspect of the present invention, an adaptive IT service management function is provided for coordination through programmatic means to meet a customer's service level or goal. Such an adaptive IT service management function may also be responsive to IT events, such as change in the customer's business cycle or changes introduced through human intervention in the business cycle or IT environment. For example, it may recognize when business applications change in criticality or when usage of a business application may dramatically change.

Respond to exceptional events: IT services may come under severe demand due to influences outside of the IT environment or outside of the customer's business environment they serve. While examples abound, here for illustrative purposes, consider the change in demand for some business's IT services following: Hurricane Katrina, Sep. 11, 2001 or rapid change in stock market trading.

Predictive: Execution of IT management service may have significant impact to a business and changes in the environment in which IT management execute can likewise have a significant impact. However, change magnitude and type may be difficult to predict resulting in uncertainty regarding the ability of the IT management service to correctly operate given changes. A predictive capability may be provided which forecasts the effect of a change given previous measurements of service and change effect. For example, predict whether or not a 50% increase in request of a business application can be absorbed and what the effect on processor utilization, storage utilization, data access rates and any queuing effects which would drastically alter the level of service provided.

Associations: A function may be provided which monitors events and from the monitoring data performs analysis to determine if there exists repeated patterns of events. Where a pattern of events is assessed to be likely, a function may use that information to alter the environment to avoid an undesirable effect. Where typical patterns can be identified, best practices for management of the pattern may be established, thereby providing guidance on actions likely to produce a desired effect.

Broadening scope: As cited earlier, monitoring may be extended from the function provided by a service through relationships that service may have to other products, services or resources. In extending the visibility of what changes can impact a service, more insight may be obtained on the positive or negative effect a change and a resulting reaction to the change may have to the overall IT environment and its support to the business.

Customer configuration awareness: The way a particular hardware or software resource operates is often influenced by the total collection of resources in the execution environment. In the most simple IT environment, tens to hundreds of resources operate concurrently. In complex environments, hundreds of thousands of resources operate concurrently. The number of permutations in combinations of resources cannot be judged in advance for each delivered IT service. Therefore, it is necessary, if an IT service is to be adaptable, to detect the environment in which it is executing and alter the characteristics of the service to be provided to be tailored to each deployment configuration.

Accept definition of what to achieve not how to achieve: Often interfaces are provided to alter how a service provides the function it delivers. Achieving adaptability objectives may not be achievable if the customer must translate their needs for IT service into the product provided interfaces for how to deliver a function. An adaptable IT service may provide the customer an interface to specify a goal or service level to be delivered, then translate from that specification into internal alterations.

Adaptability Structure for BR System

In accordance with an aspect of the present invention, an adaptive IT management service is provided. As one example, the BR system provides such an adaptive IT management service. There are many aspects of the BR system. These aspects individually provide advantages over existing capabilities. Collectively, these aspects may be used together to gain greater advantage. In one example, the many aspects of the BR system are placed in groups for purposes of demonstrating the adaptive nature of the BR system. This is but one possible grouping from the total set of all possible groupings. For each of the following groups, there are patent applications associated with the functions provided by that group that are being co-filed herewith. These applications are identified with a description of the function provided.

1. Configuring a. Pattern System Environment (PSE)—"Computer Pattern System Environment Supporting Business Resiliency," (POU920070107US1), Bobak et al., which is hereby incorporated herein by reference in its entirety.

A PSE is a representation of a customer's environment used to characterize the manner in which the goal (e.g., availability goal) of a business application is to be processed. A PSE has associated with it a set of one or more date and time ranges. For example, each Monday through Friday from 8 am to 5 pm except holidays. A PSE is associated with a business application which in one implementation may be represented by a Recovery Segment. Therefore, the PSE is associated with a collection of IT resources. Each of the associated IT resources may have one or more supported operations for one or more discrete functions, such as recovery or preparing the environment for recovery. For each such resource operation, the PSE has an operation execution duration. As operation execution duration may change over time, the monitoring function of the BR system gathers real-time operation execution duration times and updates the PSE. A PSE may be formed by programmatic processes acting on data gathered from the customer environment. In one implementation, observation mode is enabled for a RS resulting in monitoring functions gathering data on the resources associated with the RS—including operation execution duration. This data is recorded to a log from which programmatic processes may evaluate characteristics of the customer environment resulting in a suggested set of PSE(s).

b. Recovery Segments (RS)—"Recovery Segments for Computer Business Applications," (POU920070108US1), Bobak et al., which is hereby incorporated herein by reference in its entirety.

A customer's business application may be represented, in one implementation, by a Recovery Segment. A Recovery Segment is composed of resources and relationships between resources which are used to provide the function of the business application. A Recovery Segment serves as the basis on which a quantified goal, such as a quantified availability goal (e.g., a Recovery Time Objective (RTO)), is defined. The RS serves as a context for other BR system processes, such as monitoring, recovery processing and change processing. A RS may have associated with it a state (see state below), which may be determined from a rule. The rule may include logical operators (AND, OR) and values of one or of—property value associated with a resource, state associated with a resource, state associated with a RG (see RG below), current PSE associated with a RS.

c. Resource Graphs—"Use of Graphs in Managing Computing Environments," (POU920070112US1), Bobak et al., which is hereby incorporated herein by reference in its entirety.

BR system processes may take advantage of resource and resource relationship information processed into a programmatic structure to assist in processing, such as defining a RS and navigating the resources in a RS from root node to leaf node or in reverse order. Navigation of the resources in a RS from root to leaf (or reverse order) has applicability in processes, including performing subscriptions for event notification, in determining the potential set of resources associated with a failure, in evaluating root cause of a failure and other processes which can take advantage of a logical ordering of evaluating resources in a RS for some function. In the context of a RS, a Resource Graph (e.g., a Directed Acyclic Graph (DAG)) can be constructed in real-time. Further, pairings representing relationships among resources may be evaluated for current applicability (see pairings below) in constructing the DAG. As such, construction of the DAG is conditional on the real IT environment. Resources may be added to or removed from the RS (see change scope below) and subsequently reflected in DAG constructs of the RS, as they may be constructed in real-time, as needed for BR processing.

d. Redundancy Groups (RG)—"Use of Redundancy Groups in Runtime Computer Management of Business Applications," (POU920070113US1), Bobak et al., which is hereby incorporated herein by reference in its entirety.

A Redundancy Group is a named entity composed of the identity of a set of resources of the same type. A RG may have an associated state defined by a rule. The rule may be composed of logical operators (AND, OR) and state or property values of resources in the RG. One aspect of the RG is making a dynamic selection of targets from the RG for system and subsystem operations.

e. State—"Use of Multi-Level State Assessment in Computer Business Environments," (POU920070114US1), Bobak et al., which is hereby incorporated herein by reference in its entirety.

The BR system provides for a state to be associated with entities, including individual resources, Recovery Segments, BR managers and Redundancy Groups. The state of an entity may be defined by a rule. The rule may be constructed of logical operators (AND, OR) and data items. For example, the state of a resource may be defined based on property values associated with the resource or the state of a resource, or a RS state may be defined by the property values associated with resources or the state of resources associated with the RS. As state may be influenced by property values or state of resources, it may change as the data items in the rule change in value. Therefore, state is dynamically assessed based on the real-time values of property values and resource state. Changes to property values and resource state may be detected by the BR system either through events reported to the BR system or through requests for resource data periodically made by the BR system (see Monitor and CR below).

f. Pairings—"Conditional Computer Runtime Control of an Information Technology Environments Based on Pairing Constructs," (POU920070110US1), Bobak et al., which is hereby incorporated herein by reference in its entirety.

Relationships between resources may be represented to the BR system in a programmatic manner through a construct termed a pairing. A pairing identifies a first and a second resource. There may also be an operation, state or property value associated with the first or second resource. The relationship between the first and second resource of a pairing may be encoded in a rule reflecting the relationship. For example, the rule may be for operation ordering, or for the effect an operation can have on a resource state, or the effect change in state or one resource can have on another or the same resource. Associated with each pairing there may exist a trigger condition represented by an expression composed of one or more logical operators (AND,OR) and one or more of, for instance: property values associated with a resource; state of a resource; state of a RS; state of a RG; PSE currently associated with a RS. BR system processing utilizes pairings in many run-time processes including, for instance: evaluation of resources, RS and RG state (see State above); forming sets of resources related to an outage (see Recovery below); forming preparatory processes (see Validate below); determining acceptability of a recovery process (see Recovery below). In the cases where a pairing is used within the BR system, real-time evaluation of the applicability of the pairing is made through evaluation of the trigger using current, real-time values of data items referenced in the trigger rule.

g. Template—Defining and Using Templates in Configuring Information Technology Environments," (POU920070109US1), Bobak et al., which is hereby incorporated herein by reference in its entirety.

Assistance for defining constructs related to the BR system may be provided and utilized by customers and/or vendors. While RS, RG, pairings and configuration choices for BR components can be achieved without assistance, best practices may be provided in the form of templates. If chosen to be used, templates and associated pattern matching techniques for definition of RS, RG and pairings may provide guidance while further providing a programmatic expression of experiences. Likewise, placement of BR system components, including BRM and RS components, can be assisted through templates and pattern matching logic providing recommendations for hosting environments. Template processing takes as input the customer configuration in terms of resources, relationships and hosting environments, which may be represented in a variety of ways including potential definition in a customer CMDB, definition in a customer database or file system or expressed in various management components, such as CIM or SNMP.

Pattern matching logic is applied to the customer environment and the relevant templates resulting in recommended configuration choices. Templates may be extended by the customer to represent best practices of their environment. Conditional pattern matching may be achieved through selection of resource property values when determining if a resource matches a similar type resource in a template. Pairings, RS and RG constructs suggested by template processing may further be adapted to the customer environment though specification of trigger and state rules, which direct BR system execution (see State and Pairing above).

2. Preliminary a. Validate—"Programmatic Validation in an Information Technology Environment," (POU920070111US1), Bobak et al., which is hereby incorporated herein by reference in its entirety.

Defining and validating the achievability of a goal, such as an availability goal, may be performed manually or through use of the processing described in the above-referenced co-filed patent application. Defining, for instance, an availability goal includes associating a quantitative goal, such as a Recovery Time Objective (RTO), with a business application. In one implementation, a business application is represented programmatically by a Recovery Segment (RS).

When a goal is associated with a business application, it is desirable to predict whether or not that goal is achievable. That is the responsibility of validation. Validation could be done by human inspection of the resources supporting the business application, followed by an analysis of recovery operations those resources may support and a further analysis of the ordering and execution time of the set of recovery operations.

The validating process referenced herein is programmatic and performs the following steps, as an example: A goal in the form of a policy is specified by the BR administrator through the BR provided User Interface (UI). Additionally, a representation of the customer environment may be specified, as in one implementation, through a PSE, and a representation of the business application is specified, as in one implementation, through an RS. A worst case scenario in which recovery for all resources associated with the RS is used to determine if the goal is achievable. Recovery operations for each resource and the execution duration time for each recovery operation could be specified through a file or database table. Alternatively, recovery operations and related execution duration times, in the context of a particular customer environment, may be associated with a PSE. Further, recovery operations which result in a resource becoming available from a failed or degraded state may be represented through pairings. A technique for selecting a recovery operation is employed. One such technique may be selection from potential recovery operations the one recovery operation having the smallest operation execution duration time.

Having selected recovery operations for resources supporting the business application, any dependencies those operations may have on other operations are identified. This identification could be through specification of dependencies in a file or database table. Alternatively, operation ordering dependencies may be specified through pairings. Operations which are depended on are added to the set of recovery operations. Subsequently, any ordering dependencies among recovery operations in the set are identified and used to sequence operations. Ordering dependencies may be specified through a file or database table. Alternatively, ordering dependencies may be specified through pairings. From the ordered set of operations, a total recovery time may be calculated manually. Alternatively, a programmatic representation of the recovery set of operations may be generated in the form of a Gantt chart from which the maximum time for executing the sequence of recovery operations may be determined.

In order to validate the achievability of a quantitative goal, such as an availability goal, it may be necessary or desired to evaluate the preconditioned state of the IT environment. Preconditioning may include specific actions taken on each resource. For example, establishing a flash copy set for a storage resource, establishing an active data sharing environment for a database resource, or establishing a level of redundancy in containers supporting application logic. Manual inspection of the IT environment may be performed to make the evaluation and to identify preparatory actions to make achievement of the availability goal possible. Alternatively, in accordance with an aspect of the present invention, a programmatic technique is used to evaluate and achieve the preconditioning. Changes may occur in the scope of resources associated with a business application or with the goal to be achieved for availability. Should such changes arise, revalidation may be performed. Detection of the need for and execution of revalidation could be performed through human intervention. Alternatively, synergistic processing with change in scope and change in goal (see Change in scope and Change in goal below) processing can be used to detect and enable revalidation of achievability for an availability goal and initiation of any required actions to prepare the IT environment.

b. Preparation—"Dynamic Selection of Actions in an Information Technology Environment," (POU920070117US1), Bobak et al., which is hereby incorporated herein by reference in its entirety.

The current state of resources is determined and used in conjunction with preparatory effect pairing constructs to determine if the current state of a resource can meet the recovery goals or if operations to alter the current state of the resource, preparatory operations, are needed to enable achievement of the recovery goal. Where preparatory operations are required, precursor operations and dependencies among the set of operations is determined using pairings. The set of preparatory operations may then be formed into a workflow and provided to the customer for programmatic execution or manual execution. After the IT environment has been altered by a set of preconditioning actions, a subsequent validation of achievability for the goal detects the alterations resulting in a potentially different set or a null set of preconditioning actions.

In the cases referenced above where pairing constructs were utilized, those constructs may be conditionally included in BR system processing based on trigger rules and real-time IT environment conditions.

If preconditioning actions (a.k.a., Preparatory processing) are used, some of the preparatory operations may fail to execute correctly. Should a failure of a preparatory operation occur, the IT environment may need to be returned to the prior state. An undo set of operations may be formed and executed manually through human intervention. Alternatively, a programmatic formation of an undo workflow process to be conditionally executed may be used, should a preparatory workflow result in failed operations. Formation of the undo workflow uses pairing constructs to identify undo operations.

When an IT environment has been preconditioned through preparatory actions to assure achievability of a goal, it is monitored, in one example, to insure prepared resources do not become changed such that the goal would fail to be achievable. Monitoring of the prepared environment may be achieved through manual, human intervention or through monitoring associated with individual products and coordinated by the customer. Advantageously, programmatic monitoring of the prepared environment is provided through the BR system.

c. Workflow Templates—"Using Templates in a Computing Environment," (POU920070126US1), Bobak et al., which is hereby incorporated herein by reference in its entirety.

One way in which sets of operations may be presented for execution from the BR system may be in industry standard, BPEL workflow definitions. Other alternatives exist including command files, scripts of operations or platform specific frameworks, such as NetView Clist (e.g., IBM® Netview for z/OS®). Where workflow processing is selected to support preparatory, recovery, return and other processing, templates may also be of use in assisting the customer or vendor to consistently follow best practices. Workflow templates may be provided by vendor(s) or customer(s) as use of industry standards to enable composition of multiple individual workflow(s) into a larger single workflow. Being based on standards, a broad range of available tooling can be used for viewing and editing the workflows distributed as templates and workflows created for the customer based on the templates. Workflow templates can express best practices from vendor(s) or be customized to express best practices for an individual customer or location.

3. Real Time Mainline a. Monitoring—"Real-Time Information Technology Environments," (POU920070120US1), Bobak et al., which is hereby incorporated herein by reference in its entirety.

Monitoring of the IT environment by the BR system takes place in support of achieving the quantitative goal, such as a RTO. In one example, two types of monitoring are utilized, explicit periodic requesting of resource data and subscription to resource services which provide event notification of changes to resource data. Various mechanisms are utilized in order to insure changes in resource data are detected. The event mechanism may have unbounded delays or errors which preclude delivery of notification regarding resource data change. Making periodic requests for resource data further provides the needed mechanism for real-time analysis of expected delays in request/response processing for resource data and in event delivery.

In one implementation, monitoring may be initiated at one of two points in time. The BR system supports a form of resource data gathering, termed observation mode, during which resource data is gathered, but BR management to a goal is not performed. Observation mode uses the explicit periodic requesting of resource data, termed periodic poll. Processing responses to explicit requests for resource data includes updating a cache of resource data; evaluating resources, RS(s) and RG(s) for state change; and logging returned resource data. Enabling observation mode may be performed before the point in time when active management to a goal is requested of the BR system. When active management to a goal is requested of the BR system, if observation mode has not previously been activated, observation mode is entered causing periodic requests for resource data to begin. Data gathered by the periodic poll process is recorded in a log for subsequent processing, as, for example, is performed in forming PSE(s).

In addition to periodic requests for resource data, when the BR system begins active management to a goal, the BR system subscribes to event notification services supported by resources associated with the RS. Through subscriptions to events associated with resource data, the BR system should be provided direct notification by the resource representation of changes to resource data.

Subscriptions for notification to the BR system of changes in resource data are discontinued when the RS is no longer managed to a goal. Observation mode may be discontinued if the RS is not being managed to a goal.

Monitoring by the BR system synergistically supports changes in resources associated with a business application as represented by a RS and changes to a quantitative availability goal.

When resources or relationships are deleted from the IT environment and are part of a RS, required resource data becomes no longer requested by the periodic poll process and subscriptions are removed from event services providing notification of alterations in resource data. When resources are added to the IT environment, the BR administrator is advised of the change as it may be desirable to add resources to a RS.

The monitoring process maintains a cache of resource data to be used by other aspects of the BR system. The cache includes, for example, data on resource state, resource property values, resource operation execution duration times and data regarding processor time, processor memory usage and I/O requests made by the resource. The set of resource data, which is gathered by periodic poll and for which event subscriptions are initiated, is created either when observation mode is initiated or when the RS becomes actively monitored for goal achievement. Resource state is always monitored, in one example, as are operation execution duration times for each operation potentially utilized by the BR system. Resource property values are monitored if they contribute to the composed state of a resource or the aggregated state of a RS or RG. Resource property values are also monitored if they are utilized in evaluating pairing trigger conditions.

As changes to resource data are received, either through the periodic poll process or through event notification reflecting change in resource data, an evaluation is made regarding any alterations to resource state, RS state or RG state. If changes to resource data result in a resource or RS becoming failed or degraded, as assessed based on the composite state of the resource or aggregated state of the RS or RG, error detection processing is initiated to begin the logic for determining what recovery actions should be taken.

The interval on which periodic poll requests for resource data are initiated may be altered by the customer.

b. BRAD—"Managing the Computer Collection of Information in an Information Technology Environment," (POU920070121US1), Bobak et al., which is hereby incorporated herein by reference in its entirety.

A mechanism is provided to gather resource data within a given time constraint when invoked either for periodic poll purposes or when invoked to gather resource data subsequent to an outage. When a RS is to initiate periodic poll processing, deployment of BRAD processing to manage resource requests local to the resource hosting environment is performed. For each hosting environment in which a resource associated with the RS exists, the deployed BRAD processing determines the number of resource requests to be made. An initial estimate of the number of concurrent threads to be used to complete the period poll resource request is made by the BRAD process. This initial estimate is subsequently monitored and adjusted based on real-time analysis of request completion and time required. A second pool of threads is created for request of resource data following an outage.

During ongoing operation, the list of resource(s) and associated resource data is reevaluated to determine if additions or deletions are required or desired. If resources are relocated and become associated with a different hosting environment, updates are made to maintain a local association of the BRAD requesting resource data and the hosting environment of the resource.

Periodic poll requests for resource data are spread out over the periodic poll interval by the BRAD distributor balancing the requirement to complete a poll cycle within the interval and spreading the requests over the entire interval to even the processing load. Batches of requests are made by dividing the total number of requests up into sets presented evenly over the poll interval.

Adjustments are made to various factors to optimize processing, meet periodic poll interval requirements and minimize overhead of the periodic poll process. These include, for instance:

Adjustment to initiation cycle of periodic poll.

Invocation of requests for resources not responding.

Alteration of number of query threads.

Alteration of number of requests per batch, batch size and pacing time for batches.

These processes work in conjunction with each process having an impact on others which is synergistically managed by the overall BRAD process.

The specified periodic poll interval is used as a staring point in determining the timing of batches. The number of requests per batch and the number of resources represented in the RS determines the number of batches. Based on the number of batches and the periodic poll interval, a microinterval for each batch is calculated. Actual time for the process may be longer or shorter than expected due to delays in request/response processing, delays in responses from resources and processing time for the logic. At the end of the periodic poll cycle, the actual time to complete the cycle is calculated. A ratio of the actual time to the desired periodic poll interval is calculated and used to scale the target periodic poll interval. Note that the target periodic poll interval is used as the reference point. The scaled periodic poll interval used in the logic is adjusted based on runtime characteristics of the system where the reality of the processing is empirically measured and compensated for by scaling the periodic poll interval for the next cycle.

Responses from BRAD processing include information from resources and an indication if a response from the resource was received before the microinterval timeout. On the next invocation of the BRAD from the periodic poll initiation process, those resources for which a response was not received are processed for threadpool execution first. Resources which responded in the last periodic poll cycle are processed and made available for threadpool execution after the resources which did not respond. This gives the non-responsive resources from the previous cycle priority and the full microinterval to complete as they have access to the threadpool first.

The number of query threads in the threadpool is initialized based on BR distributed calculations. The number of resources responding and the proportion of the interval used to receive all responses are used to adjust the threadpool size. If all resources have responded and not more than, for instance, 70% of the available interval time has been utilized, the number of threads in the threadpool is decreased. The threadpool is contracted at a rate of, for instance, 10% of the threads. This is a slow contraction process which employs multiple iterations to shrink the number of threads by half. If all resources have not responded, the number of threadpool threads may be increased. The increase is half the percentage of the difference between the number of requests in the batch and the number of resources not responding. If the percent of response not received is less than, for instance, 10% the threadpool is set to its maximum size which is equal to the number of requests in the batch. This is a relative rapid increase in the number of threads in order to quickly meet the needs of periodic poll processing. It is paced by the previous number of threads, the number of requests completing and the number of requests not providing a response. Therefore, it adjusts to start increasing rapidly when needed and slows as the target of completing the requests is approached. The limit to the increase in threads in the threadpool is the total number of requests in a batch. At that point, each request is initiated as soon as the cycle begins and has the full microinterval to complete.

Adjustments to the number of requests in a batch is paced to work synergistically with the adjustments to the threadpool number of threads. No change is made to the number of requests in a batch for the first, for instance, 10 iterations of the periodic poll cycle. If at the end of 10 cycles there are resources which are not providing a response, the threadpool adjustments to the number of threads will have practically reached stabilization at the number of threads per batch. The number of requests per batch is adjusted by, for instance, $1/3$. This lengthens the microinterval by $1/3$ allowing for a larger proportion of resources requests to complete. Adjusting the number of requests per batch also drives the threadpool number of threads processed. If the increased number of requests are not completing, the threadpool will have an increased number of threads. Consumption of the additional 33% of requests per periodic poll cycle will take the threadpool number of threads routine approximately 4 cycles to reach maximum threads per threadpool. Therefore, the number of requests per batch are adjusted at most every fourth poll cycle, in this example.

If all batches of requests respond before expiration of the allotted portion of the poll interval, the number of batches may be increased with a corresponding decrease in the number of requests per batch. The total of the not used by requests, that is the time difference between that in which the response arrived and the allotted portion of the poll interval, is maintained as responses to requests are received. The minimum response time is also maintained as responses to requests are received. If the total of the unused time is greater than the smallest response time, the number of batches is increased by one with a corresponding decrease in the number of requests per batch.

c. Timeline—"Management Based on Computer Dynamically Adjusted Discrete Phases of Event Correlation," (POU920070119US1), Bobak et al., which is hereby incorporated herein by reference in its entirety.

BR processing of errors is based on incoming state change notification for one or more resources. Each operational state change is evaluated for whether a new Containment Region (CR) or situation is to be created, or whether the error is for a resource that already has an association or pairing with some other impacted resource. BR maintains a balance between the one extreme of reacting too quickly to a failure notification and creating a separate CR for every failing resource, and the other extreme of waiting so long as to jeopardize the RTO of the various Recovery Segments involved and/or impacted by the failure. BR accomplishes this with the concept of an event correlation or timing framework. The predicates behind the design of the event correlation framework are that there will very likely be multiple and associated errors received as part of a failure, and that if BR can delay long enough to correlate events of the failure, it will have collected the largest possible set of impacted and related resources, and yet subsequently, build the fewest, but most efficient recovery processes possible for that failure.

Within the event correlation framework, BR aggregates/correlates related event (e.g., error) conditions. The window of wait time is dynamic, and built on the general time for communication with the resource during normal communication. Once the errors are accumulated into a given CR, additionally impacted resources are identified. The entire set is assessed for state, asynchronously, to ensure that BR makes decisions with the most current state available from a resource. Once the state is assessed, failed and degraded impacts are inspected to form a recovery process.

The timing framework includes discrete steps or phases (e.g., five), each of which may vary in duration. Techniques for adjusting the duration of time for each phase utilizes real-time data regarding the IT configuration, event notification of changes in the configuration, heuristic assessment of timing for event delivery, and data on processing time for creation and execution of a recovery set of operations, as examples.

From the time a first event (e.g., error) is reported to when BR begins gathering current state from impacted resources is termed interval T1→T2, with the point in time when BR begins gathering current state termed T2. The point in time from first reported event to when BR stops accumulating potentially related information (e.g., errors) for analysis is termed T3. BR provides, for instance, two techniques for determining T2 and T3. The default technique sets T2 at the average time required to gather query responses from all resources in the RS plus two standard deviations. By default, T3 is set to the maximum time any resource in the RS takes to respond to a query for state. An optional dynamic technique sets T2 and T3 based on the average time to gather state from all resources in the RS, the average time to build a recovery process for the RS and the projected time for execution of recovery operations included in the CR. A third option enables customers to specify T2 and T3 as either fixed time intervals or time intervals calculated from simple arithmetic operations on the average and standard deviation of resource response to query time.

d. Containment Regions (CR)—"Management of Computer Events in a Computer Environment," (POU920070118US1), Bobak et al., which is hereby incorporated herein by reference in its entirety.

A Recovery Segment with an active policy associated with it receives property state change events for any resource in it. Additionally, state of resources, RS and RG are evaluated during ongoing monitoring and periodic poll processing. Once the RS receives that event, it is to determine whether it is an indication of a failure or not. The RS makes that determination based on the pairing rules in place for the resources and relationships involved in the event.

The first event of a failure resulting from the state change on the Recovery Segment ensures the creation of a new CR. For each subsequent event, while the Recovery Segment is in a state that is not Available, the events flow immediately (in one example) to the BRM, which decides whether to create a new CR for the resource associated with that event, or whether to merge the resource into an existing CR. That determination is fairly straightforward—if the BRM notices that there is any overlap between an existing CR and the impacted resource list provided from the RS, those resources from the impacted list can be added to that CR (assuming of course that the timing interval for that CR is still open for inclusion of new resources—if it is closed, then a new CR is created.) If there is no overlap with any existing CR, then the BRM creates a new CR.

Once a time interval for gathering current resource status expires for any CR, the timing window for that CR is closed to incoming errors, and the resources for any other errors go into the formation of a new CR.

When an error or state change of a resource is received by BR, the RS assesses state. In addition, related resources that have not yet failed are evaluated for impact. During processing of events reported for resources in a RS, impact pairings are used.

This technique takes an input list of impacted resources, and outputs an ImpactedResList that includes one entry per resource with each entry, including, for example: Resource id, State, Aggregated State, Reason for Inclusion (either as a causing resource or resource made failed or degraded from a causing resource).

Using input resource, select the impact pairings.

For each impact pairing that is evaluated to be currently applicable, add the resource and related information to the ImpactedResList.

Note that only those resources that have a direct impact relationship to the resource identified in the event report are included in this assessment. This first level analysis is expanded before retrieving resource state to insure the resources impacted are included in the CR. Performing the first level of impact analysis at this point provides a means to find immediately related events for management of CRs, while not consuming excessive processing time to transverse the entire potential set of impacted resources on each reported event.

For each of the resources in the ImpactedResList, aggregated state is evaluated. The aggregated state is stored in the ImpactedResList and in the BR management data associated with the resource, as examples.

The first event of a failure resulting from the state change on the Recovery Segment ensures the creation of a new CR. For each subsequent event, while any CR is not in a Free state, BR decides whether to create a new CR for the resource associated with that event, or whether to merge the ImpactedResList for that event into an existing CR. BR examines the newly created ImpactedResList and the list of resources associated with any CR that has not closed processing to inclusion of new events. Overlaps in the newly created ImpactedResList and any CR open to inclusion of new events results in merging of the new event with one or more existing CRs. The CR with the oldest first event time is updated with the union of resources in merged resource lists. Any CR from which resources were taken to build the merged CR are returned to the free pool or marked for free pool return when asynchronous processing completes.

If there is no overlap with any existing CR, BR then creates a new CR.

As part of the processing to accumulate related events for root cause analysis, when a new CR is created, intervals are established for initiating gathering of resource state information and closing the CR to inclusion of newly reported events in order to meet specified goals, such as RTO goals. When CR(s) and a newly reported event are merged, those intervals are re-established based on the updated view of resources related to the outage event being evaluated.

Processing for a CR includes gathering resource state information. If a CR has initiated gathering of resource state information, it may run to completion without further need of update, may have additional resources added to it via CR merge processing or may be flagged for return to the free pool if its contents were merged into another CR. For updates to the resource list, asynchronous resource state gathering is reinitiated in order to insure resource state is acquired after the time of latest event notification.

Prior to initiating resource state gathering, BR constructs a directed acyclic graph (DAG) from the collection of resources already associated with the CR. For each resource, BR retrieves the pairings relating the resource to other resources impacted, e.g., either failed or degraded. For each pairing, the trigger set of conditions are evaluated and if the pairing is applicable in the current environment, the impacted resource is added to the ImpactedResList and made a candidate for further pairing evaluation. As with the initial list of resources associated with the CR, added resources are represented as a set of elements including resource, state, aggregated state and reason for being included in the ImpactedResList.

When all pairings have been evaluated, the revised content of the CR is assessed against other CR(s) which are eligible for inclusion of additional resources. If required, CR(s) are merged, as described herein.

When an intermediary interval is reached, BR begins gathering state from the impacted set of resources to ensure their value for state is more recent than the last event received. The state information is to be verified explicitly since the eventing mechanisms may have an unbounded delay. In one embodiment, the information is not queried synchronously, since gathering state is performed in a time critical path, and queries that do not show a response are terminated in a time interval aligned with achieving the required RTO. These state queries are accomplished with the BR Asynchronous Distributor (BRAD). The output of the asynchronous build process is an array of resource states.

Resource state is gathered over an interval that correlates with the time BR calculated as acceptable for delay in gathering resource state information while still achieving RTO goals. For resources failing to respond within the allowable time interval, BR utilizes the last state retrieved through periodic monitoring or event processing. BR marks the potentially stale state for consideration in building recovery actions.

Additionally, if during this asynchronous build process, if the BRM detects that there are overlapping resources in multiple CRs, which indicates that errors have been detected that impact related resources, the two CRs are merged into a single CR. The CR with the earliest start is preserved, the contents of the other are merged into it, and the extra CR is emptied and is ready to be reused (i.e., its state changes to Free).

As part of this asynchronous query build process, if it is detected that resources in the CR impact other resources such that they become failed and/or degraded (based on operation impact pairing rules), these impacted resources are added to the CR, as well as help in the creation of the recovery process. This is referred to as the ballooning of the CR.

When the time interval set by BR as the maximum delay for including new resources in the CR is reached, the timing window for that CR is closed to incoming errors, and the resources for any other errors go into the formation of a new CR. At the close of the timing window for a CR, the operational state of the resources in the CR may have already been collected from asynchronous processing initiated earlier. Collection of resource state may be ongoing and not completed in which case completion of the asynchronous resource state gathering continues with the time limit previously established on responses to resource state queries. If resource state gathering has not been initiated at the time of closing the timing window, BR begins the asynchronous resource state collection process.

e. Recovery—"Defining a Computer Recovery Process That Matches the Scope of Outage," (POU920070124US1), Bobak et al., which is hereby incorporated herein by reference in its entirety.

Containment Region data formulated in the foregoing processing steps may be used to form a set of actions to alter the IT environment. For example, if outage events are used as the basis for CR formation, a recovery process may be constructed to alter the IT environment to restore a business application's service. If performance degradation related events were used as the basis for CR formation, a set of operations to alter the performance of the IT environment may be created.

As an example, recovery process formation may take one of many forms. A customer could take the data formulated in the CR and evaluate the implications of changes in resource state and property/values to manually construct a plan of action to restore IT services. Alternatively, the contents of the CR can be made available to each of the resources contributing to delivery of a business application for evaluation and independent recovery processing. A further alternative may be use of the CR content to programmatically form a recovery process by the BR system, as described in the following.

The process of creating a recovery process is based on a sequential and aggregative series of steps. For example:

1. A CR may be populated with the failing resource and any impacted resources based on the state assessment rules, as described herein. Recovery processing operates on the basis of the input list of resources for evaluation. If the techniques of CR processing are utilized, further advantages are gained in achieving recovery time goals and in correlating related failures.
2. Processing which delays for accumulation of errors may be followed by evaluation of the environment to determine if additional resources should be included in the evaluation of the outage, as described above.
3. Just prior to invoking recovery processing, current resource state may be retrieved, as described above.

At this point in time, the BRM has the following information available to it to generate a recovery process:

1. A list of resources which may be failed or degraded. In one implementation, this list may be included in a Containment Region, and in particular, be represented by the CR. States array.
2. Resource relationships reflecting the impact a failure or degradation of one resource can have on other resource(s). In one implementation, this may be provided by impact pairings in the BRRD.
3. Operation ordering information indicating between two operations on the same or different resources if one operation is required to come before or after the other. In one implementation, this may be provided by operation ordering pairings in the BRRD.
4. Operation effect information indicating what execution of an operation on a resource may be to the state of the same or another resource. In one implementation, the information may be provided by operation effect pairings in the BRRD.

5. Order for operation escalation when a recovery operation fails. In one implementation, the information may be provided by Order and Vorder fields within the operation table.

The steps used to create a recovery process include, for instance:

1. For nonresponsive resources, determine if there is an operation to be invoked to place the resource in a determinate state. Iteratively process the one or more DAG(s) representing resources in the CR under evaluation for recovery processing from the root to the leaf nodes. Perform at most one operation to achieve a determinate state for each distinct branch of the DAG.
2. When all determinate actions on non-responsive resource have been undertaken, evaluate the DAG from root to leaf nodes. For each distinct branch of each DAG, perform one recovery operation for a failed or degraded resource.
3. For each iteration of the recovery process, invoke a routine to determine the set of dependent operations to be included in the set of recovery operations invoked.
4. For each iteration of the recovery process, invoke a routine to assess constraints on operations impacting resources supporting two or more business applications.
5. Invoke a routine to submit the recovery operations for each iteration of the recovery process. Activities to monitor the execution of the recovery operations are provided.
6. Monitoring of activities in the recovery process determine if additional iterations of recovery processing are required or desired or when recovery processing has succeeded in making the IT environment available.

4. Change
a. Change Scope—"Non-Disruptively Changing Scope of Computer Business Applications Based on Detected Changes in Topology," (POU920070125US1), Bobak et al., which is hereby incorporated herein by reference in its entirety.

The set of resources associated with a business application as represented by a RS may change over time. Additional resources and relationships may be added or resources and relationships may discontinue support for a business application. Alternations to the constituent set of resources supporting a business application is generically referred to as change in scope of the RS.

When the scope of a RS is altered, synergistic processing across the BR system insures continued, consistent management of the IT environment. In particular, change in RS scope may result in, for instance: revalidation of one or more goal oriented policies; reassessment of prepared state of the environment; alteration to the set of resources for which monitoring collects resource data; alteration to the set of resources and resource property(s) subscribed to for event notification; recalculation of the operation execution duration for resource operations associated with the RS and current PSE; alteration to the rules for RS and RG state aggregation; alteration to the rules for resource state assessment; alteration to the trigger conditions for pairings; changes to sharing of resources with corresponding change to delegation of processing of resources; changes to the constraints on the impact one business application can have on others.

b. Change Goal—"Non-Disruptively Changing a Computing Environment," (POU920070122US1), Bobak et al., which is hereby incorporated herein by reference in its entirety.

A quantified management goal associated with a business application as represented by a RS may change nondistruptively to ongoing IT management, as for example, in the BR system. A change to the goal is supported by synergistic processing across the BR system. In particular, a change in goal may result in some or all of the following, for instance: revalidation of one or more goal oriented policies; reassessment of prepared state of the environment.

In particular, changing the goal may result in the need to alter the prepared state of resources associated with the RS, which is referred to as changing stringency. If the goal changes such that recovery time is to be lessened, a more stringent condition on the preparedness of resources may result. If the goal changes, such that the recovery time is allowed to increase, a less stringent condition on the preparedness of resources may result. For less stringent prepared conditions, the state of a resource is not changed by the BR system without direct intervention by customer personnel. In particular, if the change in goal results from a change in business cycle, it is likely that the less tolerant goal will be reestablished on a periodic basis making it undesirable to lessen the preparedness of resources. If altering the goal results in a more stringent condition, it may be possible to prepare the resources associated with the RS to meet those conditions in a nondisruptive manner. Where this is possible, the BR system creates processes to achieve the altered state of preparedness for direct execution or potential customer modification and approval. Where altering the preparedness of resources cannot be achieved in a non-disruptive manner, BR initiates interaction with the BR administrator.

c. Megaflow—"Adaptive Computer Sequencing of Actions," (POU920070106US1), Bobak et al., which is hereby incorporated herein by reference in its entirety.

Complex operations, for example, changing the scope of a RS, require coordination of multiple individual tasks. Each task may be transactional and may complete normally or abnormally. Best practices for performing such complex task may be encoded in logic directing task sequencing and evaluation of task completion with subsequent task invocation altered by previous task completion status. Sets of tasks and associated coordination based on task completion may be referred to as megaflows.

A megaflow may include interaction with the customer personnel through services which may include UI interaction and mailbox processing. UI interaction may be based on any of the frameworks available in the industry, such as the Eclipse framework. The mailbox may be implemented as a database table to which BR task processing, the UI framework and customer personnel have accessibility.

Megaflows may have extended execution duration, e.g., over hours or days. As each task may be transactional, the long running megaflows do not interfere with BR system operation. Coordination among tasks is provided and allows for long term execution through persistence of task completion status and corresponding mailbox implementation utilizing database technology.

5. Enforcing Priorities
a. Constraint—"Managing Execution Within A Computing Environment," (POU920070115US1), Bobak et al., which is hereby incorporated herein by reference in its entirety.

Constraints a customer wishes to have enforced for the impact one business application can have on another business application may be expressed as constraint pairings, in one implementation. Alternately, they may be expressed in a table that describes the business application to application relationship. In one implementation, a business application is represented by a RS. When a RS is defined, resources are associated with the RS. If a resource is shared among two or more RSs, there exists the possibility for conflicts in recovery decisions as the resource is associated with two or more business applications which may have different Recovery Time Objective (RTO) goals. Determination of recovery actions is performed by BR for shared resources utilizing the context of the business applications which are utilizing the shared resource.

Constraint pairings are utilized by BR after an error has been analyzed and operations to perform recovery for the error have been selected. Information on pairings is used to specify the effect executing an operation on a resource can have to the state of the same or another resource. Specifically, operation effect pairings enable vendors (e.g., IBM® and others) and customers to reflect a future state of a resource as a result of potential execution of a resource operation. Operation effect pairings are used to support constraint pairings, as the future state of one RS as the result of execution of a recovery process are realized by BR through operation effect pairings.

Constraint pairing analysis is undertaken by the BRM after the Containment Region (CR) has been built and recovery operations selected. For each constraint pairing where a RS associated with the CR is referenced, BR assesses the impact to RS state. Assessment of constraint pairings follows assessment of operation effect assessment. Operation effect assessment determines states of RS(s) which occur as the result of execution of operations in the recovery process. For each constraint pairing which references a RS impacted by the recovery indicated in the CR, BR assesses the constraint pairing. If recovery is not allowed based on the constraint pairings, BR logs the CR and associated error and recovery information, notifies the BR administrator through the mailbox and leaves impacted resource(s) in state(s) resulting from the error.

b. Delegate—Conditional Actions Based on Runtime Conditions of a Computer System Environment," (POU920070116US1), Bobak et al., which is hereby incorporated herein by reference in its entirety.

A structure of resource and resource relationship information is utilized in support of BR processing to determine, for example:

If a resource is capable of performing error assessment and taking error recovery actions.

If a resource is capable of providing recovery operation execution times.

If a resource is capable of having BR directly alter configuration parameters to achieve recovery time objective (RTO) goals.

If a resource is capable of altering configuration parameters to meet an apportioned portion of an overall RTO goal for the business application.

If such a resource is shared between two or more business applications.

BR performs analysis of resource capabilities and based on resource capabilities and the current runtime environment:

Apportions an increment of overall business application RTO goal to the resource.

Utilizes interfaces to direct the recovery actions of a resource capable of having recovery assessment and actions delegated to it.

Detects changes in the environment which make the resource shared and alters the actions of a resource capable of being delegated to.

Gathers recovery operation execution timings for subsequent use in validating RTO objectives and in constructing preparatory and recovery workflows.

Functional capabilities of a resource are expressed as BR management data on the resource. A resource which is capable of being delegated recovery assessment and recovery actions are to support one or more of multiple interfaces including, for example:

1. The ability to surface recovery operation execution times.
2. Enablement and disablement of delegated responsibility for performing error assessment and error recovery.
3. Accept apportioned RTO goal for independent action by the resource when delegated to by BR.
4. Interfaces to alter configuration parameters directly at the request of BR (e.g., change log checkpoint frequency to 6 seconds).
5. On directive by BR, perform alteration of necessary configuration parameters by the resource (e.g., alter processing to achieve 10 second recovery time which causes the database subsystem to alter log checkpoint frequency to 6 seconds).

Resources which can be shared by two or more business applications may enable two interfaces if those resources support delegation for independent error assessment and error recovery. One interface indicates that the resource is capable of being delegated to. An interface may be provided which accepts specification of an apportioned RTO time for the resource to attempt to achieve. Another interface which supports enabling or disabling of recovery decision and recovery action taken by the resource may be provided. BR examines each resource in a RS when the RS is made actively monitored for RTO goal management. For resource(s) which support being delegated to, BR attempts to determine what the apportionment of RTO to the resource can be while still meeting the overall RTO for the RS. BR determines if the resource is associated with a single RS or multiple RS(s). If a resource is associated with a single RS and supports being delegated to, BR utilizes the resource supported interface enabling delegation when the RS is made actively monitored for RTO goal management. Otherwise, BR does not enable the resource for delegated recovery decision and recovery action processing. If a resource becomes shared between two RSs by being added to a RS, BR utilizes the resource supported interface disabling delegation to the resource.

6. Support Services a. Serialization—"Serialization in Computer Management," (POU920070105US1), Bobak et al., which is hereby incorporated herein by reference in its entirety.

In managing an IT environment and the resources related to a set of business applications, the various management disciplines differentiate among the priority of processes that are handled by the management components themselves. Capabilities provided by BR are described as flows which have an effect on the IT environment, are initiated by some person performing some role or triggered by some event and which have a set of data objects that are referenced, updated or caused to materialize or dematerialize. Each of the possible BR flows falls into one of four broad categories, which are generally a reflection of importance or urgency.

The four categories of flows are, for example:

Category 1: Critical recovery processes including formation of Containment Regions, building of recovery workflows, execution of recovery workflows, monitoring of recovery workflows and other flows directly associated with these functions.

Category 2: Monitoring processes to detect changes in the environment which require evaluation and potential initiation of recovery processing.

Category 3: Alterations to the environment via submission of preparatory workflows, monitoring of preparatory workflows, and flows related to this function.

Category 4: Flows which involve administrative definition and activation of change to the environment through administrative definitions. This is the largest single category and includes flows for policy definition and change, flows for Recovery Segment definition and change, flows for altering metadata associated with resources and the flows for taking those definitions and making them current in the runtime environment.

A database table is utilized to record the execution of each type of flow. Category 1 flows update a count indicating how many, if any, are in execution. Category 3 flows update a count if it is initially 0 and if the Category 1 flow count is 0. This insures no Category 3 flow executes while a Category 1 flow is in execution, and it insures only one Category 3 flow executes at any time. Category 4 flows check to insure the count of Category 1 and Category 3 flows is 0 before beginning execution. Category 4 flows check to insure the count of Category 1 and Category 3 flows is 0 at periodic points during execution and terminate if those counts are not zero. Category 4 flows also access database records established to identify those transactions. In some environments, such as z/OS®, it is possible to directly terminate a transaction which is utilized when Category 1 or Category 3 flows begin execution and where currently executing Category 4 flows are identified through their use of the established database record. Category 2 flows execute at all times as they are designed to operate without blocking any other processing.

Changes in the BR environment, such as, for example, change in RS scope, may alter BR processing. A numeric representation of the version of a RS environment is maintained with the RS. This summary state is retrieved prior to execution of a Category 4 flow and evaluated for change when the Category 4 flow begins alteration of the BR environment. Any change in RS summary state causes the Category 4 flow to terminate. When the RS environment is changed as, for example, change in scope, the summary state is incremented. Through use of the summary state, Category 4 flows are enabled to execute concurrently where there is no interference in changes to be made to the BR environment, and Category 4 flows are sensitized to changes that would impact the process they perform such that they can be reexecuted.

b. Workflow—"Dynamic Generation of Processes in Computing Environments," (POU920070123 US1), Bobak et al., which is hereby incorporated herein by reference in its entirety.

The set of actions required or desired to precondition an environment for management or to manage an environment can be specified in a number of ways. During dynamic generation of workflows, steps in the workflow are created dynamically during various stages of IT management or preconditioning. These steps include, for example, a coordinated set of operations and staff actions. In one implementation, validating a quantitative availability goal generates a set of recommended actions to precondition the environment to support the goal, and these actions may be dynamically formulated into a workflow. In other examples, processing that handles change of quantitative goal, change of scope for business applications, and recovery processing to achieve a goal can also dynamically form workflows.

The following are aspects of the dynamic workflow implementation:

1. Dynamic generation of IT management workflows.
2. IT management workflows with transactional semantics.
3. Interleaving programmatic recovery or environment preparatory operations with staff interaction.
4. Workflows activated at appropriate trigger conditions in the system.
5. Conditional Execution of Activities in a Workflow.
6. Activities surrounded by pre- and post-routines to detect completion metrics and success/failure.
7. Handling of time related dependencies across operations on multiple resources.

c. BR Recovery—"Managing Processing of a Computing Environment During Failures of the Environment," (POU920070365US1), Bobak et al., which is hereby incorporated herein by reference in its entirety.

Components of a management system may fail, and often fail during critical management tasks. Recovering the IT management system itself is accomplished via dynamic selection of alternate components, preservation of ongoing processing that was being handled by the components at time of failure, addressing redundant failures of components, and preserving dependencies between management components when selecting restart hosting environments or OS.

In one implementation, the IT management system for which recovery processing is described is a system that performs availability management, and can itself have in progress recoveries at time of management system failure. In other implementations, the management system may be one related to performance management or configuration management. In the context of the example implementation, the BRM (Business Resilience Manager) is the primary runtime management component, and the set of resources used by a business application along with the relationships between these resources is described as a Recovery Segment (RS), where an instance of a RS is also the management component for the business application that it represents.

Recovery for failure of BR system components includes processing to recover the BRM, the RS, ongoing work that the BRM or RS may have had ongoing at time of failure, dependencies between a set of RS and BRM, as well as redundant failures occurring while recovering any of the components. The recovery is achieved through utilization of BRM monitoring of one or more RS, BRM group monitoring and restart processing which evaluates activity log records. Restarts of failed RS are requested by the associated BRM, and also utilize RS activity log records to detect which transactions have completed. The BRM instances of a monitoring group are notified when a monitored instance of a BRM fails. One of the monitoring BRM instances assumes responsibility for restarting the failed BRM using serialization of updates to a defined database record for coordinating BRM failure. The BRM assuming responsibility initiates restart processing for the failed BRM.

Restart processing for the BRM utilizes activity log data to reestablish BRM functionality. Activity log data for both BRM and RS instances includes records reflecting the beginning and the end of processes which entail multiple transactions or processes which are executed outside a transaction scope. Restart processing for BRM and RS instances read sequentially through activity log records noting where there are records for the start of an operation sequence with no matching end for the operation sequence. Restart logic includes steps for each such process which either roll back intermediate results or forward complete.

Activities and Examples

Described herein are a number of examples. These are not the only examples of activities causing adaptation of the management system. Others exist and these examples are not meant to be limiting.

One type of activity performed to adapt to a customer's environment changes what the IT management system does. Using the BR system as an example, the following activities may be characterized as changing what the BR system does in adapting to a customer's environment.

The BR system builds recovery processes in real-time based on an evaluation of failures and the relationships among failures. The recovery processes include recovery operations which are selected based on the failure, based on the goal, based on what resource may be operated on to restore operation of the business application and based on previous execution of recovery operations.

Templates may be used as representations of best practices. As templates and associated pattern matching logic evaluates the customer environment, the constructs formed, e.g., RS, RG, pairings, BR system topology, are based on the customer's IT topology. The resulting constructs then define what the BR system does in real-time management of the IT environment.

A second type of activity performed by an adaptive IT management system entails changing how the management system operates. Using the BR system as an example, the following types of processing exemplify changing how the BR system operates.

Preparatory actions may be used to place resources into a state from which the goal (e.g., availability goal) can be achieved when a failure occurs. Where multiple resources support a business application, there may be a variety of ways in which the goal could be achieved. How the goal is achieved is influenced by how the IT environment is prepared prior to an outage. The BR system selects preparatory operations which enable recovery operations to meet the goal. The IT environment may be altered by the customer in a set of iterative steps. At each step, the BR system reassesses what is required to prepare for availability or other goal. With each iteration, the previous alterations may result in changes in how the BR system conditions the IT environment for availability or other goal.

Monitoring of resources associated with a business application as represented by a RS is performed on a periodic interval. Each interval, the BR system evaluates how well responses for resource data have executed. How resource data is gathered is changed to achieve the independent objectives of getting all resource data in each interval and generating a consistent demand on the IT environment for retrieving resource data.

Part of adaptation to the customer environment entails a type of processing which is altered over time; i.e., it changes when the IT management system performs processing. Using the BR system as an example, the following processes typify changing when processing is performed.

Resource relationship information is encoded in a programmatic form within the BR system through the use of pairings. Associated with each pairing there may exist a set of trigger conditions expressed as a rule acting on real-time resource data. Throughout the BR system when a pairing is utilized, the trigger conditions are evaluated using real-time data. Based on the evaluation of the trigger rule, the pairing may or may not be applicable at the point in time BR processing is being performed. The trigger condition alters where the BR system takes action as pairings reflect many aspects of resource relationships including the impact one resource change in state can have on other resources, the change an operation can have on a resource, the constraints on impact one business application can have on others, etc.

In evaluating error conditions, the BR system delays for an interval to accumulate related outage events. It also sets an interval over which current resource state is gathered subsequent to the most current outage event of a related set. These intervals are dynamically determined based on the resources included within the outage set and based on the time required in gathering resource state data.

The actions taken by an IT management system may vary in location. Using the BR system as an example, the following processes change where they are performed over time.

The location selected to start an operating system varies depending on the presence of computer systems. Similarly, the location on which to start a subsystem changes over time depending on the presence of operating systems. When the BR system selects a recovery operation involving a start of an operating system or subsystem, the target of that start operation is determined based on the current state of resources, the currently applicable pairings for co-location of resources and the current state of redundancy group(s) and associated resources, as examples.

When a RS is defined and deployed, a location for the BRM associated with the RS is determined. The overall BR system environment may change over time in terms of the number and placement of BRM and RS components. Part of determining the placement of BRM and RS components is dictated by real-time system availability. Another part may be determined through best practices as templates reflecting preferential location for BR components. Part may also be determined through rules regarding having the same BRM for RSs which share a resource.

Why the IT management system performs a given function is to adapt to individual customer environments, IT and business, and is to adapt to changes in the customer environment. Based on the BR system, the following are a few examples of a processing type which changes why it is performed.

Active management of the IT configuration for availability by the BR system is dependent on having a expression of the customer environment. In one embodiment, this is expressed as a PSE. When the PSE changes, processing by BR also changes. Specifically, timings for operations may change and the applicability of pairings may change.

The value associated with a goal for an application, as expressed by a RS, may change. When the goal for an application changes, the actions taken by the BR system may change. For example, what operations are selected to achieve recovery may be altered given a change in recovery time. Likewise, the preparedness of the environment may change.

Taxonomy of BR Processes

The above types of activities are employed in many components of the BR system. Itemized below are examples of some of the specific processing features which enable the BR system to be adaptive.

Figure 9:
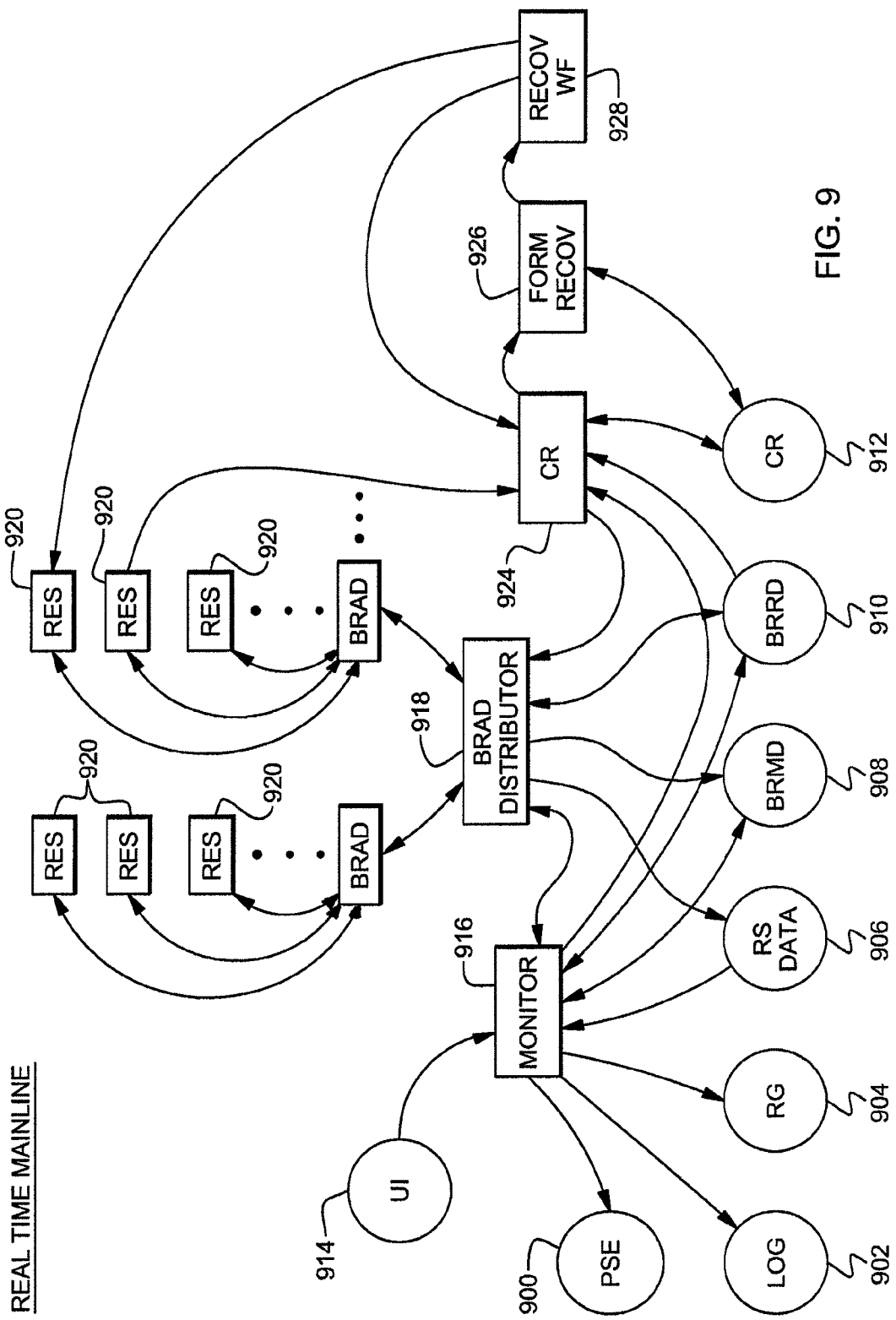
FIG. 9 depicts one example of an overview of various functionality of a business resilience system, in accordance with an aspect of the present invention.

PSE
Forming PSE(s) from observations of a customer's environment using cluster analysis tooling.
Use of observation mode records recorded to log for learning the customer's environment and resource operation execution duration.
Programmatic representation of business application cycles, criticality and timing.
Reflection of changes in operation execution duration.
RS
Addition and removal of resources from a RS.
Addition and removal of relationships associated with a RS.
Real-time evaluation of trigger conditions associated with relationships are encoded in pairings.
Provides the business application context for the other BR system processes.
State
Dynamic, real-time evaluation of RS aggregated state.
Responsive to change in RS state aggregation rule.
Dynamic, real-time evaluation of RG aggregated state.
Response to change in RG state aggregation rule.
Dynamic, real-time evaluation of resource composed state.
Responsive to change in resource state composition rule.
RG
Real-time representation of level of redundancy which may alter RG state or RS state.
Groupings of equivalent resources utilized in real-time for selection of start location when a resource operation requires a target.
Target of start operation based on real-time analysis of resource state.
Selection of start target based on real-time analysis of applicability of attract and repel co-location pairings.
Pairings
Addition and removal of parings during ongoing operation of the BR system.
Change to pairing trigger conditions with no disruption.
Programmatic representation of relationships reflecting customer IT environment.
Real-time evaluation of pairing trigger conditions at time of use determine applicability of relationship.
Validate
Predictive forecasting of achievability of goal.
Identification of IT environment changes required to meet goal.
Identification of prerequisite operations.
Operation ordering and parallelization of operation execution for achieving goal.
Construction of customized programmatic representation of operations.
Association of undo operations to operations used to prepare the IT environment.
Preparatory operations bound to IT configuration from which evaluation was made.
Customer capabilities for validation and modification of IT environment.
Dynamic selection of operations for preparatory, recovery and undo operations.
Real-time evaluation of triggers associated with pairings.
Responsive to additions and deletions from the RS.
Prep
Monitoring of prepare operations for success or failure.
Monitoring of prepared resource(s) for change in capabilities.
Initiation of undo operations if preparatory operations fail.
Detection of alteration to IT environment from validation of goal.
Timeline
Dynamically determine point to gather state from real-time operational characteristics of messaging.
Dynamically determine point to stop accepting related events.
May use previous recovery operation build times in setting time intervals.
May use projected recovery operation times in setting time intervals.
CR
Query for resource state performed after last related failure.
Reported or detected failures related through real-time evaluation of applicability of relationships.
Evaluation of resources contributing to the outage through relationships.
Assessment of state with real time resource property values and state.
Recovery
Dynamic real-time selection of resources and resource recovery operations based on IT environment.
Iterative execution of recovery process, each iteration altered by previous iterations.
Determination of root cause of outage from real-time assessment of resource capabilities.
Monitoring of recovery operations for success or failure.
Reassessment of resource state and RS state at each iteration of recovery processing.
Operation dependency, ordering and parallelism evaluated using real-time resource and relationship information.
Template Pattern matching logic applied to customer topology.
Formalization of predicting best practices for BR system constructs.
Customer or vendor creation and modification of best practices.
Extendable pattern matching logic based on resource property values.
Customization of recommended BR constructs including alteration of triggers for pairings, RS and RG aggregated state.
WF Template
Customer or vendor created specification of best practices.
Standardized representation of operation sequences and associated tooling compatibility for viewing and editing.
Composition of workflow activities building more complex flows from more simple flows.
Predictive application of best practices for operation sequences.
Serialization
Enable concurrency based on run-time events.
Terminate administrative flows and preparatory flows for more critical recovery flows.
Maintain summary state on RS to detect change in the IT environment and break binds with associated workflows.
Summary state enabling concurrent execution of administrative flows without blocking higher priority processes.
Constraint
Allowed and disallowed impact among business applications altered based on real-time application usage.
Impact among business applications enabled and disabled based on customer business cycle as reflected by PSE.
Dynamically determine if recovery operations are allowed based on real-time IT characteristics.
Change scope
Support addition and removal of resources to business application as represented by a Recovery Segment.
Support addition and removal of relationship to business application as represented by a Recovery Segment.
Enforce revalidation of goal achievability on change in RS constituent resources.
Enforce change in stringency for prepared environment.
Change Goal
Enforce revalidation of goal achievability.
Enforce change in stringency for prepared environment.
BRAD
Dynamically adjust number of resource requests in a batch—increase and decrease.
Dynamically adjust the number of batches in an interval—increase and decrease.
Alter ordering of resource requests within a batch based on previous success or failure to receive a response.
Monitor for resource failure to provide a response.
On alteration of interval, verify appropriate specification based on previous response percentage and batch characteristics.
Change microinterval for batch based on resource responses and interval usage.
Maintain timing for average and maximum response times.
Achieve local optimization through placement of process driving requests to resources.
Monitor for and adjust to change in resources associated with a RS.
Monitor for and adjust to resource location.
Monitor
Maintain cache of resource data used for pairing trigger evaluation and for non-responsive resource data requests.
Maintain lists of resource data to be retrieved for caching.
Responsive to additions and deletions of resources from a RS.
Workflow
Enable available tooling to view and change standardized expression of workflow.
Enable composition of complex workflow from more simple workflows.
Utilize transactional support of workflow runtime.
Support real-time construction of programmatic expression of sequences of operations.
Provide for compensation should workflow activities fail.
Extend base workflow framework with monitors for conditional execution of activities based on real-time evaluation of resource property values.
Megaflow
Enable customer and vendor use of programmatic representation of best practices for multiple tasks.
Modifiable by customer or vendor.
Self adapting based on runtime and previous step changes.
Integrated with User Interface.
Coordinated with UI through mailbox.
Support disjoint, time delayed steps.
DAG
Provide for real-time construction of DAG of resources supporting a business application.
Construction uses pairings conditionally based on triggers.
DAG construction supports addition and deletion of resources and relationships to a business application as represented by a RS.
Delegate
Changes real-time with resource sharing.
Support apportionment of goal.
Support addition and removal of resources and relationships to a business application as represented by a RS.
BR Recovery
Provide for peer monitoring which is dynamically adjusted.
Real-time programmatic selection of recovery instance for failure of BR component.
Programmatic assessment of BR processes being performed at the time of BR component failure.
Dynamic reinstatement of ongoing operations (e.g., RS monitoring; BRM coordination for RS).
Recursive failures provided for.
Real Time Mainline One way of viewing BR system functionality is to group Monitoring, BRAD, Timeline, CR and Recovery services as these provide the runtime management of the IT environment for achieving the quantitative goal (e.g., availability goal) associated with a business application. Referring to FIG. 9, data items may provide linkage to other groupings of BR system functionality, as described in each of the following sections. In particular, one implementation of the BR system utilizes data items including PSE (900), Observation Log (902), RG (904), RS (906), BR management data—BRMD (908), BR relationship data (a.k.a., pairings) BRRD (910), and CR (912).

A user interface (UI) 914 provides coordination with customer personnel and in particular is utilized to initiate monitoring functions (916), which are further described herein. Monitoring functions utilize BR system capabilities to request resource data, BRAD (918), which includes, for example, a distributor and the BRAD in each hosting environment. Resources 920 in the IT environment support a business application and are associated with a RS.

When run time conditions alter resource data or state, events may be received reflecting the change to a resource which initiate CR processing (924), as further described below. Monitoring of resource data may also initiate CR processing.

Analysis of changes in resource data by CR processing may result in initiation of processing to build a recovery process (926). The recovery process may be represented as a workflow (928), which has associated with it monitoring to evaluate changes made to the IT environment by the recovery process.

Further details regarding monitoring are described with reference to FIG. 10. Through the UI 1000, a request may be presented to initiate observation mode for a defined RS (1002). Steps taken to initiate observation mode include, for instance:
1. Establish poll intervals.
2. Initialize polling statistics.
3. Invoke RS monitor prep (1004).
4. Invoke Initiate BRAD processing (1006), described below.

Through the UI, a request may be presented to initiate active management of the IT environment to meet the quantified availability goal associated with a RS. One implementation of specification of a RS and associated BR system data items is described below. Processing begins with RS Monitoring of Resources (1008). Steps taken by RS Monitoring of Resources include, for instance:
1. If observation mode is not active
   a. Invoke RS monitoring prep (1004).
   b. Invoke Initiate BRAD processing (1006).
2. Invoke Activate Resource Delegation (1009), as described below.
3. Subscribe to events listed in RS.BRAD_list (1010).

Monitor processing to establish what data is to be retrieved from resources and what events are to be subscribed to for notification is performed by RS Monitor Prep (1004). Steps performed include, for instance:
1. From the resources associated with the RS build DAG(s).
2. From the root to the leaf node(s) in the DAG, create RS.BRAD_list.
   a. Resource state data to be collected.
   b. Resource operation data to be collected.

Having invoked Initiate BRAD processing, response messages are received including resource data resulting from periodic polling of resources. Response messages may be processed in one implementation by a Response to Periodic Poll Observation routine (1011). Steps performed include, for instance:
1. Update resource data maintained as a cache in the BRMD (which may be implemented as a DB2® table and which may be maintained in processor memory associated with database buffer pool(s)) including:
   a. Resource state;
   b. Resource property values;
   c. Performance related data, such as WLM data on processor utilization, memory utilization and I/O utilization; and
   d. Operation execution duration.
2. Update PSE related data including operation execution duration.
3. Assess RG(s) state utilizing returned resource data.
4. Assess resource state utilizing returned resource data.
5. For resources transitioning to a failed or degraded state, invoke CR Error Detect processing (1012), described below.

Having subscribed to event services for notification on changes to selected resource state and property values, notification on changes to resource data are presented. Processing of notification regarding change to resource data is performed by a RS Monitoring Notification routine (1014). Steps performed include, for instance:
1. Update resource property data maintained as cache in the BRMD.
2. Assess RG state utilizing resource data provided.
3. Assess resource state utilizing resource data provided.
4. For resources transitioning to a failed or degraded state, invoke CR Error Detect processing (1012).

The BR system performs monitoring of changes in the existence of resource instances associated with business applications for which IT management to a quantified goal is being performed. Changes may include addition or deletion of resources of a given type to the IT environment; these are generically referred to as topology lifecycle changes. The BR system processes notification of such changes through, for example, a Topology Lifecycle Change Notification routine (1016). Steps include, for example:
1. For add of resource instances or relationships, notify the BR administrator via the mailbox (1017).
2. For deletion of resource instances or relationships:
   a. Update the impacted RS.BRAD_list;
   b. Update pairing information containing reference to the resource or relationship in the BRRD;
   c. Update RG(s) containing reference to the resource;
   d. Update BRMD data to remove the resource;
   e. Unsubscribe to any resource data reflected in the RS.BRAD_list; and
   f. Remove references to the resource from:
      i. Pairing trigger conditions;
      ii. RG state rules; and
      iii. RS state rules.

Through the UI, the BR administrator may request active availability goal management for a RS be discontinued. A RS Deactivate for Monitoring routine (1020) may be invoked and perform the following steps, as examples:
1. Update RS state data.
2. Invoke the Deactivate RS Monitoring routine (1022) to make adjustments in resource delegation.
3. Form a DAG of resource in the RS from the RS.BRAD_list:
   a. If no resources in DAG, exit.
   b. For each leaf node in the DAG:
      i. Unsubscribe for monitoring of resource data as reflected in RS.BRAD_list.
      ii. Unsubscribe for resource lifecycle events (1010).
      iii. Remove resources from RS.BRAD_list.
4. Iterate.

Figure 11:
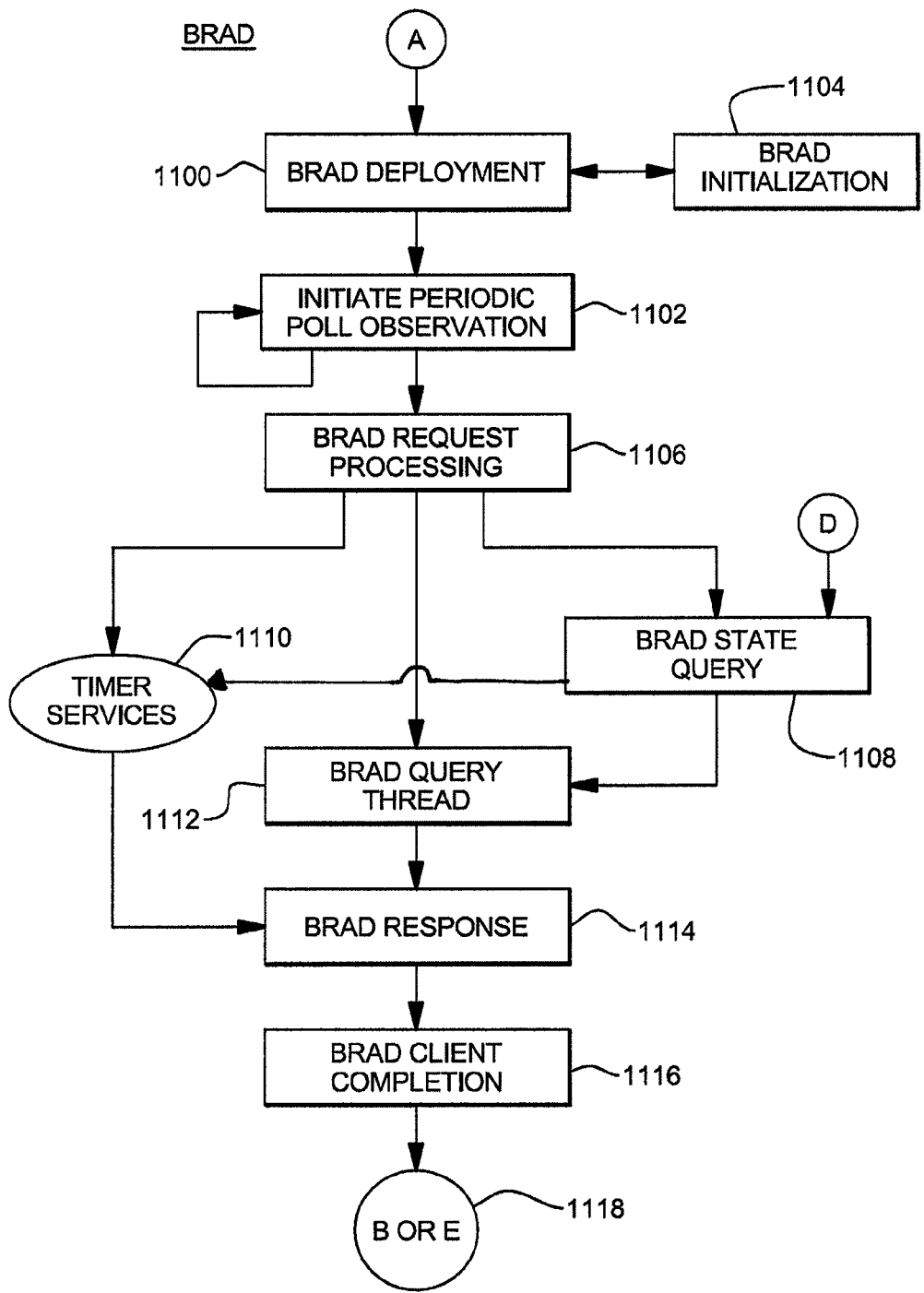
FIG. 11 depicts one embodiment of the functionality associated with BR asynchronous distributing processing, in accordance with an aspect of the present invention.

A capability for retrieving resource data including state, property values, operation execution data and performance data, such as WLM data on processor usage, memory usage and I/O usage, is utilized by the BR system. In one implementation, this is provided by the BR asynchronous distributor capability, an example of which is described with reference to FIG. 11.

When initially invoked, a BRAD deployment routine (1100) insures a BRAD capability exists in each hosting container where a resource associated with a RS being monitored or actively managed exists. Steps include, for example:
1. Instantiate a BRAD on each hosting container where a resource associated with the RS exists.
2. Initiate periodic poll (1102).

When a BRAD is instantiated in a hosting container, initialization is performed (1104), and includes the following steps, as one example:
1. Initialize statistics for periodic poll thread pool adjustment.
2. Build a thread pool for periodic poll.
3. Build a thread pool for state query.

Initialization of periodic polling (1102) for resource data includes the following steps, as examples:
1. Renew RS.BRAD_list to include any new resources or resources having changed hosting containers.
2. Calculate the number of batches to be processed during each poll interval.
3. Calculate the microinterval for each batch—how long each individual batch of requests may take to respond.
4. Set batch statistics for subsequent alteration.
5. Set current message TOD.
6. Iterate on making requests for resource data based on the RS.BRAD_list, one request to a given hosting container BRAD at a time with multiple requests (a batch).
   a. Delay processing for completion of the microinterval.
7. When all batches requests have been made, scale the poll interval to meet customer specification.

A request for processing a batch of resource data requests is received by the BRAD Request Processing routine (1106) from the above Initiate Periodic Poll Observation routine (1102). Steps performed include, for instance:
1. If a query for resource state is received, give control the BRAD State Query routine (1108) and exit.
2. Set a timer as indicated in the request message to force a response, if all requests for resource data do not complete in a timely manner (1110).
3. Initialize response area to be populated by BRAD Query Thread routines (1112).
4. Process non-responsive resources to previous request first.
5. For each request for resource data or until all threads are employed, initiate BRAD Query Thread on a thread from the periodic poll thread pool.
6. As threads complete, if additional resource data requests exist, reinitiate BRAD Query Thread on the thread for additional resource data requests.

A state query is initiated by the Asynchronous Query Build routine to retrieve current resource state data. The BRAD State Query routine (1108) performs the following steps, as an example:
1. Set a timer for responding if all requests do not complete in a timely manner.
2. For each request for resource state, initiate BRAD Query Thread (1112) using the thread pool for state query.

Individual requests for resource data are processed by invoking the resource interface from the BRAD Query Thread routine (1112). Steps performed by the BRAD Query Thread routine may include, for instance:
1. Make resource data request through the interface provided by the resource which may be synchronous to execution.
2. Update the BRAD response area (1114).
3. Adjust periodic poll thread pool size based on number of resource data requests completed, duration of time required for processing.

Figure 12:
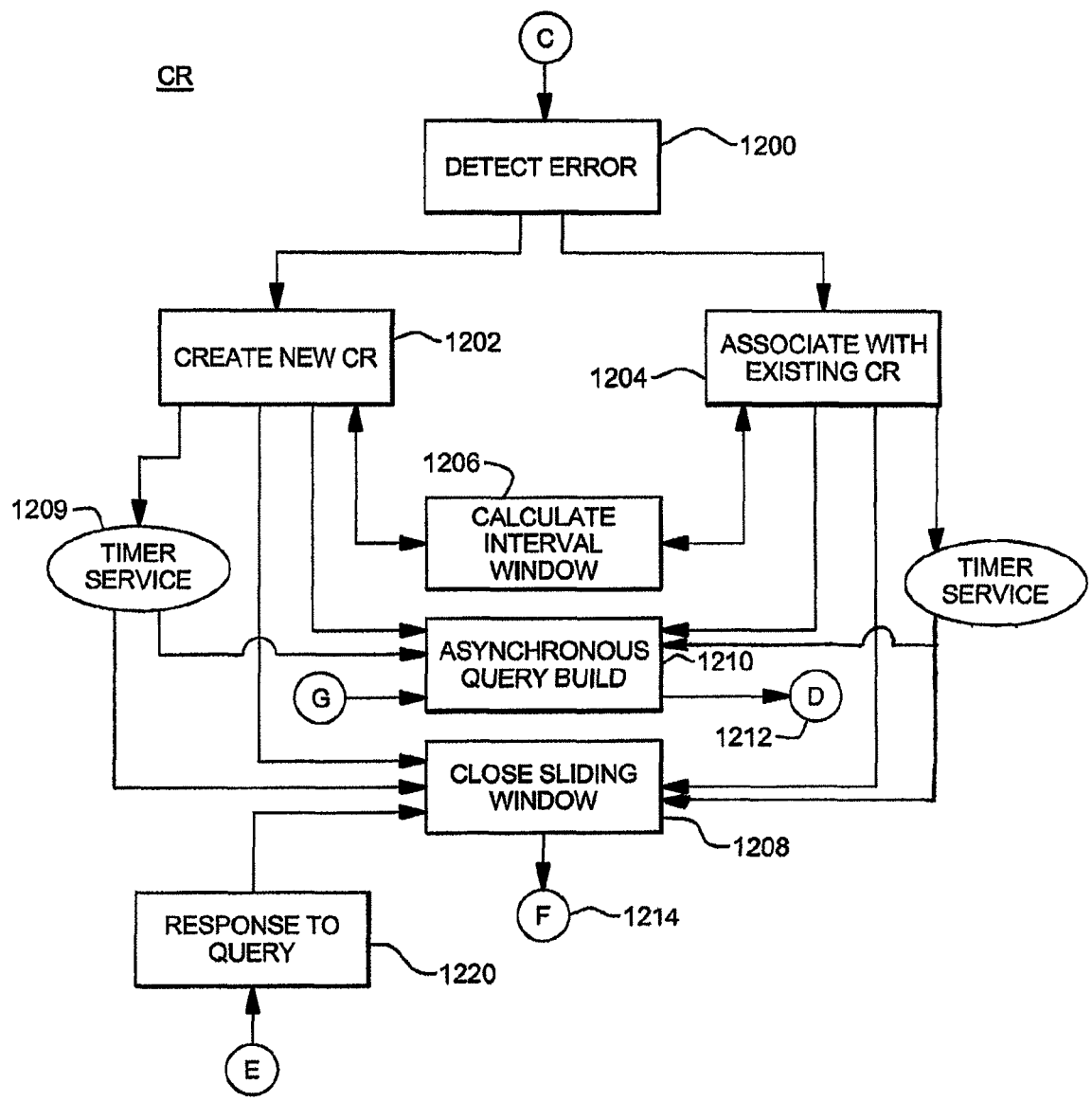
FIG. 12 depicts one embodiment of the functionality associated with containment region processing, in accordance with an aspect of the present invention.

Responses to BRAD requests for resource data are processed by the BRAD client completion routine (1116). Steps performed include, for instance:
1. Discard outdated response messages.
2. Update resource data statistics including maximum, average and count of responses.
3. Update batch wait time statistics.
4. On last response received:
   a. Update polling statistics;
   b. Track non-responsive resources so subsequent requests can process the non-responsive resource requests first;
   c. Adjust batch size based on non-responsive resource and duration of processing.
5. Invoke client completion routine (1118), either Response to Periodic poll (1011 of FIG. 10) or Response to Query (1220 of FIG. 12).

Changes in resource state may be assessed from data returned by periodic poll or data provided with event notification. Analysis of potential outages begins with the Detect Error routine (1200 of FIG. 12). The following steps are performed, in one example:
1. Initialize ImpactedResList with resource causing invocation.
2. Add impacted resources from pairings.
3. Update resource state and reason for inclusion in the ImpactedResList.
4. Determine if existing CR overlap by having the same resource(s).
5. If no CR overlap exists, invoke the Create New CR routine (1202).
6. If CR overlap exist, invoke the Associate With Existing CR routine (1204).

The Create New CR routine performs the following steps, in one example:
1. Initialize CR from ImpactedResList.
2. Invoke Calculate Interval Window (1206), as described below.
3. If T3 interval is expired, invoke the Close Sliding Window routine (1208), described below, and exit.
4. Set T3 interval timer 1209 to give control to the Close Sliding Window routine.
5. If T2 interval is expired, invoke the Asynch Query Build routine (1210), described below, and exit.
6. Set T2 interval timer 1209 to give control to the Asynch Query Build routine.

The Associate With Existing CR routine performs the following steps, as an
1. Select CR with oldest first event.
2. Merge CR resource data.
3. Delete deselected CR timers.
4. Free Deselected CR(s).
5. Invoke Calculate Interval Window (1206).
6. If T3 interval is expired, invoke the Close Sliding Window routine (1208) and exit.
7. Set T3 interval timer to give control to the Close Sliding Window routine.
8. If T2 interval is expired, invoke the Asynch Query Build routine (1210) and exit.
9. Set T2 interval timer to give control to the Asynch Query Build routine.

The Calculate Interval Window routine (1206) generates the timeline for processing of potentially related errors. Steps taken include, for instance:
1. Select the minimum RTO from impacted RS(s) associated with the CR.
2. If dynamic technique is to be used:
   a. Invoke Dependency Order Op, described below.
   b. Invoke Build Gantt, described below.
   c. Set Estimated45 from maximum time to execute recovery process from Gantt.
   d. Set Avg34 time from recovery process building history.

e. Set T3 interval from RTO less Estimated45 less Avg34.
f. Set T2 from T3 less maximum time for response to resource data request.
3. If fixed technique is to be used:
  a. Set T3 interval from maximum time for response to resource data.
  b. Set T2 interval from average time for response to resource data request.
4. If customer technique is to be used:
  a. Set T3 interval from customer fixed time or arithmetic expression on response to resource data statistics.
  b. Set T2 interval from customer fixed time or arithmetic expression on response to resource data statistics.
5. Return.

The Asynchronous Query Build routine (1210) invokes requests for resource state data subsequent to the latest failure integrated into the CR. Steps performed include, for instance:
1. Evaluate state of resources in CR using cached BRMD data.
2. Add impacted resources from pairings to the CR, include resources immediately impacted and cascading potential impacted resources.
3. Determine if any other CR overlaps with resources now contained in this CR.
4. If CR overlap exists:
  a. Select CR with oldest first event time.
  b. Merge CR resource data into the selected CR.
  c. Delete deselected CR timers.
  d. Free deselected CR(s).
5. Build a DAG.
6. For each DAG leaf node:
  a. Add all resources potentially causing the leaf node resource outage using pairings.
  b. Build a resource state query list for each BRAD.
  c. Invoke state query on BRAD (1212).

When the interval for incorporating additional events into the CR has expired, the Close Sliding Window routine (1208) is invoked. Processing steps include, for example:
1. Update any missing resource data from the BRMD cache.
2. Invoke the Form Recovery Process routine (1214), described below.

Responses to state query requests initiated by the Asynchronous Query Build routine are processed by the Response to Query routine (1220). Steps performed include, for instance:
1. Discard expired responses.
2. Update CR resource data with response message data.
3. Assess and update resource state.
4. Assess and update RG state.
5. Assess and update RS state.
6. If past T3 point in time, invoke Close Sliding Window routine (1208).

When related error events have been correlated and associated resource data gathered, the Formulate Recovery WF routine (1300 of FIG. 13) is given control. Processing performed includes the following steps, as one example:
1. Build a DAG from the resources and relationships in the CR.
2. For each DAG root:
  a. If resource is not responding to Asynchronous Query Build request:
    i. Locate operations to target non-responsive root yielding a determinate state for the resource.
    ii. Initiate execution of the set of operations targeting non-responsive DAG root resources.
    iii. Exit.
3. Process DAG from root to each leaf:
  a. If resource not processed and state not available:
    i. Invoke Pick_Op routine (1302), described below.
    ii. Add resource and operation to list of recovery operations.
    iii. Mark resources from current DAG position to leaf as processed.
  b. If resource state is available, move down DAG toward leaf.
  c. Iterate.
4. If list of recovery operations is null:
  a. Free the CR;
  b. Exit.
5. Invoke Dependency Order Operations routine (1304), described below.
6. Invoke Find_op_move_target (1306), described below, which determines a target hosting environment for start operations on operating system and subsystem resources.
7. Invoke Op_effect routine (1308), described below (see 1910—FIG. 9), which determines what the projected effect of recovery operations may be and if those effects are permitted by constraints on impact among business applications.
8. Build recovery process from ordered list of recovery operations by invoking the Build WF routine (1310), described herein.
9. Submit recovery process (1312) for execution.

Recovery operations to be performed are selected by the Pick_Op routine (1302). Steps to be performed include, for instance:
1. Locate potential recovery operations on the resource from operation data associated with the BRMD resource entry.
2. Add located potential recovery operations to candidate list saving ordering specification.
3. Locate operations on other resources which yield an available state for the resource being processed.
4. Add located potential recovery operations to candidate list saving ordering specification.
5. Retrieve preferred recovery operation from validation, described below.
6. Remove failed operations from the candidate list.
7. If preferred recovery operation(s) exist in the candidate list, make the candidate list and the preferred recovery operation(s) the same.
8. Remove candidate list operations not having minimum ordering specification.
9. Select recovery operation from the candidate list having minimum operation execution duration time.

When a start operating system operation or a start subsystem operation is to be performed as part of the recovery process, a target for the start operation is to be selected (Find_op_move target routine 1306). In one implementation, the BR system utilizes pairings reflecting desired resource co-location, either attract or repel, and redundancy group(s) reflecting equivalent resources in selecting a target. Steps include, for instance:
1. Build a list of target candidates driven off attracts co-location pairings for a subsystem (e.g., DB2® or CICS®) to an operating system, or an operating system to a computer system.
2. Remove from the target candidate set any resource based on repel co-locate pairings.
3. Remove from the target candidate set any resource not available and operational.

4. Enforce attracts co-locate pairings with some resource assigned a target driven off attracts co-location pairings for DB2® or CICS® to DB2® or CICS®, or operating system to operating system.
5. Enforce attracts co-location pairings where no target is assigned to any resource by minimizing the operation execution time for the set of resource operations requiring a target.
6. The technique concludes by assigning targets for resource operations based on iteratively assigning targets to resource operations where the target with the least number of potentially assigned operations is selected first.

As each recovery operation in the recovery process completes execution, the Recov_WF Monitor routine 1314 given control to assess operation execution results. Steps performed include, for instance:
1. Update recovery operation invocation statistics.
2. If operation failed:
   a. Save resource, operation identification in CR failed operations list;
   b. Exit.
3. Update recovery operation statistics and PSE statistics for operation.
4. Mark CR resource recovered if now available.
5. Exit.

The last operation in the recovery process gives control to the Recov_WF End routine (1316). Processing steps include, for instance:
1. If the RS is currently available:
   a. Free the CR;
   b. Exit.
2. Otherwise:
   a. Initialize the CR for Asynchronous Query Build invocation;
   b. Remove resources which have been recovered from the CR;
   c. Invoke Asynchronous Query Build;
   d. Exit.

Preliminary

Figure 14:
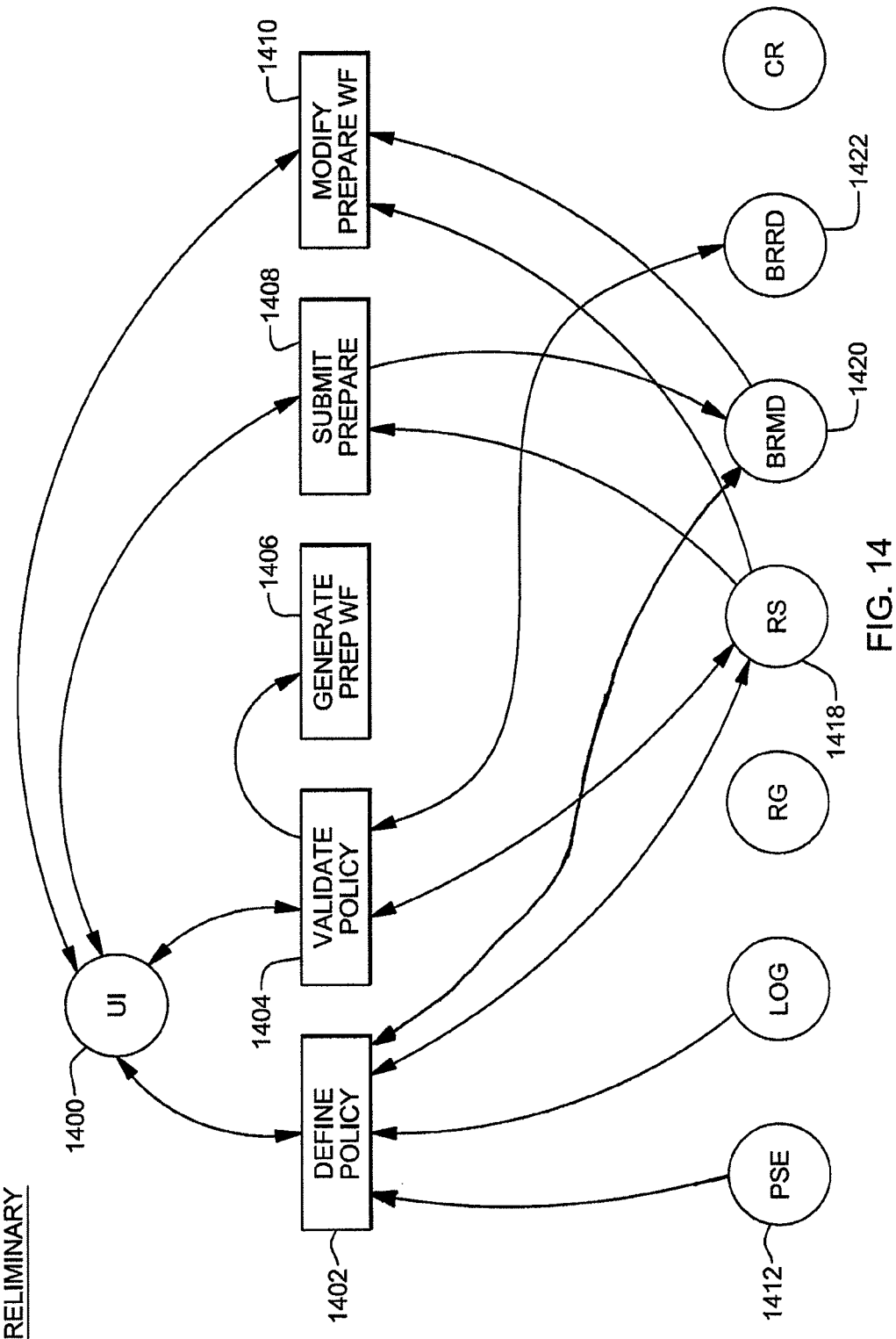
FIG. 14 depicts one example of an overview of functionality associated with preparation of the environment, in accordance with an aspect of the present invention.

Significant advantages are gained from the BR system if predictive forecasting and IT environment preparation for achievability of the quantified goal is utilized. Two functions provided include, for instance: validation of achievability of the specified goal; and formation and management of preparatory processes to condition the IT environment, such that the goal can be achieved when an outage occurs. These functions are described with reference to FIG. 14.

As one example, a quantified goal (e.g., availability goal) is defined through the User Interface (UI) 1400 as a policy (1402), as further described below. Validating achievability of the specified policy is initiated through the UI and performed by the Validate Policy routine (1404) further described below. Validate policy invokes the Generate Prep WF routine (1406) to cause preparatory operations, which conditions the IT environment for achieving the goal to be created, as further described below. Through the UI, the BR administrator may request the preparatory operations be submitted for execution (1408) as further described below. Modifications to the preparatory operations formed from the Generate Prep WF routine are made by the BR administrator through the UI by invoking the Modify Prepare WF routine (1410) further described below.

The Define Policy routine (1402) perform the following steps, in one example:
1. For the first policy associated with a RS:
   a. Calculate center of gravity for the input PSE 1412.
   b. For each observation:
      i. Calculate distance from observation to each PSE;
      ii. Associate the observation with the PSE having minimum distance away.
   c. Calculate operation execution duration for each resource operation for the PSE from the associated observations.
2. For each resource in the RS (1418):
   a. Update the BRMD with operation timing data.
3. Store the policy with the RS.

Figure 15:
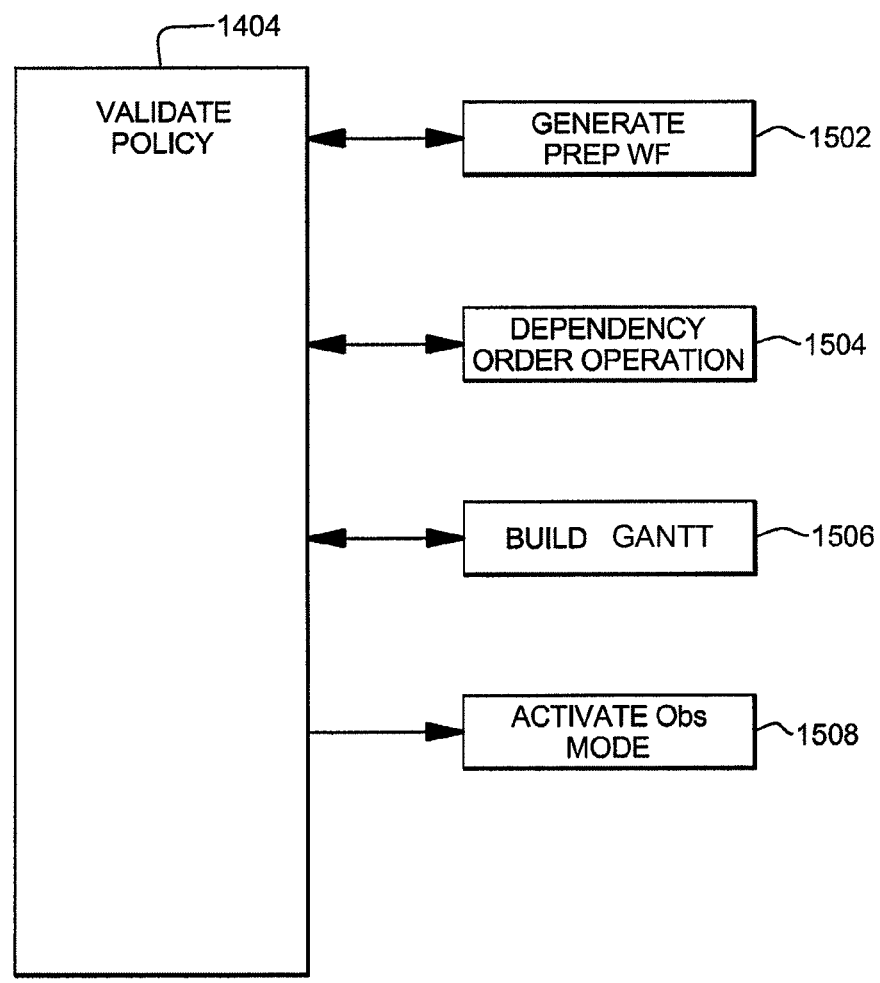
FIG. 15 depicts one embodiment of the functionality associated with validating policy processing, in accordance with an aspect of the present invention.

The Validate Policy routine (1404) performs the following steps, as one example, which are described with reference to FIG. 15.
1. Verify validity of using operation execution times by insuring they meet statistical validity requirements or customer override.
2. Invoke the Generate Prep WF routine (1502), which is described below.
3. Assume total RS resource recovery required.
4. For each resource to be recovered:
   a. Locate recovery operation on the resource from pairings (BRRD 1422—FIG. 14).
   b. If one or more operations are found, select the one having lowest execution time;
   c. Otherwise:
      i. Locate pairings which specify operations acting on any other resource which recover this resource;
      ii. Select the resource and operation having the lowest execution time.
5. Invoke the Dependency Order Operation routine (1504), described below.
6. Invoke the Build Gantt routine (1506), described below.
7. If the RS has the same state as when Validate Policy routine started:
   a. Store policy, operation lists (undo, prep, phase 1 activate), prep workflow, RS.SummaryState with RS data;
   b. If observation mode is not already active for the RS, invoke the Activate Obs mode routine (1508) (see 1002—FIG. 10).

Regarding the Dependency Order Operation routine (1504) referenced above, the following steps are executed, in one example:
1. For each input resource, operation pair:
   a. Find operations which are to occur just before the specified resource, operation pair;
   b. Add the found preceding resource, operation pair to the end of the input list;
   c. Find operation execution time for the added resource, operation pair for the PSE being used;
   d. Convert the operation ordering pairing from a before pairing to an after pairing.
2. For each resource, operation pair in the list:
   a. Find operation ordering pairings which specify an after operation ordering relationship;
   b. Add found after resource, operation pair to the end of the input list.
3. Form a set of operations in the resource, operation list which are not referenced in any operation ordering after pairing:
   a. Assign the formed set the next sequence number for operation ordering;
   b. Remove formed set from the resource, operation list and add to the output ordered operation list;
   c. If the resource, operation list is not now null, repeat step 3.

4. For each operation in the ordered list:
   a. Find all operations occurring just after;
   b. Add found operations to the operation after entry for the resource, operation they are to immediately follow.

Regarding the Build Gantt routine (1506) referenced above, the following steps are executed, in one example:

Processing is performed in, for instance, two phases. In the first phase, a table is built that includes one row for each unique path through the sequence of operations. The input ordered_op_list is indexed by the variable i_order_op_list. The result of phase one processing is a table, outlist_table. An index, i_next_avail_row, indicates the row within outlist_table where the next unique sequence through the set of operations is to be built. Processing proceeds by locating each input operation with the lowest operations sequence number. Each of these is a root of unique paths through the set of operations. The set of these operations is processed sequentially with unique paths through the set of operations for the first root completing before processing the unique paths through the set of operations for the second root.

Processing for a root begins by assigning the current row in the outlist_table to the index, current_orow_index, and incrementing the i_next_avail_row index. Within the row being processed, an index to the current operation being processed is maintained, index_for_ops.

Processing proceeds through the list of operations in the input. A new row is created in outlist_table when more than one input operation is to occur after the current operation being processed. Two indicators are kept with each row of the outlist_table in, for instance, a header column. Header includes, for instance, a row_changed indicator and a row_end indicator. The row_changed indicator is used to cause a copy of the row to be made before a new operation which is to occur later in the sequence is added. Associated with each row are two fields used to save progress in processing the sequence: an ordered_op_next field, which includes an index into the input ordered_op_list for the last operation in the sequence; and an op_next field, which includes an index into the row for the last operation in the sequence. Entries in the row include an index into the input ordered_op_list for operations comprising the sequence.

When a new row is created, it is initialized with the sequence of operations in the current row that have been accumulated to that point of processing. The second indicator associated with each row, row_end, is used to identify a row which is a complete path through the sequence of operations.

The next row is processed in the same manner as the first row of a root. Processing for a root is determined to have recorded every unique path through the sequence of operations when there were no copied rows made during processing of the current row. When the unique paths through the set of operations for the first root has completed, processing continues with the second and subsequent roots.

The second phase of processing builds the output of the routine, Gantt_table and maxtime. The maximum time for execution of the sequence of operations is set in maxtime. The Gantt_table includes one row for each opentry in the ordered_op_list input. An entry in the Gantt_table includes, for example, the opentry provided as input, a start time relative to 0, and an end time relative to 0 for the operation.

The Generate Prep WF routine (1502) is further described with reference to FIG. 16. A set of preparatory operations is created based on current resource state (Pick Prep Operations routine 1600). The formed set is expanded to include dependent, preceding operations (Dependency Order Operation 1602), an ordered list of operations, and an ordered list of operations to undo the changes made by the preparatory operations may be created (WF_op_order_undo 1604). A programmatic Gantt chart representation of preparatory operations is formed by the Build Gantt routine (1608), described above. The ordered list of preparatory operations is taken as input to the Build WF routine (1610), which creates a workflow with included monitoring activities.

The Generate Prep WF executes the following steps, in one example:
1. Invoke Pick Prep Operations routine (1600) described below:
2. Build a DAG from prep operations returned.
3. For each resource, operation pair in the DAG:
   a. If the resource, operation has associated data from the BRMD indicating it is eligible to be a phase 1 activate operation:
      i. If any pairing exists for an operation which is to precede the proposed phase 1 activate operation or any undo operation associated with the proposed phase 1 activate operation:
         1. Notify the BR administrator that the proposed phase 1 activate operation is to remain a prep operation.
      ii. Otherwise, move the proposed phase 1 activate operation to a phase 1 activate list of operations.
4. Invoke WF_op_order_undo (1604), described below.
5. Invoke Build Gantt (1608) for prep operations, as described herein.
6. Invoke Build WF from ordered prep operations data (1610), described below.
7. Return.

Regarding the Pick Prep Operations routine (1600), the following steps are executed, in one example:
1. If workflow templates are selected for recommended best practices in creation of preparatory workflow:
   a. Select preparatory workflows with matching resource type and relationships to input RS.
   b. Pattern match resource and relationships included in RS with resource types and relationship types in preparatory workflow.
   c. Pattern matching may be further tailored through matching resource property values.
   d. Where matching patterns are found, retrieve the workflow activities represented in the template:
      i. If resource operations from the template are associated with the resources of the RS, add those preparatory operations to a recommended list of prep operations for execution.
   e. Display recommended list of prep operations for BR administrator evaluation.
   f. If the recommended list of prep operations need not be extended, exit.
2. For each resource in the RS:
   a. Retrieve prep effect pairings for the resource;
   b. Eliminate those pairings where the operation on the resource is not preparatory type;
   c. If more than one pairing remains, dialog with the BR administrator via the UI to pick the prep operation. In an alternative implementation, there is a rule set of picking the operation; for example, pick the prep op yielding the shortest execution duration, or pick the prep op resulting in the lowest demand on system resources, etc.;
d. Retrieve operation effect pairings referencing resource, operation selected;
e. If any affected resource from the returned pairings is not in the state resulting from execution of the proposed prep operation, add the proposed prep operation to the list for execution.

Regarding the WF_op_order_undo routine (1604), the following steps are executed, in one example:
1. Invoke Dependency Order Operation (1602) with prep operation list.
2. For each resource in the returned ordered prep operation list:
   a. Retrieve undo operations from BRMD operation data which restore the resource to a state prior to preparatory operation;
   b. Add undo operation to undo operation list.
3. Invoke Dependency Order Operation (1602) with undo operation list.

Figure 17:
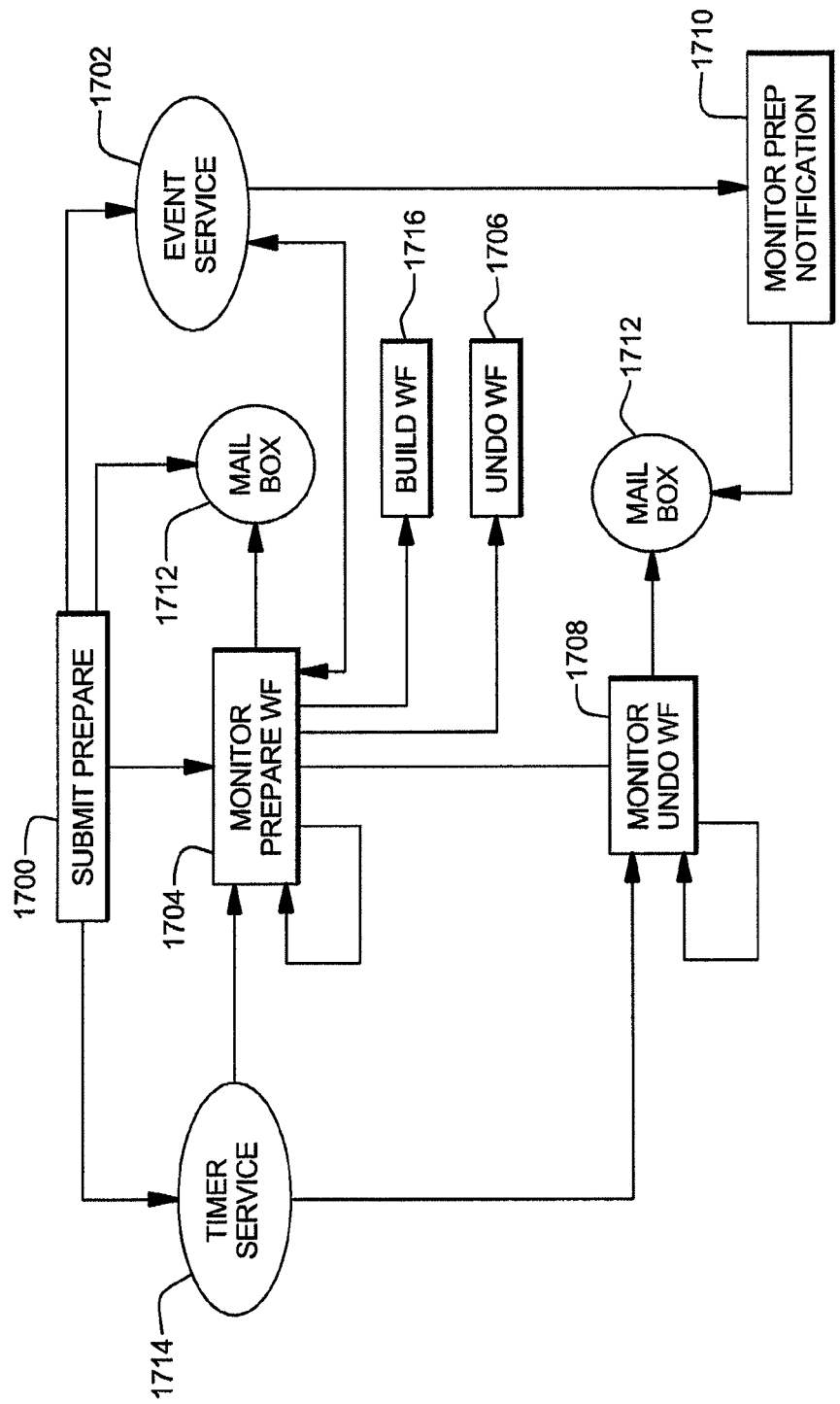
FIG. 17 depicts one example of the functionality associated with preparing the environment, in accordance with an aspect of the present invention.

Returning to FIG. 14, the Submit Prep routine (1408) is further described with reference to FIG. 17. A sequence of routines manages execution of the preparatory operations. In one example, Submit Prep establishes an environment to monitor resources on which prep operations are performed (1700), to receive events related to resources on which prep operations are performed (through event services 1702 to processing of 1710), and to submit the prep workflow for execution and monitor the submitted prep workflow (1704). When the prep workflow has completed, operations may not have completed normally, in which case the prep undo workflow (1706) is formed (1716) and submitted for execution. If the undo workflow is submitted, monitoring of the undo workflow is initiated (1708). Events may be received reporting changes in the state and resource property values of resources on which prep operations are performed. These events are processed by the monitor Prep Notification routine (1710).

The Submit Prepare routine (1700) executes the following steps, in one example:
1. If the RS.SummaryState has changed from when Generate Prep WF executed, notify the BR administrator via the Mailbox (1712) and exit.
2. Retrieve prep or delta prep data (including, for example: workflow; operations list (undo, prepare, phase 1 activate); RS.SummaryState) from RS data.
3. If any prepare workflow is in progress as recorded in the RS.TT, notify the BR administrator via the Mailbox and exit.
4. Invoke timer services (1714) to periodically give control to Monitor Prepare WF routine (1704).
5. For each resource acted on by the prepare WF:
   a. Subscribe for event notification on resource state and property value changes.
6. Submit the prepare workflow.
7. Invoke Monitor Prepare WF routine (1704).
8. Exit.

Regarding the Monitor Prepare WF routine (1704), the following steps are executed, in one example:
1. If the prepare workflow has not completed, exit with timer reset.
2. Cancel the prepare workflow timer.
3. If the prepare workflow completed normally:
   a. Update RS data reflection successful execution;
   b. Notify the BR administrator via the Mailbox (1712);
   c. Exit.
4. If the prepare workflow did not complete normally:
   a. Unsubscribe for event notification on resource state and property value changes on resources acted on by the prepare WF;
   b. Invoke Build WF routine (1716) with undo list of operations;
   c. Invoke timer services to periodically give control to Monitor Undo WF routine (1708);
   d. Submit the undo workflow (1706);
   e. Invoke Monitor Undo WF routine (1708).

The Monitor Undo WF routine (1708) performs the following steps, in one example:
1. If the undo workflow has not completed, exit with timer reset.
2. Cancel the undo workflow timer.
3. Notify the BR administrator of undo workflow completion.
4. Update RS state with undo workflow.
5. Exit.

Regarding the Monitor Prep Notification routine (1710), the following steps are performed, in one example:
1. Update BRMD data with data received on event notification.
2. Evaluate resource state using notification data.
3. If resource state remains as required by preparatory operation, exit.
4. Otherwise:
   a. Update RS state as being not prepared, but validated;
   b. Notify the BR administrator via the Mailbox.

Returning to FIG. 14, the steps performed by the Modify Prepare WF routine (1410) include the following, as one example:
1. For each resource acted on by the prepare workflow operations:
   a. Retrieve preparatory operations from the BRMD.
2. Present prepare workflow and valid resource preparatory operations to the BR administrator via the UI.
3. Generate a prepare operation list from the BR administrator modified preparatory workflow.
4. Re-execute the steps of Generate Prep WF following invocation of the Pick Prep Operations routine.

Configuring

Figure 18:
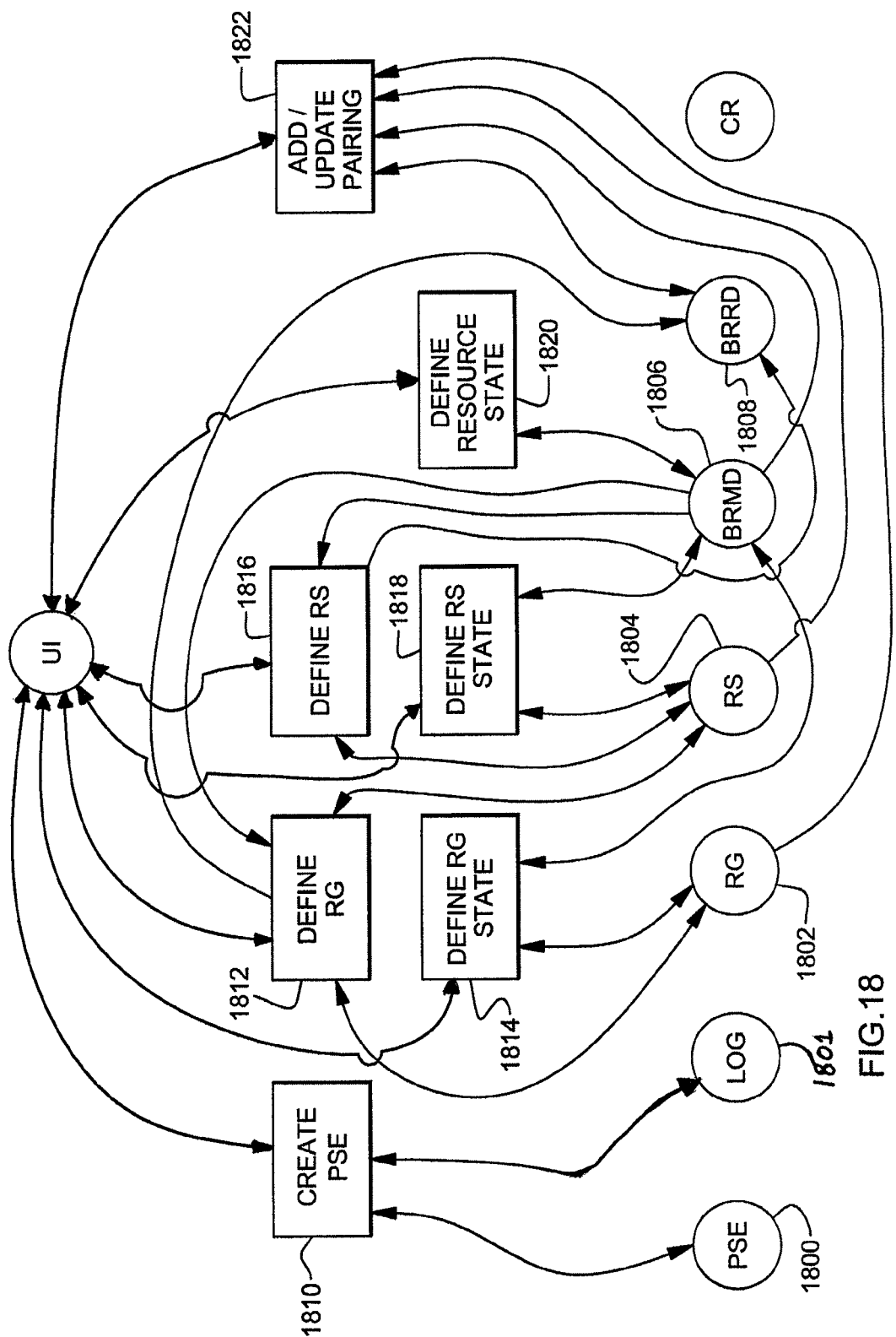
FIG. 18 depicts one example of an overview of functionality used to create programmatic representations of the customer environment, in accordance with an aspect of the present invention.

In one embodiment, functions are provided by the BR system which are used to create programmatic representations of the customer environment. Referring to FIG. 18, constructs including a Pattern System Environment (PSE) 1800, Redundancy Group (RG) 1802, Recovery Segment (RS) 1804, Resource representations (BRMD) 1806, and resource relationship data (BRRD) 1808, are created, associated with the business application to be provided, and adapted to the customer IT environment, as described in further detail below.

A PSE is created through use of the Create PSE routine (1810), described below. A PSE provides a programmatic representation of a customer environment and serves as the basis for learning and maintaining data on operations execution time for resources. A RG, created by a Define RG routine (1812), and provided an expression of state by a Define RG State routine (1814), provides a capability for representing equivalent resources, expressing the impact to a business application for quantity of equivalent resources and providing directives on where operating system and subsystem resources should be hosted. A RS is created by a Define RS routine (1816), provided an expression of state by a Define RS State routine (1818) and maintained by the BR system as a programmatic representation of a customer business application. Resource programmatic representations provide the basis for expressing resource operations data, resource property values data, data regarding processor, memory and I/O resource usage, as well as an expression of resource state as provided for by Define Resource State routine (1820). Relationships among resources may be expressed and maintained by an Add/Update Pairing routine (1822).

A Create PSE routine (1810) executes the following steps, in one example:
1. Retrieve customer specifications for cluster formation:
    a. Log data (1801) identification;
    b. Distance formula (s);
    c. Key factor(s);
    d. Non-numeric translation routine(s);
    e. Weighting factor(s).
2. Invoke cluster formation tooling.
3. Accept customer specified PSE date/time range.
4. Calculate PSE center of gravity.
5. Calculate center of gravity for each observation.
6. Associate each observation with the PSE having minimum distance from the observation.
7. Calculate operation execution duration for each resource operation from the observations associated with the PSE.
8. Save PSE and operation execution duration data.

A Define RG routine (1812) executes the following steps, as one example:
1. Display RS topology.
2. If templates for RG definition are to be utilized:
    a. Suggestions for templates may be made based on the types of resources in the DAG and in a template;
    b. A selected template may be applied with pattern matching logic used to detect where resource in the template and resources in the DAG have a similar characteristics of being equivalent;
    c. Pattern matching may be further tailored by matching on property values associated with resourced to be included in the RG;
    d. Where pattern matching occurs, identified resources may be suggested to be included in a RG along with suggested relationships to be included in pairings.
3. Validate selected resources are of same type.
4. Update BRRD for resource relationship to RG.
5. Save RG.

A Define RG State routine (1814) executes the following steps, in one example:
1. Display RG resources.
2. Validate resource state and property value specifications.
3. Save RG.

The following steps are executed by a Define RS routine (1816), as one example:
1. Retrieve topology for the customer IT environment, as for example, may be stored in a customer Configuration Management Data Base (CMDB).
2. From selected seed resources, form a DAG based on the topology, expressing resources associated with the RS.
3. If templates for RS definition are to be utilized:
    a. Suggestions for templates may be made based on the count of number and type of resources in the DAG and in a template;
    b. A selected template may be applied with pattern matching logic used to detect where two resources in the template and two resources in the DAG have a similar relationship;
    c. Pattern matching may be further tailored by matching on property values associated with the two resources forming a relationship;
    d. Where pattern matching occurs, identified resources may be suggested to be included in the RS along with suggested relationships to be included in pairings.
4. Associate the RS with a BRM for monitoring purposes.
5. Create BRMD data for RS resources.
6. Create BRRD data for resource relationships.
7. Save RS.

The following steps are executed by a Define RS State routine (1818), in one example:
1. Display RS resources.
2. Display RG(s) associated with RS resources.
3. Validate resource state, property values and RG state specifications.
4. Save RS.

A Define Resource State routine (1820) performs the following steps, in one example:
1. Display requested resource(s) data including property definitions.
2. Validate resource state and property values specified.
3. Save Resource data in BRMD.

An Add/Update Pairing routine (1822) performs the following steps, in one example:
1. If templates for pairing definition are to be utilized:
    a. Suggestions for templates may be made based on the type of resources in the DAG for the RS and in a template;
    b. A selected template may be applied with pattern matching logic used to detect where two resources in the template and two resources in the DAG have a similar relationship;
    c. Pattern matching may be further tailored by matching on property values associated with the two resources forming a relationship;
    d. Where pattern matching occurs, identified resources may be suggested to be included in a pairing.
2. Accept resource 1 and resource 2 specification.
3. Retrieve resource 1 and resource 2 data from BRMD.
4. Validate pairing construction according to pairing format.
5. Validate trigger specification use of property, ranges for property values, state and logical operators.
6. Save paring data in BRRD.

BR Administrator Change

Two forms of change which may be initiated by the BR administrator through the UI are, for instance, alteration of the set of resources associated with a RS, termed Change Scope; and alteration to the quantitative availability goal associated with the business application (as represented by a RS), termed Change Goal. Both the Change Scope routine and the Change Goal routine (described below) may be implemented as a series of steps coordinated as a complex task utilizing BR system provided megaflow processing.

Figure 19:
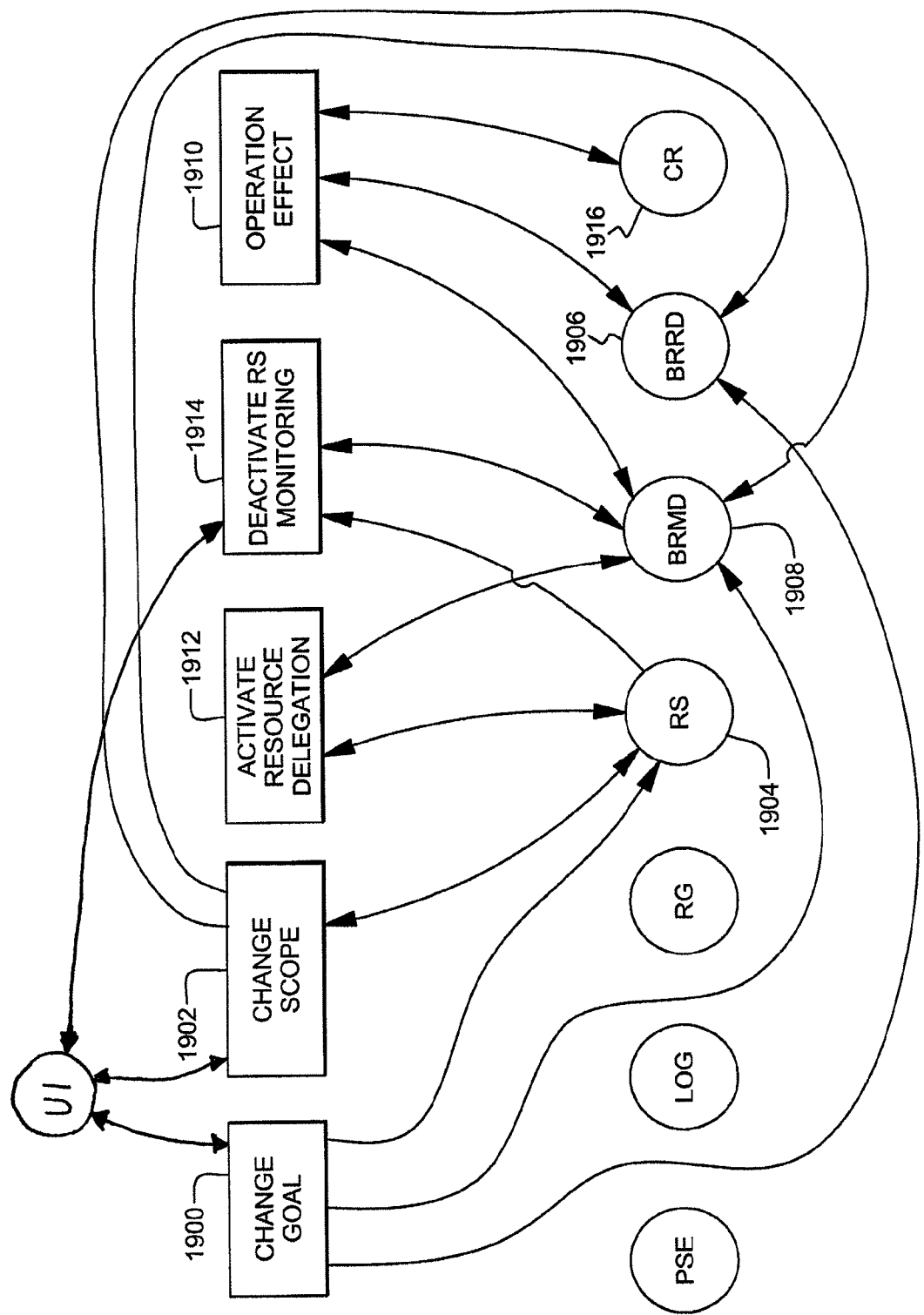
FIG. 19 depicts one embodiment of functionality associated with changing aspects of the IT environment, in accordance with an aspect of the present invention.

Referring to FIG. 19, regarding a Change Goal routine (1900), the following steps are performed, in one example, through the coordination of megaflow processing:
1. If a new policy is required, invoke the Define Policy routine (as described above).
2. If the new goal is to be validated, invoke the Validate Policy routine (as described above).
3. If the IT environment is to be preconditioned to meet the new goal, invoke the Submit Prep routine (as described above).
4. If the BR system is to actively manage the IT environment to achieve the new goal, invoke the RS Monitoring of Resources routine (described above).

Regarding a Change Scope routine (1902), the following steps are performed, in one example, through the coordination of megaflow processing:

1. Retrieve RS topology for alteration by BR administrator.
2. Validate DAG of RS with addition or removal of resources.
3. If the modified RS (1904) is to be validated, invoke the Validate Policy routine.
4. If the IT environment is to be preconditioned in the context of the revised RS, invoke the Submit Prep routine.
5. If the BR system is to actively manage the IT environment in the context of the revised RS:
    a. Invoke the RS Monitoring of Resources routine (see 1008—FIG. 10);
    b. Unsubscribe for notification of resource data alteration for resources removed from RS;
    c. Update BRRD (1906) and BRMD (1908) data for relationship between resource and RS.
    d. Update BRRD for pairing trigger data eliminating references to resources removed from RS.
    e. Update RS and RG state rules eliminating references to resources removed from RS.

Enforcing Priorities

Enforcement of priorities among business applications may alter processing performed by adaptive IT management services, such as the BR system. In particular, constraints may be placed by the customer on the impact recovery of one business application may have on other business applications. Additionally, delegation of recovery operations which may be performed by a resource may be restricted if that resource is shared by two or more business applications in order to insure the impact of those recovery operations are evaluated in the context of the overall collective business application environment.

Delegation of recovery operations to resources by the BR system may be performed when a resource becomes shared between two or more business applications and when a resource is no longer shared between two or more business applications, as is further described below.

Evaluation of constraints on recovery operations among business applications may be performed by an Operation Effect routine (1910) (see 1308—FIG. 13), further described below. In one implementation, such a routine may first determine how each input operation might change resource state. A second step may determine for each resource state potentially changed what the impact to the other resources might be including cascading effects. A third step may evaluate the resulting RS state if the potential changes to resource state(s) were to occur. A final fourth step may then determine if such changes in RS state are to be allowed based on customer specified constraints among business applications.

An Activate Resource Delegation routine (1912) is given control, in one example, when active management of a RS to a quantitative goal is initiated (see 1009—FIG. 10) as, for example from the RS Monitoring of Resources routine. The steps performed include, for instance:

1. Form a DAG of resources in the RS.
2. For each resource in the DAG from leaf to root:
    a. If resource can be delegated to:
        i. If resource is part of two or more RS(s):
            1. Invoke resource interface disabling recovery operations.
        ii. Otherwise:
            1. Invoke resource interface enabling recovery operations with apportioned recovery time.

Figure 10:
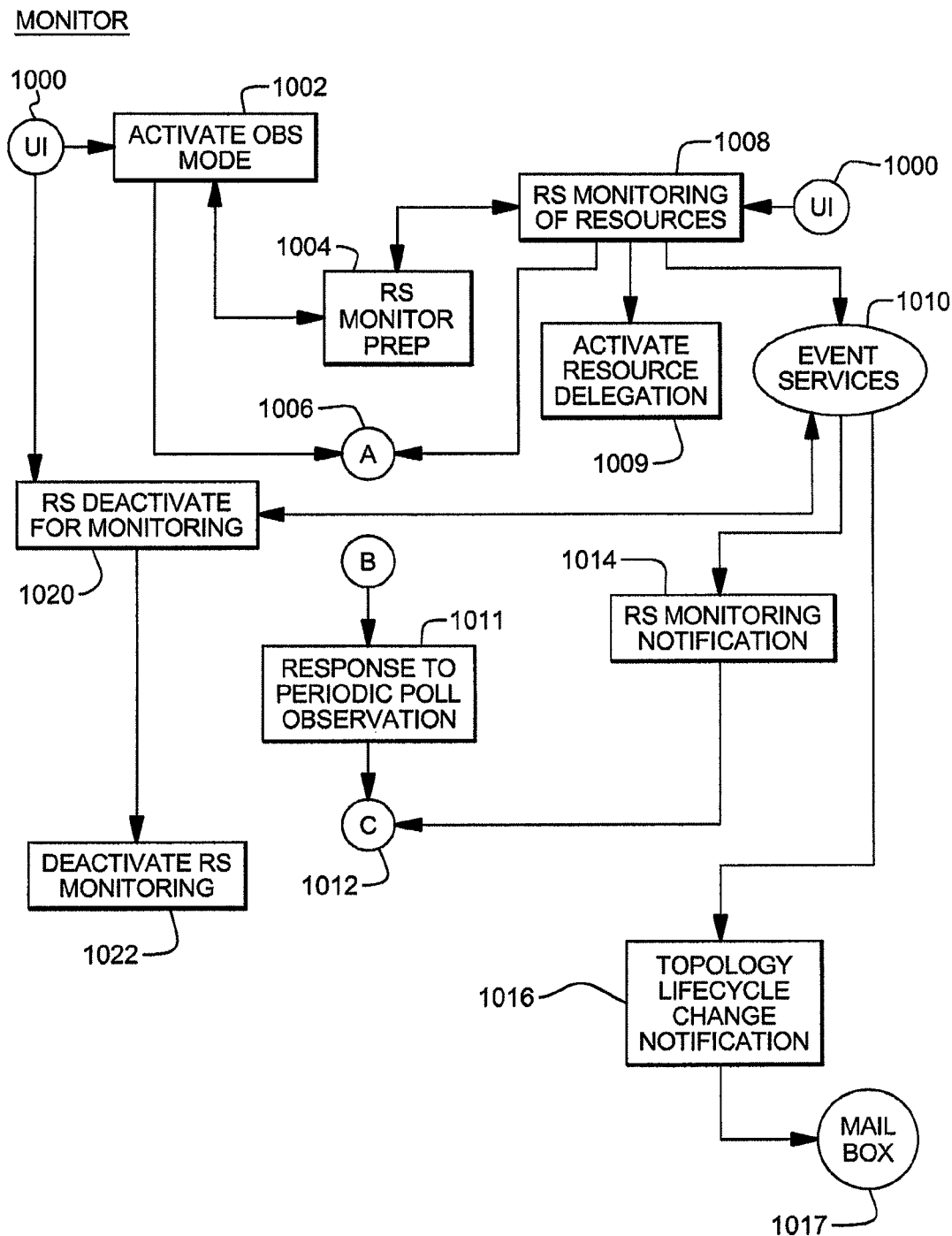
FIG. 10 depicts one embodiment of the functionality associated with monitoring processing, in accordance with an aspect of the present invention.

A Deactivate RS monitoring routine (1914) is given control, in one example, when active management of a RS to a quantitative goal is requested as, for example, from the RS Deactivate for Monitoring routine (see 1022—FIG. 10). Steps performed include, for instance:

1. Form a DAG of resources in the RS.
2. For each resource in the DAG from leaf to root:
    a. From BRMD data if resource is part of one or zero more RSs and resource can be delegated to:
        i. Invoke resource interface enabling recovery operations.

Figure 13:
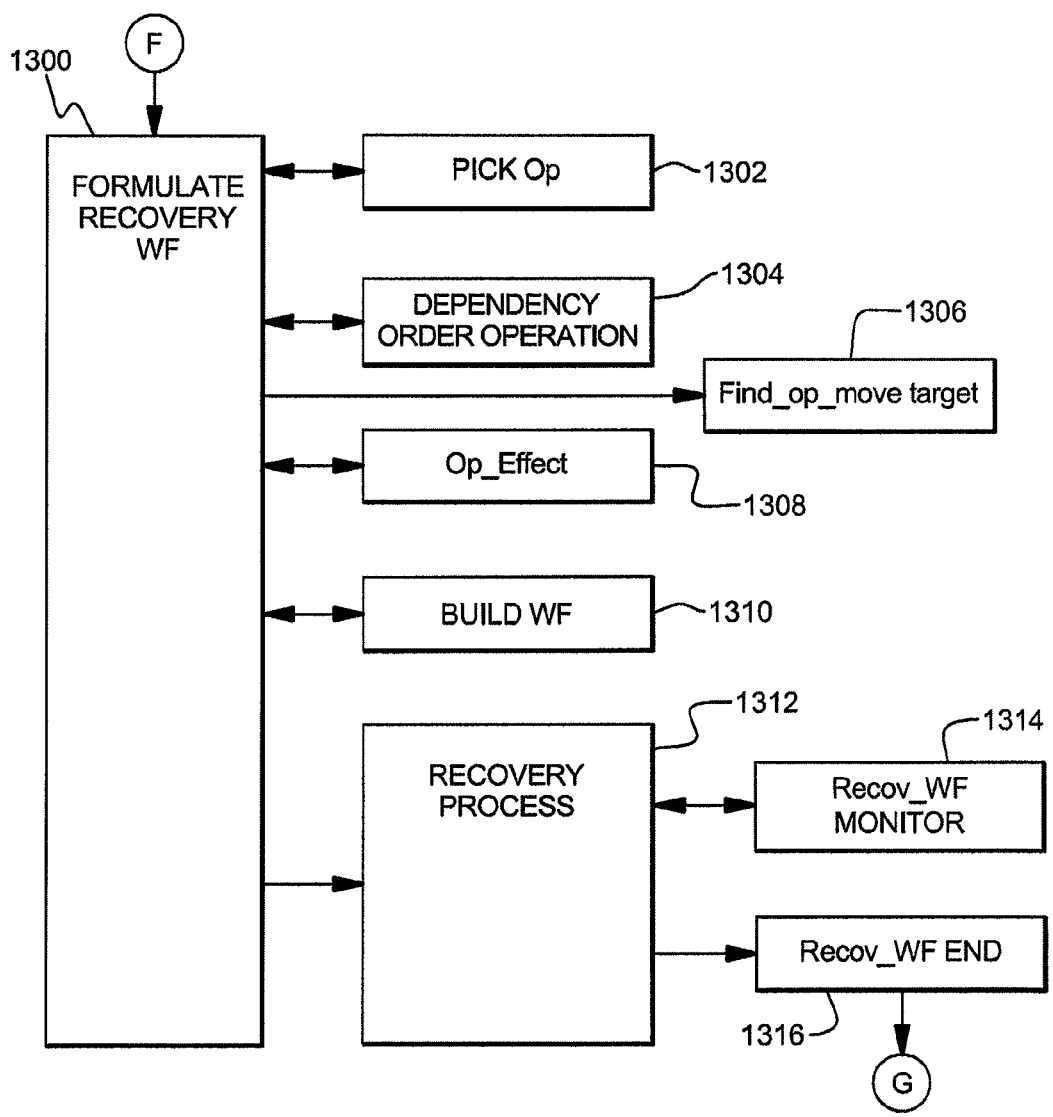
FIG. 13 depicts one embodiment of the functionality associated with recovery processing, in accordance with an aspect of the present invention.

An Operation Effect routine (1910) is given control in one example, to determine if alterations to the IT environment are to be allowed based on constraints imposed by the customer on the effect one business application can have on others, as for example from a Formulate Recovery WF routine (see 1308—FIG. 13). The following steps are performed, in one example:

1. For each input resource, operation pair:
    a. Retrieve op effect pairings from BRRD;
    b. Add resource, state pair to list for analysis.
2. Until the end of the list of resource, state for analysis is reached:
    a. If resource, state is an RS, add to RS list for analysis;
    b. Retrieve impact pairings from BRRD with matching resource 1;
    c. For each pairing:
        i. If resource 2 state from pairing is not equal to the current resource 2 state;
            1. Add resource 2 to the end of the list of resource, state for analysis.
3. Set return code to allow execution of the input resource, operation pairs.
4. For each RS associated with the CR (1916):
    a. Assess RS state using list of resource, state for analysis data and any missing data to be taken from BRMD cache;
    b. Select constraint pairings from BRRD with resource 1 matching RS from CR and a cannot condition;
    c. If RS resource 2 from pairing is in the RS list for analysis:
        i. If RS state for resource 2 of pairing matches RS state in the list for analysis, set return code to disallow execution of the input resource, operation pairs.

Support Services
Build Workflow

Figure 16:
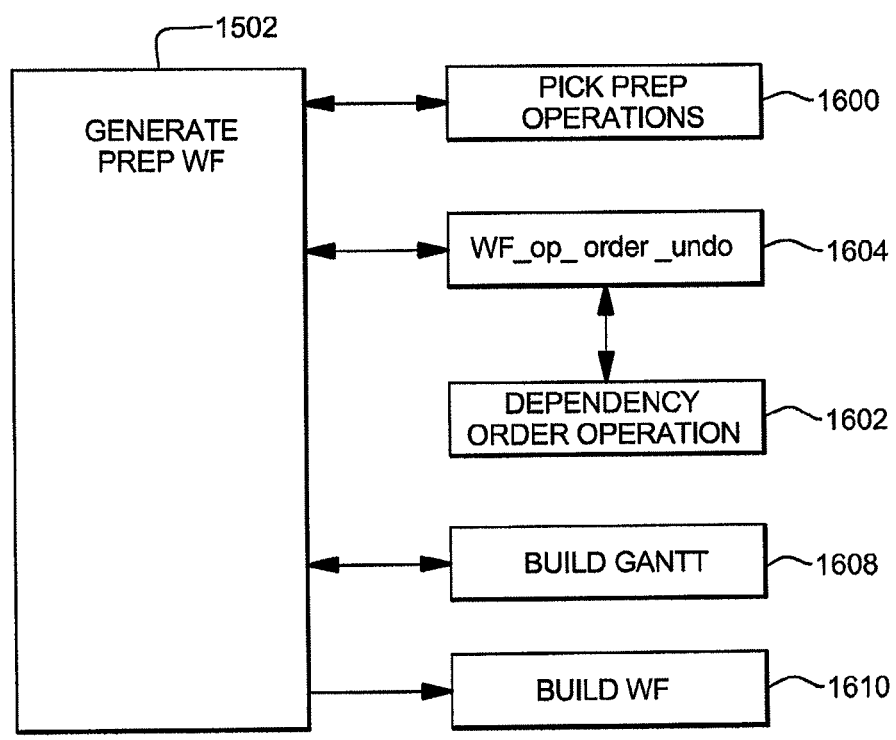
FIG. 16 depicts one embodiment of the logic associated with generating preparatory workflows, in accordance with an aspect of the present invention.

In one implementation, a set of operations is constructed into a workflow suitable for submission and navigation for execution by a Build WF routine (see 1310-FIG. 13; 1610—FIG. 16). Input includes a list containing entries, where each entry identifies, for instance: resource, operation, operation sequence number and a list identifying the zero or more operations which immediately follow. The operations that follow are identified by their index into the entries in the input list. Such a structure may be built by the Order Operation Dependency routine (see 1504—FIG. 15).

Processing performed by the Build WF routine includes, for example:

1. For each resource, operation in the input list:
    a. Invoke workflow services (e.g., interfaces to BPEL, or other programmatic interfaces to add activities or actions) to add a preliminary monitoring routine, which establishes a basis for operation execution time.
        i. Input to the preliminary monitoring routine to include the resource operation to be performed.

ii. Input to the workflow service includes the order, relative to the set of operations, for this operation.
2. When the preliminary monitor routine is invoked just prior to a resource operation:
  a. Determine from current resource data if the operation is to be executed;
  b. If not, exit;
  c. Otherwise, save the starting time for the operation;
  d. Invoke the resource operation;
  e. Save the completion time and execution time duration for the resource operation;
  f. Save the completion status for the resource operation.
3. When the last list operation of the workflow has been reached:
  a. Return resource operation execution time data.

BR Recovery

Recovery for failure of BR system components is achieved, in one implementation, through utilization of BRM monitoring of one or more RS(s), BRM group monitoring and restart processing which evaluates activity log records. A RS is associated with a BRM during Define RS routine processing. The associated BRM utilizes event subscription and notification services which provide the associated BRM notification should the RS fail. Restart of a failed RS is requested by the associated BRM. Restart processing for the RS utilizes activity log data to reestablish RS functionality. BRM group monitoring is established when a BRM is made active within the customer's IT environment. Establishing a BRM group monitoring is achieved through customer specification of candidate hosting environments for a BRM and customer specification of a collection of BRM instances, each of which uses event subscription and notification services. All BRM instances of a monitoring group are notified when a monitored instance of a BRM fails. One of the monitoring BRM instances assumes responsibility for restarting the failed BRM using serialization of updates to a defined database record for coordinating BRM failure. The BRM assuming responsibility initiates restart processing for the failed BRM. Restart processing for the BRM utilizes activity log data to reestablish BRM functionality.

Activity log data for both BRM and RS instances includes records reflecting the beginning and the end of processes which entail multiple transactions or processes which are executed outside a transaction scope. Restart processing for BRM and RS instances read sequentially through activity log records noting where there are records for the start of an operation sequence with no matching end for the operation sequence. Restart logic includes steps for each such process which either rollback intermediate results or forward complete. For example, forward completion of CR processing is performed during RS restart processing. Rollback partially completed may be performed during Define RS processing for a new RS. The determination of forward completion or rollback is based on whether or not changes to the BR system environment may have been made by the partially completed process which alter ongoing operation of the BR system. If partial results made visible could have altered ongoing BR system operation, forward completion is undertaken. Otherwise, rollback is performed.

Described in detail herein is a capability for adaptively managing an IT environment.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 20:
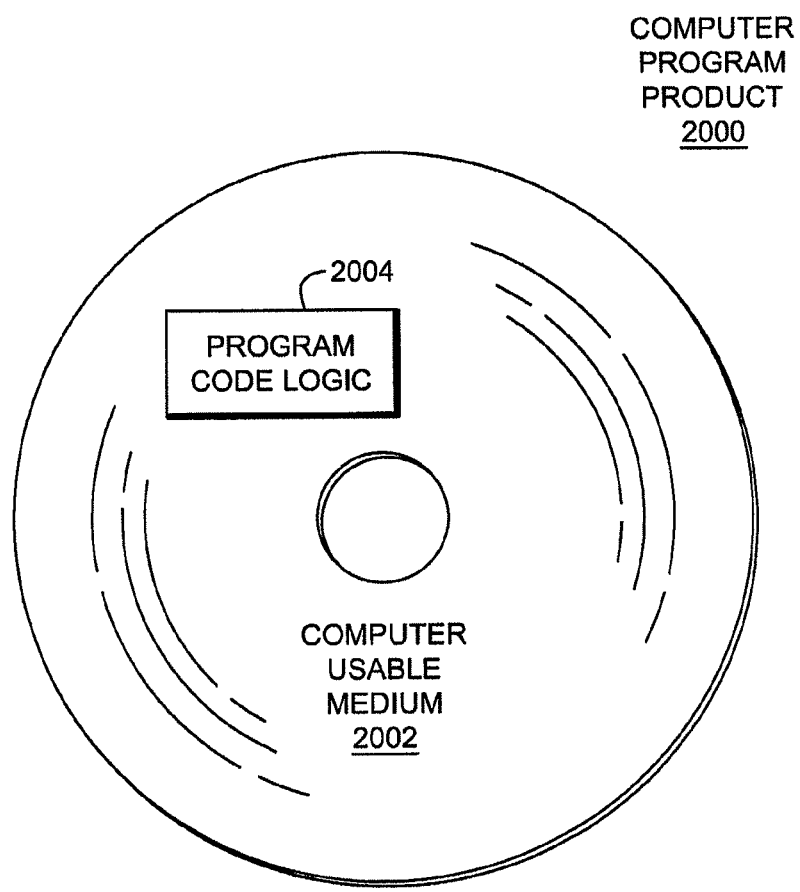
FIG. 20 depicts one embodiment of a computer program product incorporating one or more aspects of the present invention.

One example of an article of manufacture or a computer program product incorporating one or more aspects of the present invention is described with reference to FIG. 20. A computer program product 2000 includes, for instance, one or more computer usable media 2002 to store computer readable program code means or logic 2004 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, an adaptive management service is provided that programmatically responds to changes associated with business applications of an IT environment.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating management of an Information Technology (IT) environment, said method comprising:

determining that a change associated with a business application executing in an IT environment has occurred, said business application comprising a plurality of resources and one or more relationships between resources which provide the function of the business application; and programmatically adapting the IT environment, in response to the change, wherein the programmatically adapting is performed in the context of the business application, and wherein the programmatically adapting comprises using a processing entity to dynamically alter in real-time at least one of one or more resources or one or more management processes of the IT environment in which the business application is executing based on a quantifiable goal explicitly defined for the business application, and wherein the programmatically adapting comprises: applying learned historical information, updated in real-time, relating to the at least one of the one or more resources or the one or more management processes to determine how to alter in real-time the at least one of the one or more resources or the one or more management processes to facilitate meeting the quantifiable goal, wherein the change is a change in at least one of the IT environment, the business application, or the business environment, and wherein the programmatically adapting comprises performing predictive forecasting for achieving the quantifiable goal associated with the business application, the quantifiable goal comprising a management business goal for the business application, the business application having a defined scope associated therewith.

2. The computer-implemented method of claim 1, wherein the programmatically adapting comprises enforcing priorities among a plurality of business applications, wherein one or more constraints indicating the impact that the business application can have on another business application are considered.

3. The computer-implemented method of claim 1, wherein the quantitative goal comprises an availability goal.

4. The computer-implemented method of claim 1, wherein the change comprises at least one of:
- a change in capability of one or more resources supporting the business application;
- an addition of a resource to the business application;
- an addition of a resource relationship to the business application;
- discontinued support of a resource of the business application;
- discontinued support of a resource relationship of the business application;
- a change in one or more property values for one or more resources of the business application;
- a change in state for one or more resources of the business application;
- a change in resource sharing associated with the business application;
- a change in preconditioning of a capability of a resource of the business application;
- a change in redundancy of one or more resources of the business application;
- an addition of a resource operation for the business application; or
- a change in resource operation for the business application.

5. The computer-implemented method of claim 1, wherein the change comprises a change in service level goal for the business application.

6. The computer-implemented method of claim 1, wherein the change comprises at least one of:
- one or more changes in the IT environment; or
- one or more failures of the IT environment.

7. The computer-implemented method of claim 1, wherein the change comprises a change of a business environment associated with the business application, wherein the change of the business environment comprises a change associated with a business cycle or business demand.

8. The computer-implemented method of claim 1, wherein the change comprises at least one of:
- a failure of expected completion of an operation of a resource supporting the business application;
- a change in best practices associated with the business application;
- an addition of a best practice associated with the business application; or
- a change in allowed impact to one or more business applications.

9. The computer-implemented method of claim 1, wherein the programmatically adapting comprises performing at least one of:
- conditional assessment of state of one or more resource of the business application;
- determining applicability of relationship of resources of the business application;
- invocation of one or more operations on one or more resources of the business application; or timing of management activities associated with the business application.

10. The computer-implemented method of claim 1, wherein the programmatically adapting provides at least one of:
- continued reliable service, in response to an unbounded event or message delay; or
- continuous management services across one or more disruptions to individual management tasks associated with the business application.

11. The computer-implemented method of claim 1, wherein the programmatically adapting comprises performing at least one of:
- predictive forecasting of achieving a management goal associated with the business application;
- programmatic application of best practices in configuring the IT environment to support the business application;
- real-time management of the IT environment, in response to adapting to the change; or
- concurrent execution of multiple categories of processing within the IT environment, said multiple categories of processing having varying priority.

12. The computer-implemented method of claim 1, wherein the programmatically adapting comprises at least one of:
- forming a workflow to be used in management of the IT environment;
- presenting a workflow to be used in management of the IT environment; or
- modifying a workflow to be used in management of the IT environment.

13. The computer-implemented method of claim 1, wherein the programmatically adapting comprises altering a complex task executing within the IT environment based on completion status of an action of the complex task.

14. A computer system of facilitating management of an Information Technology (IT) environment, said computer system comprising:
- a memory; and
- a processor in communications with the memory, wherein the computer system is configured to perform a method, said method comprising:
  - determining that a change associated with a business application executing in an IT environment has occurred, said business application comprising a plurality of resources and one or more relationships between resources which provide the function of the business application; and
  - programmatically adapt-adapting the IT environment, in response to the change, wherein the programmatically adapting is performed in the context of the business application, and wherein the programmatically adapting comprises using a processing entity to dynamically alter in real-time at least one of one or more resources or one or more management processes of the IT environment in which the business application is executing based on a quantifiable goal explicitly defined for the business application, and wherein the programmatically adapting comprises:
- applying learned historical information, updated in real-time, relating to the at least one of the one or more resources or the one or more management processes to determine how to alter in real-time the at least one of the one or more resources or the one or more management processes to facilitate meeting the quantifiable goal,
- wherein the change is a change in at least one of the IT environment, the business application, or the business environment, and wherein the programmatically adapting comprises performing predictive forecasting for achieving the quantifiable goal associated with the business application, the quantifiable goal comprising a management business goal for the business application, the business application having a defined scope associated therewith.

15. The system of claim 14, wherein the programmatically adapting comprises enforcing priorities among a plurality of business applications, wherein one or more constraints indicating the impact that the business application can have on another business application are considered.

16. A computer program product for facilitating management of an Information Technology (IT) environment, the computer program product comprising:
   a non-transitory computer readable storage medium readable by a processor and storing instructions for execution by the processor for performing a method comprising:
   determining that a change associated with a business application executing in an IT environment has occurred, said business application comprising a plurality of resources and one or more relationships between resources which provide the function of the business application; and
   programmatically adapting the IT environment, in response to the change, wherein the programmatically adapting is performed in the context of the business application, and wherein the programmatically adapting comprises using a processing entity to dynamically alter in real-time at least one of one or more resources or one or more management processes of the IT environment in which the business application is executing based on a quantifiable goal explicitly defined for the business application, and wherein the programmatically adapting comprises:
   applying learned historical information, updated in real-time, relating to the at least one of the one or more resources or the one or more management processes to determine how to alter in real-time the at least one of the one or more resources or the one or more management processes to facilitate meeting the quantifiable goal,
   wherein the change is a change in at least one of the IT environment, the business application, or the business environment, and wherein the programmatically adapting comprises performing predictive forecasting for achieving the quantifiable goal associated with the business application, the quantifiable goal comprising a management business goal for the business application, the business application having a defined scope associated therewith.

17. The computer program product of claim 16, wherein the programmatically adapting comprises enforcing priorities among a plurality of business applications, wherein one or more constraints indicating the impact that the business application can have on another business application are considered.

* * * * *